United States Patent [19]

Greensite

[11] Patent Number: 4,991,092
[45] Date of Patent: Feb. 5, 1991

[54] IMAGE PROCESSOR FOR ENHANCING CONTRAST BETWEEN SUBREGIONS OF A REGION OF INTEREST

[75] Inventor: Fred Greensite, Newport Beach, Calif.

[73] Assignee: The Regents of the University of California, Oakland, Calif.

[21] Appl. No.: 231,830

[22] Filed: Aug. 12, 1988

[51] Int. Cl.$^5$ .............................................. G06F 15/68
[52] U.S. Cl. ........................... 364/413.13; 364/413.22; 382/54
[58] Field of Search ....................... 364/413.22, 413.13; 382/54, 6; 358/111; 379/99

[56] References Cited

U.S. PATENT DOCUMENTS

| | | | |
|---|---|---|---|
| 3,805,239 | 4/1974 | Watanabe | 382/51 |
| 4,218,707 | 8/1980 | Reed et al. | 358/113 |
| 4,340,911 | 7/1982 | Kato et al. | 358/455 |
| 4,437,161 | 3/1984 | Anderson | 364/413.23 |
| 4,499,597 | 2/1985 | Alves | 382/41 |
| 4,538,227 | 9/1985 | Toraichi et al. | 364/413.22 |
| 4,606,658 | 8/1986 | Beg et al. | 382/18 |
| 4,641,351 | 2/1987 | Preston, Jr. | 382/6 |

OTHER PUBLICATIONS

D. A. Orthendahl et al., From the "Book of Abstracts", Society of Magnetic Resonance in Medicine 6th Annual Meeting, 8/18–8/21 1987, p. 270, MRI Image Segmentation Using Fuzzy Set Clustering and Spatial Correlations.

R. H. Heil, Jr. et al., Proceedings of the Society of Photo-Optical Instrumentation Engineers Seminar on Imaging Techniques for Testing and Inspection, Los Angeles, CA U.S.A. Feb. 1972, pp. 131–143, "Quantitative Materials Evaluation and Inspection with the Image Analysing Computer".

R. L. Cannon, et al., IEEE vol. PAMI-8, No. 2, Mar. 1988, pp. 248–250, "Efficient Implementation of the Fuzzy c-Means Clustering Algorithms".

K. L. Weiss et al., AJR:149, Oct. 1987, pp. 825–829, "Hybrid Color MR Imaging Display".

J. Sklansky, IEEE vol. SMC-8, No. 4, Apr. 1978, pp. 237–247, "Image Segmentation and Feature Extraction".

D. A. Ortendahl et al., Proc. 9th International Conference on Info Processing in Med. Imaging, Washington D.C. 1985, pp. 62–76, "Tissue Type Identification by MRI Using Pyramidal Segmentation and Intrinsic Parameters".

C. E. Cann, et al., Journal of Computer Assisted Tomography 4(4), pp. 493–500, Aug. 1980, "Precise Measurement of Vertebral Mineral Content Using Computed Tomography".

R. E. Baldy et al., Neuroradiology, Springer-Verlag, (1986) 28: pp. 109–117, "A Fully-Automated, Computer-Assisted Method of CT Brain Scan Analysis for the Measurement of Cerebrospinal Fluid Spaces and Brain Absorption Density".

J. M. Keller et al., Journal of Computer Assisted Tomography 5(2): pp. 240–245, Apr. 1981, "Automatic Outlining of Regions on CT Scans".

Primary Examiner—Clark A. Jablon
Attorney, Agent, or Firm—Beehler & Pavitt

[57] ABSTRACT

An imaging technique is disclosed for enhancing the contrast of an image, in particular for enhancing the contrast between subregions of a region of interest which may have similar signal characteristics and significantly distinct physical properties. A distribution density function describing the density of the signal in a signal space assigned to a voxel of the region to be imaged is first computed. This distribution function is then convolved with a resolution function, preferably a Gaussian function. Advantageously, the variance of the Gaussian is greater and a multiple of the variance of the noise statistics of the input image. The result of the convolution of the distribution function with the resolution function defines a scale, preferably a grey scale which assigns a particular tone to a pixel of the image corresponding to the voxel of the region to be imaged. The standard deviation is preferably chosen by the user and defines the resolution of the final image in the signal space. The noise in the output image can be decreased by increasing the standard deviation of the convolving Gaussian. For large values of the variance of the Gaussian, the contrast-to-noise ratio is comparable to standard images. The resulting gray scale creates a greater contrast between areas of different volumes having similar signal characteristics. Other resolution functions can be used.

32 Claims, 32 Drawing Sheets

(STANDARD IMAGE)

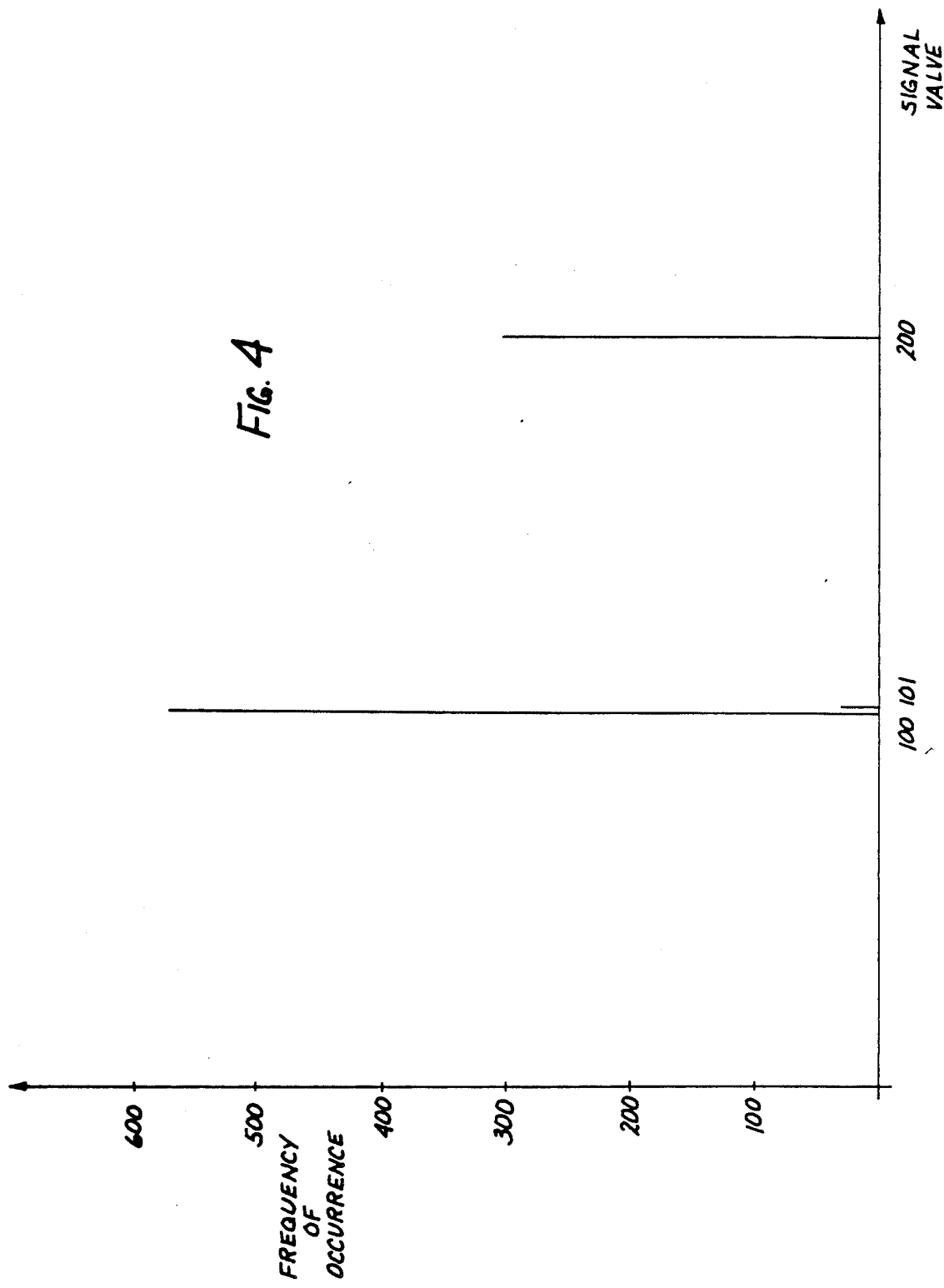

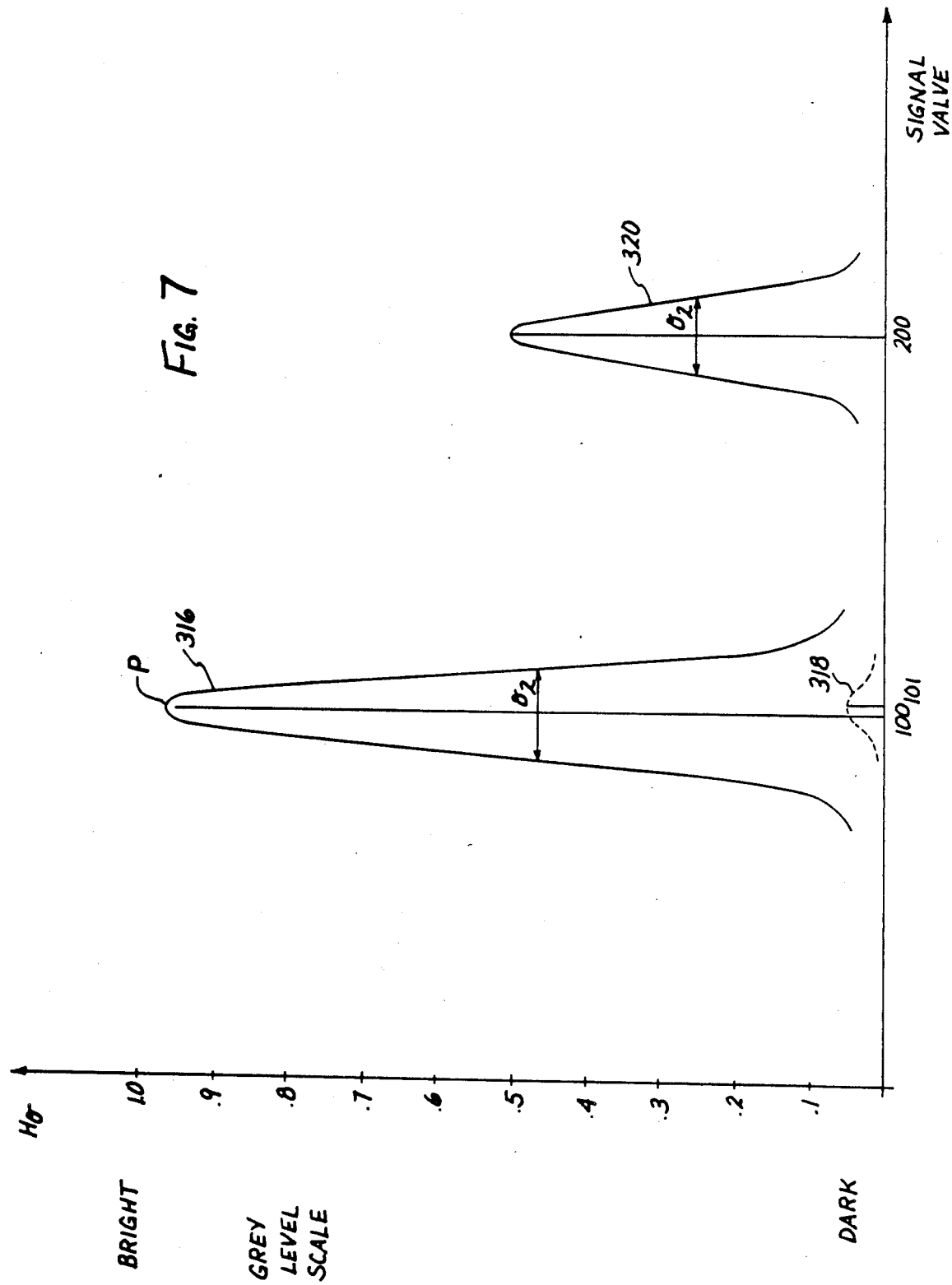

(STANDARD IMAGE)

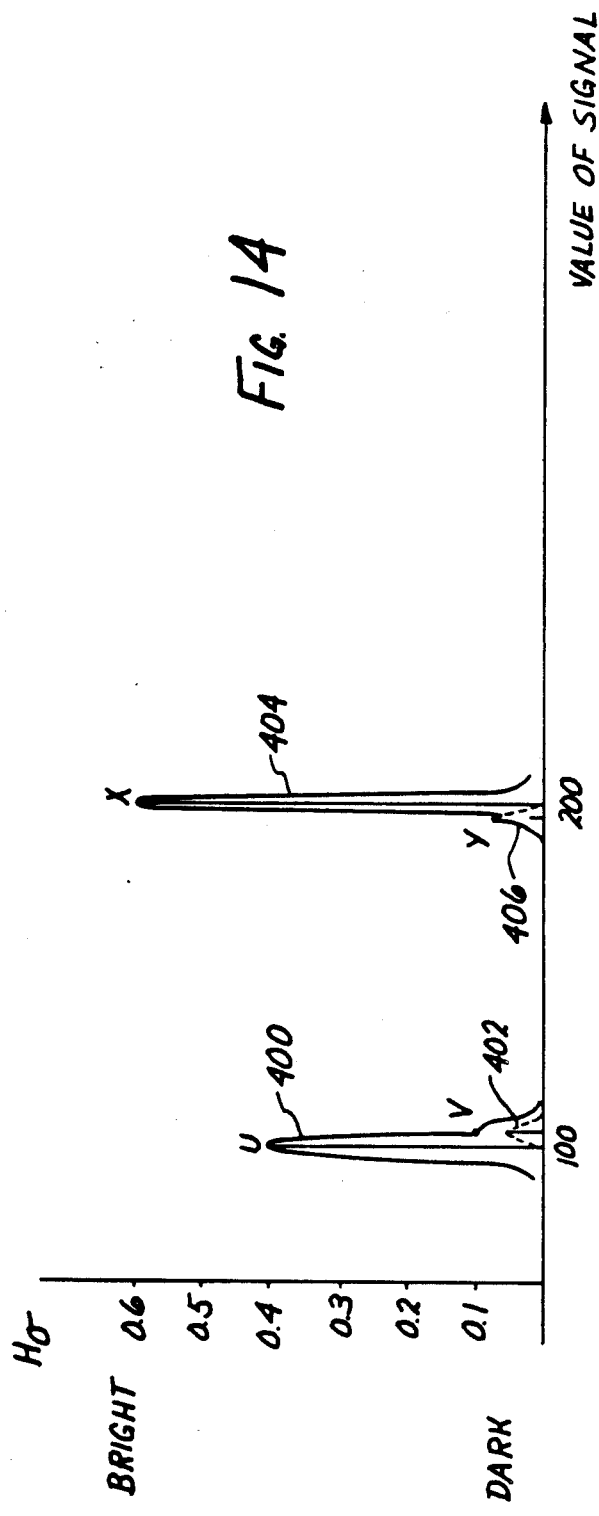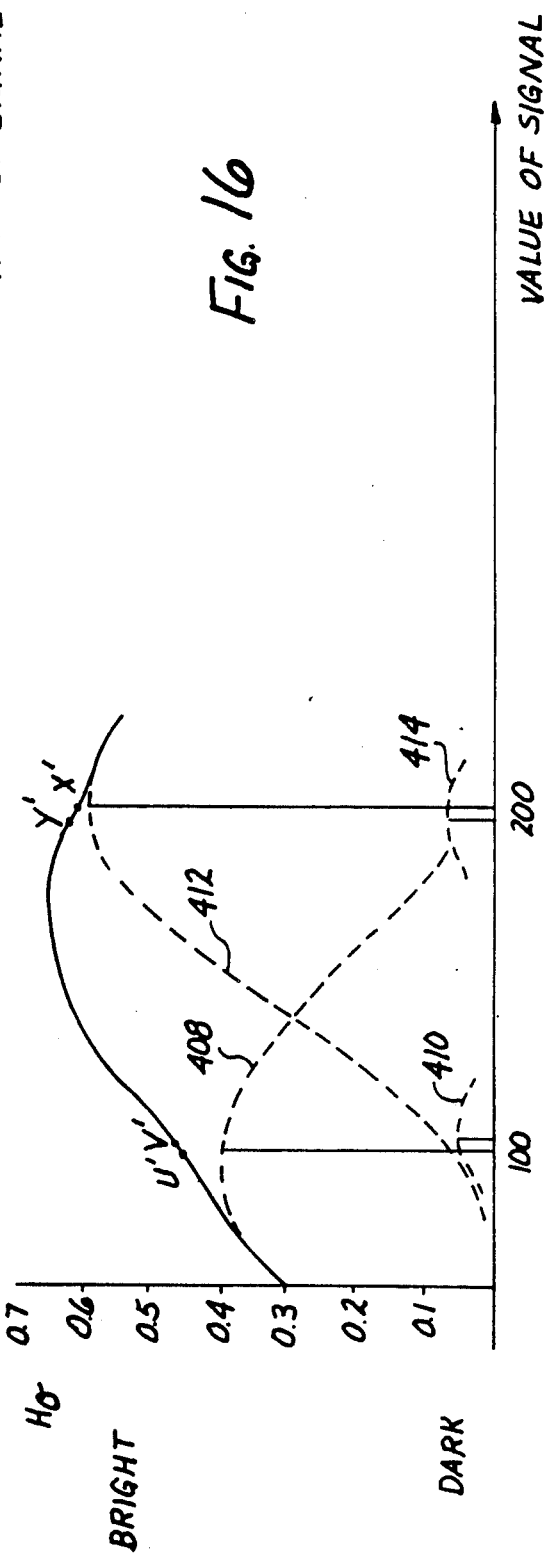

FIG. 18a

| 3.2 | 7.6 | 7.4 | 7.2 |
|---|---|---|---|
| 2.3 | 2.6 | 2.1 | 6.9 |
| 2.2 | 2.5 | 2 | 5.6 |
| 4 | 4.4 | 5.3 | 5.5 |

σ = γ

$\sigma = 90$ ?

(STANDARD IMAGE)

σ=10 γ

IMAGE PROCESSOR FOR ENHANCING CONTRAST BETWEEN SUBREGIONS OF A REGION OF INTEREST

A portion of the disclosure of this patent document contains material which is subject to copyright protection. The copyright owner has no objection to the facsimile reproduction by anyone of the patent document or the patent disclosure in its entirety, as it appears in the Patent and Trademark Office patent file or records, but otherwise reserves all copyright rights, whatsoever.

FIELD OF THE INVENTION

The present invention relates to an image processor for displaying gray-level images and particularly to image processors used for medical applications. The present invention also relates to a method for analyzing and extracting information from an analog or digital image signal so as to produce a high contrast between two regions having similar signal characteristics and physically proximate to one another.

BACKGROUND OF THE INVENTION

The process of detecting and characterizing a specific portion of a region to be imaged has increasingly been used in the treatment of information on images associated with various disciplines such as medicine, biomedicine, nuclear physics, satellite imaging, non-destructive inspection (NDI) and other imaging fields. Considerable effort has been expended to enhance the contrast of an image with respect to two distinct domains of a region of interest that are physically close and have similar signal characteristics.

In non-destructive inspections, the aim of an efficient imaging technology is to ascertain the presence and the location of small flaws in the material to be inspected. Imaging technologies have also become extremely valuable in the medical field and have proven to be quite effective in the field of medical diagnosis. In particular, computed tomography (CT X-ray scans) and Magnetic Resonance Imaging (MRI) are used extensively in medical imaging for generating high quality images of the body. In medical imaging, a frequent objective is to distinguish normal from abnormal tissue, for example a tumor growth on an organ. This presents a very difficult imaging problem in at three respects. First, the signals representative of the abnormal tumor cells are often quite similar to the signals representative of the normal cells of the organ. Second, since it is desirable to detect such abnormal growths as early as possible, the total volume or number of abnormal cells, is much smaller than the total volume or number of normal cells. Third, the abnormal cells are immediately adjacent to or in close proximity to the normal cells.

In most imaging techniques, and in particular medical imaging, the region of interest, i.e., the region of the object being imaged, is typically partitioned into a plurality of volume elements called voxels. A signal derived from the imaging technology (e.g. an X-ray signal in CT or an NMR signal in MRI) is averaged over each individual volume element or voxel. The composite of these averaged signals for all of the voxels comprising the region of interest form a representation of the object being imaged in signal space. These signals indirectly correspond to physical and/or chemical characteristics of the materials comprising the voxels being imaged. The properties of the materials within the region of interest directly affect the signals corresponding to their respective voxel elements. The manner in which the signals are affected is, of course, dependent upon the particular phenomenon, i.e., X-ray, NMR, etc., involved in the imaging technique. The signals may comprise a single component or a plurality of components. If the signals consist of a single component, as in computed tomography, they form a scalar field. If the signals comprise more than one component, as in MRI, the signal from each voxel can be characterized as a signal vector in a signal space having a dimension equal to the number of components comprising each signal vector. In magnetic resonance imaging, three components of interest are typically selected to describe the characteristics of the region of interest being imaged. These components are the spin-lattice relaxation time $T_1$, the spin-spin relaxation time $T_2$, and a spin density for hydrogen. The components of the signal vectors are assumed to form a set of basis vectors which span the signal space for all regions of interest within the object being inspected. This assumption is not always true since the individual components of the signals are often correlated, i.e., not independent. For instance, in magnetic resonance imaging, the proton density is related to the values of the times of relaxation $T_1$ and $T_2$. An increase in water content not only increases the hydrogen density, and hence the proton density, but it also increases the times of relaxation, $T_1$ and $T_2$. The proton density and relaxation times $T_1$ and $T_2$ do, however, form a good approximation to a basis for a three dimensional signal space. Thus, the signal from a voxel within the region of interest is mapped into a 3-dimensional vector in the signal space. The magnitude and direction of each vector is determined by the intensity of the signals corresponding to each of the three components. Other components may also be considered in MRI, such as microscopic diffusion and microscopic rotational states of the resonant nuclei.

An image corresponding to the signal values of the voxels can be displayed, for example, on a standard CRT in digital format. The image is partitioned into a set of picture elements called pixels, there being a one-to-one correspondence between the voxels of the region of interest to be imaged and between the pixels of the displayed image. The displayed image is obtained by assigning a value, for instance a grey tone or a color, to each pixel. The grey tone or color of each pixel is determined by the properties of the signal vector associated with its respective voxel in the region of interest. In an ideal case, all voxels which represent the same physical characteristic of the object, for example, a particular type of tissue in medical imaging, should be associated with the same point in signal space. However, imaging devices are not ideal and various sources of noise result in the same type of tissue being associated with a distribution of signal vectors in signal space. Additionally, two different types of tissue, for example grey matter brain tissue and white matter brain tissue, may have signal vectors which are very similar. Thus, one of the key objectives in imaging technology is to characterize every significant domain in the region of interest (also referred to as "ROI") to be imaged so that distinct domains are distinguished in the displayed image, even if their respective signal characteristics are similar.

This problem of characterization of a specific subregion is rendered even more difficult by the presence of noise in the signal. Two types of noise are present in most signals: electronic noise and biological noise. The effects and properties of electronic noise are well understood and standard techniques have been developed to deal with it in imaging. The electronic noise is usually considered to be a random variable. As subregions of the region of interest are represented by a multi-dimensional distribution within the signal space, it may occur that those distributions for various subregions may overlap. This creates a problem in the identification of a grid pattern for a digitized subregion insofar as two subregions having similar characteristics may not be sufficiently contrasted in the final output image.

Various imaging techniques have been proposed to enhance contrast and circumvent the problem set forth above. The methods known to date for displaying image corresponding to certain signal characteristics fall into two major categories. In a first approach, the image is partitioned into a finite set of segments. This method, known as image segmentation, has been extensively used. In a second method, known as continuous grey-scale imaging, a grey value is assigned to each pixel in accordance with the intensity of the signal vector. Both of these techniques have various drawbacks that will now be briefly discussed.

The objective of the segmentation method is to group together voxels and produce an image by assigning a color to each of these groups. In a proposed segmentation method, the signal data are clustered into groups with similar signal characteristics. A distinct uniform color is then assigned to each of the clusters having the same signal characteristics. Recently, there has been an increased interest in a data clustering algorithm called fuzzy c-means clustering. By definition, a fuzzy set U is a function from a subset of $R^p$ into the interval [0,1] which assigns to each element of the subset X a grade of membership. The membership function is a function valued between zero and one and is a key concept of fuzzy sets. In this method, a signal vector having p components in the signal space is assigned to each of the voxels. The values of the components of the vector are the pixel intensities of the acquired images. The calculation of the membership function determining to which cluster a particular voxel belongs requires the definition of a distance metric. Typically, this distance metric is chosen to be the simple Euclidean distance in the signal space. The clustering begins by then randomly choosing a set of c-cluster centers $v_i$ within the signal space and defining a membership function $u_{ik}$ which would give the membership grade for the pixel k being a member of the fuzzy cluster i. Cluster centers are thereby redefined, and the procedure is iterated until the movement of cluster centers is made as small as possible. Pixels are assigned to clusters based on which of the c-membership functions is largest. One drawback of this algorithm is that the number of c clusters is arbitrarily chosen. Typically, the number of clusters is deliberately chosen to be higher than the expected number of individual subregion types.

Several methods are of interest to implement this algorithm. A first method called hierarchical processing using pyramid algorithms has turned out to be a valuable method because it allows the image to be examined at several levels of resolution at one time. The person skilled in the art will be able to find a thorough description of such a method in the following article: "Tissue Type Identification by MRI Using Pyramidal Segmentation and Intrinsic Parameters," Ortendhal Douglas, et al., *Proceeding of the Ninth International Conference on Information Processing in Medical Imaging*, Washington, D.C. (1985). In a second method, shape descriptors are used for identifying regions of suspected partial volume averaging. In a third method, histogram analysis can also be advantageously used as a form of gray level statistics. In this histogram method, the signal values are plotted in histograms according to their frequency of occurrence. However, in this histogram equalization method, the voxels are first assigned a gray level value which is then plotted in a histogram according to the frequency of occurrence. Such a histogram is therefore referred to as a gray level histogram. A summary of these segmentation methods can be found in: Ortendhal D.A., et al, *MRI Image Segmentation Using Fuzzy Set Clustering and Spatial Correlations.* "Book of Abstracts", Society of Magnetic Resonance in Medicine, 6th Annual Meeting, Aug. 17-21, 1987; and in Sklansky J., et al: Image Segmentation and Feature Extraction, IEEE Transactions on Systems, Man and Cybernetics, Vol. SMC-8, No. 4, Apr. 1978. In another proposed segmentation method, a boundary is drawn in the image whenever signal variation between two neighboring voxels is greater than a preset threshold. The drawback of this segmentation method still resides in the arbitrariness of the selection of the threshold. Numerous other ways of partitioning the image have also been proposed without resolving the inherent problems entailed by segmentation of an image.

The main disadvantage of the segmentation method remains in the arbitrariness of the clustering of the image, irrespective of the technique used to perform the segmentation itself (fuzzy set, threshold,...). More specifically, in the clustering algorithm, there is no way of determining what number of clusters should be used for partitioning the region of interest to be imaged. This also applies to the choice of the threshold. Since the threshold value or the number of clusters is arbitrary and the color assignment discontinuous, errors in the color segmentation are likely to occur. In particular, voxels of distinct domains having similar signal values may be represented by the same color. Several patents make use of the segmentation method or a refinement thereof.

Reference is first made to the Watanabe patent, U.S. Pat. No. 3,805,239. In the Watanabe patent, there is disclosed an apparatus comprising a memory device for storing in matrix format electrical signals corresponding to the gray levels of the respective picture elements of a pattern. In this apparatus, the differences between gray levels of a central picture element and of eight surrounding picture elements are determined in order to obtain some of the differences between the central picture element and the surrounding picture elements. These differential sums are then added up for each matrix containing a given picture element. After completing such additions with respect to numerous matrices in which different picture elements constitute the central one, the gray level of the picture element taken as the central one and which gives a maximum value from among the totals of differential sums thus computed is then detected. There is also provided a device for reading out of the memory device data on a prescribed gray level higher or lower than the gray level of maximum value which is used as a threshold value.

Another patent, U.S. Pat. No. 4,340,911 to Kato also uses the segmentation method. In this patent, the densities of three different tissues are plotted in a histogram. The three peaks corresponding to the frequency distribution of those three tissues are used to determine the threshold values necessary to produce the desired gradation of the image. Boundary levels are then determined to perform the gradation processing. Contrast between two tissues can be raised by lowering the level of the minimum density of the image corresponding to one of the tissues, down to the level of the fog density of the image.

The patent to Toraichi (U.S. Pat. No. 4,538,227) also uses the segmentation technique. In the Toraichi patent, the image processor obtains information about an organ to be imaged such as the boundary diagram, the volume, the centroid movement view and a three-dimensional view. The gray level values of given X-ray projections are plotted in a histogram. The extraction of the image boundary from the provided processed image is thus accomplished by segmenting a given image into a plurality of small regions, forming the small regions into ternary coded signals in comparison with thresholds $K_1$ and $K_2$ which are determined by the histogram of the gray scale of the gray level values.

Another approach to image processing consists in assigning a gray scale value to each of the pixels mapping into the voxels of the region of interest, whereby the intensity of the gray value is a function of the signals emitted by the voxels. This imaging technique, referred to as continuous gray scale imaging, is widely used. The basics of this method will now be briefly summarized.

A gray scale is by definition a one-dimensional real number line. To each voxel in the image, there is assigned a real value corresponding to a gray scale value. Actually, the grey scale is a discrete set of grey tones, but the assumption that the grey scale is a continuous scale is legitimate to a first approximation. As the signal space is typically a multi-dimensional space and the gray scale value a one-dimensional space, the mapping from the signal space into the gray scale real number line is necessarily not homomorphic. Projections from the signal space into the gray real number line are typically used to perform the grey value assignment.

In the projection method, a gray scale value is assigned to each pixel corresponding to the value of the signal vector projected onto a preselected axis, usually a coordinate axis. When a coordinate axis is chosen as a projection axis, the projection technique amounts to projecting the signal vector onto one of the signal basis vectors, and then assigning a gray scale value corresponding to the amplitude of this projection on the projection axis. A voxel is thus associated with a scalar which is associated to a particular gray value. In most current projection techniques, this projection is performed without further modulation by the mapping between the region of interest and the signal space. The projection method yields satisfactory images of distinct domains which are also spatially disjoint. However, such a method fails to discriminate between neighboring regions having similar signal values and spatially close to one another. The output image exhibits "poor contrast".

The concept of contrast is essential in image processing and is defined as the difference in the gray scale values assigned to two distinct voxels. In the projection method, the contrast is therefore dependent upon the distance between the two points in the signal space to which the two voxels are initially mapped. Thus, if the two voxels that are mapped have similar characteristics, more specifically, if the values of the projections of their corresponding signal vectors are nearly equal, the distance on the projection axis in the signal space between the two mapped voxels will be small. As the contrast depends on the difference between the two gray scale values, two voxels having similar signal characteristics are poorly contrasted in the projection method. To enhance the contrast between two subregions which map to nearby points in the signal space in a particular imaging technology, it becomes necessary to resort to other imaging technologies (e.g. use of pharmacological agents, etc).

The following example, taken from Nuclear Magnetic Resonance Imaging, clearly illustrates the foregoing analysis. In NMR imaging, three parameters are associated to each voxel. Three projections can thus be envisioned, corresponding to each of the coordinate axes and leading to three images. In each of these images, every voxel on each of the axes $T_1$, $T_2$ (spin-lattice relaxation and spin-spin relaxation time, respectively) and the proton density $\rho$ is assigned a gray scale value. The first image is a representation of the region of interest mapped according to the first type of relaxation $T_1$. Two voxels having different times of relaxation $T_1$ are therefore represented by two different gray values. This also applies to the second image produced in accordance with the second coordinate, $T_2$, and the third image obtained from the proton density $\rho$ (the "proton image"). As discussed above, the contrast between neighboring voxels having similar signal characteristics is poor as the contrast depends on the distance chosen in the signal space. Furthermore, the analysis of three images requires special skills as the user is required to synthesize three types of images in order to draw conclusions for a diagnosis. In order to facilitate the reading of those images, a method has been disclosed entitled Hybrid Color MR Imaging Display and disclosed in the article: Weiss, et al. "Hybrid Color MR Imaging Display," *AJR:* 149: October 1987. In this method, two images are synthesized into one image. A two-dimensional resolvable contrast scale uses the pixel intensity from one image and the pixel luminance of the other image. The pixel intensities from one image are assigned varying special hues whereas the luminance of these hues is derived from the intensities of the corresponding pixels of the second specially aligned image. This technique, however, does not produce a sharp contrast between neighboring voxels of similar intensities but made of different subregions.

It should be noted that in the imaging techniques proposed so far, smoothing operations are used to diminish spurious effects that may be present in the digital image as a result of a poor sampling system or transmission channel. In other words, these techniques already assume that a gray level image has been obtained by projecting or by segmenting the region to be processed in accordance with the signal characteristics of the other voxels.

SUMMARY OF THE INVENTION

The present invention discloses a method for processing an image comprising a plurality of pixels representing a region of interest partitioned into a plurality of voxels. This method comprises the step of providing a plurality of multidimensional signals, each of the signals being associated with each of the voxels, the plurality of voxels being mapped into the plurality of signals in a signal space by a mapping M, the step of computing a density function representative of the frequency of occurrence of each of the multidimensional signals in the signal space and the step of assigning a tone value to each of the plurality of voxels in accordance with the density function.

In accordance to the present invention in a second aspect, there is disclosed a method for processing an image comprising a plurality of pixels representing a region of interest partitioned into a plurality of voxels, comprising the step of providing a plurality of multidimensional signals, each of the multidimensional signals comprising a plurality of parameters containing information about the region of interest, each of the signals being further associated with each of the voxels, the plurality of voxels being mapped into the plurality of signals in a signal space by a mapping M, the mapping M being a multidimensional random variable having a density function. The method further comprises the step of computing the density function representative of the frequency of occurrence of each of the multidimensional signals in the signal space, the step of convolving the density function with a resolution function so as to provide a real valued probability density function defined for each of the plurality of voxels, the step of assigning a tone value to each of the plurality of voxels corresponding to the value of the probability density function for each of the voxels and the step of displaying a tone level image wherein each voxel is represented by a pixel with the assigned tone value. Preferably, the convolving step comprises the step of convolving a Gaussian function of mean zero and variance $\sigma$ with the density function. The Gaussian ideally has a variance $\sigma$ equal to or greater than the variance $v$ of the density function of the signal mapping M. The variance $\sigma$ of the Gaussian is preferably a multiple of the variance $v$ of the density function of the signal mapping M. The variance $\sigma$ advantageously defines the resolution of the image in the signal space, whereby high values of the variance $v$ with respect to the variance $\sigma$ produce a low resolution image in the signal space and whereby low values of the variance $v$ with respect to the variance $\sigma$ produce a high resolution image in the signal space.

Desirably, the image has a contrast defined by the tone value and the signal space is defined with a metric, the contrast between two voxels of the plurality of voxels being independent on the metric in the signal space.

The convolving step may also include the step of convolving a cosine function, a pulse function having a width $\sigma$, a sinc function or an exponential function with the density function of the mapping M. More generally, the resolution function may be a filter function.

In the method of the present invention, the density function is preferably given by the following formula:

$$H_o(s) = \sum_w \delta(s - M(w)), \quad (1)$$

wherein $\delta$ is the Delta function.

The convolution product is preferably performed using Fourier transforms. It is advantageous that the convolution product is performed using Fast Fourier transforms.

In the method of the present invention, the probability density function is preferably given by the following equation: $H_\sigma(s) = G_\sigma(s) * (H_o(s))$, wherein * denoted the convolution product, $G_\sigma(s)$ represents the distribution function and $H_o(s)$ represents the density function of the mapping M.

The image produced by the method of the present invention may be a medical image. The signals may be NMR signals, obtained by computer tomography or obtained from X-ray projections of the region of interest. The tone value is preferably a grey value. It can also be a color. The step of assigning a tone value may be performed by segmentation.

The convolving step is also possibly performed by using a multidimensional resolution function so as to obtain a single image incorporating the information from all of the plurality of parameters. The convolving step may also be performed by using a plurality of unidimensional resolution functions so as to obtain a plurality of images corresponding to each of the parameters of the multidimensional signals in the signal space.

According to the invention in a second aspect, there is disclosed a method for processing an image comprising a plurality of pixels representing a region of interest partitioned into a plurality of voxels. This method comprises the steps of providing a plurality of multidimensional signals, each of the signals being associated with each of the voxels, the plurality of voxels being mapped into the plurality of signals in a signal space by a mapping M, the mapping M being a multidimensional random variable and defining a probability measure in the signal space, the step of computing the Radon-Nikodym derivative of the probability measure of the mapping M, the Radon-Nikodym derivative defining a probability density function assigning a tone value to each of the plurality of voxels corresponding to the value of the probability density function for each of the voxels and the step of displaying a tone level image wherein each voxel is represented by a pixel with the assigned tone value.

The present invention also discloses an apparatus for processing an image comprising a plurality of pixels representing a region of interest partitioned into a plurality of voxels, the apparatus comprising an input imaging device for providing a plurality of multidimensional signals, each of the signals being associated with each of the voxels, the plurality of voxels being mapped into the plurality of signals in a signal space by a mapping M, the mapping M being a multidimensional random variable and defining a probability measure in the signal space, means for computing the density function representative of the frequency of occurrence of each of the multidimensional signals in the signal space, means for convolving the density function with a resolution function so as to provide a real valued probability density function defined for each of the plurality of voxels, means for assigning a tone value to each of the plurality of voxels corresponding to the value of the probability density function for each of the voxels and means for displaying a tone level image wherein each voxel is represented by a pixel with the assigned tone value.

According to the invention in another aspect, there is disclosed an apparatus for processing an image comprising a plurality of pixels representing a region of interest partitioned into a plurality of voxels, the apparatus comprising an input imaging device for providing a plurality of multidimensional signals, each of the signals being associated with each of the voxels, the plurality of voxels being mapped into the plurality of signals in a signal space by a mapping M, the mapping M being a multidimensional random variable and defining a probability measure in the signal space, means for computing the Radon-Nikodym derivative of the probability measure of the mapping M, the Radon-Nikodym derivative defining a probability density function, means for assigning a tone value to each of the plurality of voxels corresponding to the value of the probability density function for each of the voxels and means for displaying a tone level image wherein each voxel is represented by a pixel with the assigned tone value.

The present invention also discloses an apparatus for processing an image comprising a plurality of pixels representing a region of interest partitioned into a plurality of voxels, the apparatus comprising an input imaging device for providing a plurality of multidimensional signals, each of the signals being associated with each of the voxels, the plurality of voxels being mapped into the plurality of signals in a signal space by a mapping M, the mapping M being a multidimensional random variable and defining a probability measure in the signal space, means for computing the density function representative of the frequency of occurrence of each of the multidimensional signals in the signal space means for assigning a tone value to each of the plurality of voxels corresponding to the value of the probability density function for each of the voxels and means for displaying a tone level image wherein each voxel is represented by a pixel with the assigned tone value. The input imaging device may be a NMR device, an X-ray camera or a CT device.

BRIEF DESCRIPTION OF THE DRAWINGS

A better understanding of the present invention may be had from a consideration of the following detailed description, taken in conjunction with the accompanying drawings.

FIG. 4 represents a histogram obtained by classifying the various voxels of the image represented in FIG. 1 according to the method of the present invention;

FIG. 7 illustrates another example of convolution product wherein the Gaussian function convolved has a larger standard deviation $\sigma_2$;

FIG. 14 is a representation of the grey-level scale $H_\sigma(s)$ wherein the distribution function has been convolved with a Gaussian function having a small variance;

FIG. 16 is a representation of the grey-level scale $H_\sigma(s)$ wherein the distribution function has been convolved with a Gaussian function having a high variance;

FIG. 18a represents a schematic grid of voxel wherein each voxel has been assigned a particular signal value;

FIG. 18b is a histogram of the signal space mapped from the grid of voxels represented in FIG. 18a;

DETAILED DESCRIPTION OF THE INVENTION

A. Theoretical Background

Figure 1:
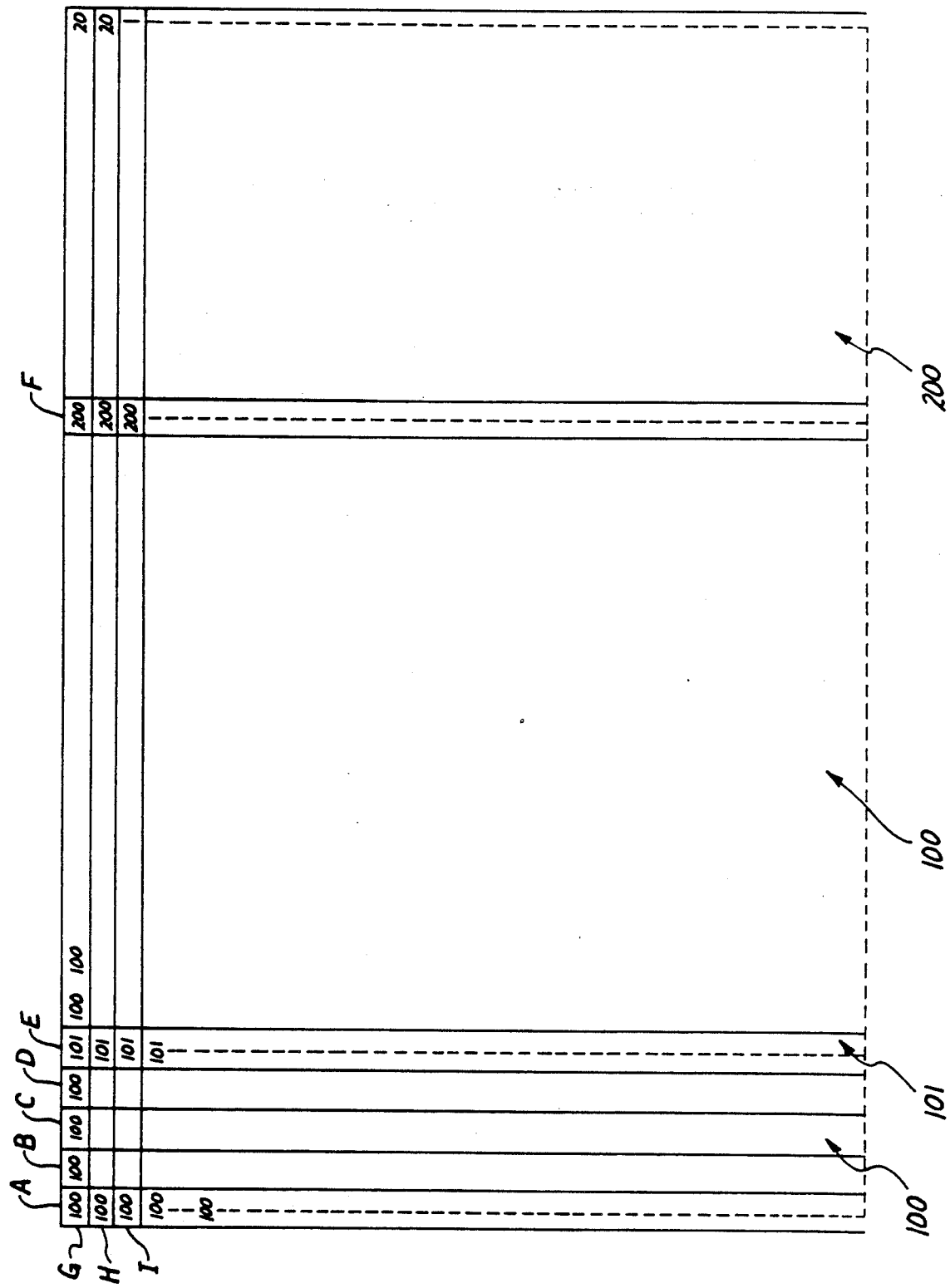
FIG. 1 schematically represents an artificially generated region of interest to the image, partitioned into a plurality of voxels.

The method and apparatus of the present invention are based on an imaging technique which may be explained by using the mathematical principles set forth hereinbelow. A mathematical analysis of the present invention is well suited to describe the present invention but should not be construed as limiting the invention. The underlying mathematical principles relied upon to explain the present invention use certain definitions which will now be described in more detail.

In an imaging technique, a region of a 3-dimensional space, referred to as a region of interest, is typically partitioned into a set of volume elements called voxels. This set of voxels is denoted V and is a subset of the Euclidean space representing the region of interest. For example, in medical imaging, this region is a portion of a body, typically a tissue whose image analysis may lead to a diagnosis. Physically meaningful signals are associated with the points comprising this region. These signals are averaged over each voxel of the region of interest (referred to as "ROI" hereinafter) and form a set of vectors in a signal space denoted S. Each of these signal vectors comprises n independent physical variables corresponding to the number of parameters that current imaging technologies are capable of computing for each volume element of the ROI in the voxel space V. For example, as mentioned above, standard MRI uses three physical variables: proton density, spin-lattice relaxation time $T_1$ and spin-spin relaxation time $T_2$.

The output of a specific imaging technology, referred to as an image, is defined to be a real valued function:

$$F : V \rightarrow R \quad (2)$$

where R is the set of real numbers.

In imaging techniques using a continuous grey-scale, the real line R is associated with an arbitrary gray-scale. In other words, a gray value is assigned to each voxel of the set V corresponding to the values of the signal vector associated with this voxel. Although a grey-scale is typically used in prior art imaging methods and also in the method of the present invention, it will be understood by those skilled in the art that another scale can be used such as a color scale.

An imaging technology is defined to be a mapping M:

$$M : V \rightarrow S \quad (3)$$

wherein S is the "signal space" spanned by the n independent physical variables of the imaging technology.

The object of an imaging technology is to produce images f using the mapping M. Standard imaging techniques will now be revisited using the mathematical formalism hereabove defined.

1. Standard Imaging Techniques a. Projection Imaging Method

As mentioned above, traditional imaging generally performs a projection $P_i$ of M onto some axis in the signal space S. This projection $P_i$ is defined as follows:

$$P_i : S \rightarrow R \quad (4)$$

$$\forall (x_1, \ldots, x_n) \in S, P_i(x_1, \ldots, x_i, \ldots, x_n) = x_i \quad (5)$$

If n projections are performed, respectively corresponding to each of the axes of the signal space S, a set of n images can be obtained. The images are defined as follows:

$$\forall i = 1, \ldots, n, f_i: V \xrightarrow{M} S \xrightarrow{P_i} R \quad (6)$$

$$\forall i = 1, \ldots, n, f_i = P_i \circ M \quad (7)$$

The sign o denotes the composition of two functions. By definition, $P_i \circ M$ is read "$P_i$ composed with M" or $P_i[M(.)]$.

Therefore, the only images that the projection imaging technology can provide are the set of functions $\{P_i \circ M\}$. The contrast of an image is defined to be the gray-scale value difference $r_1-r_2$ corresponding to two voxels $v_1$ and $v_2$ of the region of interest V. An imaging technology is all the more precise and informative if the contrast is high for neighboring voxels $w_1$ and $w_2$ having similar signal characteristics.

In the projection method, the contrast $r_1-r_2$ is given by the following equations:

$$r_1-r_2 = (P_i \circ M)(w_1) - (P_i \circ M)(w_2) = P_i(s_1) - P_i(s_2) \quad (8)$$

$$r_1-r_2 = \|s_1-s_2\| P \quad (9)$$

and is, thus, a function of the metric between the signals corresponding to voxels $w_1$ and $w_2$ in the signal space S. $\| \ \| P$ denotes the metric defined on S using the projection $P_i$. Accordingly, voxels of the space V having nearly equal projected signal values and physically proximate to one another have poorer contrast despite the fact that they may have entirely distinct signal space characteristics. This is particularly relevant in medical imaging where biologically distinct tissues having similar physical characteristics are poorly contrasted in a traditional projection imaging method (e.g., a tumor within healthy tissue).

There exists other variants of the projection method. More specifically, the projections from the signal space S to the real number line R can be performed by projecting on any axis of the signal space, and not primarily the set of orthogonal axes corresponding to the n physical components of the signal vector. In a three-dimensional space, this axis can be the diagonal of a cube defined by the basis of orthogonal vectors defining the signal space S. In this approach, however, the contrast is still dependent on the distance between points in the signal space S. The only advantage of this generalized projection technology is to incorporate in one image meaningful information about the region of interest which is derived from more than one physical variable.

b. Segmentation Method

In a first proposed segmentation method, the voxel space V is partitioned into a set of regions according to a change of gradient in the signal space S. In a second proposed segmentation method, the signal space S is partitioned into a set of disjoint regions so that all points in the space V mapping to a particular set of the partition receive the same value, generally, the same color in the final image of V. Mathematically, a homeomorphism is defined between the partition of S and the set of colors C, as summarized hereinbelow:

$$V \xrightarrow{M} S \xrightarrow{\text{Partition}} \{s_i\} \longrightarrow \{c_i\} = C \quad (10)$$

The partitioning of the signal space S is performed by grouping particular subsets of the signal space with respect to particular physical characteristics of a single type. Two different subsets of the partitions are assumed to represent different properties. Typically, a subset of the partition is assigned a range of values above a preset threshold. In the above equation (10) representing the partitioning of the signal space S, the partition function is arbitrarily chosen so that there is, in general, no meaningful assurance that the number of disjoint regions produced by the partitioning function is neither too large nor too small. Furthermore, unless the segmentation is perfect, some points of the space V are inappropriately colored because, by definition, the mapping from S to C is discontinuous. Finally, the segmentation algorithm, which relies on the use of selection criteria which are not necessarily dictated by physical reality, must produce, or be told to produce, some particular finite number of elements which together constitute the partition of S.

2. Underlying Principles of the Present Invention

The mathematical formalism used hereabove in the description of prior art imaging technologies may also be used to describe the method of the present invention. Some concepts need to be further defined. In particular, the gray-scale values of the real number line R are also mapped into a set of pixels P, which is a set of picture elements of the final image mapping into the region of interest. The following functional equation summarizes the relationships between all these different sets.

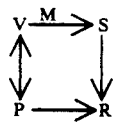
(11)

In this functional representation, there is a homeomorphism between the set of pixels and the set of voxels of the region of interest. In other words, to each voxel of the space V, there is assigned one and only one pixel of the set of pixels P. In the following specification, the image will still be defined as being a function from the space consisting of voxels V into the real number line R. However, it should be understood that the actual image should be defined to be a mapping between the set of pixels P and the real number line R.

The method of the present invention is directed to a particular image function from the space V to the real number line R using a specific mapping M from V to S. The domain of the mapping M is defined by a discrete set of disjoint voxels $\{w_i\}$, $i=1,\ldots N$ whose union equals the entire space V. Typically, these voxels are of equal volume (i.e., $1/N$ if the volume of the region of interest is normalized).

If the number N of voxels is sufficiently high, the space V can be considered to be an uncountable set of points. The spaces V and S are assumed to form measurable spaces with the Borel algebras of subsets of V and S respectively. These measurable spaces are respectively noted (V, V) and (S, S). A family A of subsets of a set X forms a Borel algebra of subsets when it satisfies specific axioms. These axioms can be found in the following reference: Shiryayev A. N., *Probability*, Springer-Verlag, New York, 1984, pages 131–141.

The measurable spaces (V, V) and (S, S) are defined to be measured spaces if they are provided with a positive measure. Typically, the normalized Lebesgue measures $\lambda_V$ and $\lambda_S$ are chosen and measure the volumes of subsets of V and S respectively. The mapping M, defined as M: V → S, is defined to be measurable when the Borel set $V_g$ which it generates is a sub-Borel set of V.

$$V_g = M^{-1}(S) \subset V \quad (12)$$

The set mapping $M^{-1}$ is defined by:

$$\forall E \in S, \; M^{-1}(E) = \{w \in V : M(w) \in E\} \quad (13)$$

In other words, the mapping M is measurable if the inverse image:

$$M^{-1}(S) = \{w : M(w) \in S\} \quad (14)$$

is a measurable set in V. Definitions of measurable sets, measurable mappings and measure can be found in the aforecited textbook by Shiryayev.

The image of the measure $\lambda_V$ through the mapping M is the measure $\mu$ defined over the measurable space (S, S) by:

$$\forall E \in S, \; \mu(E) = \lambda_S(M^{-1}(E)) \quad (15)$$

for E any Borel subset of S.

It should be noted that it is necessary that the mapping M be measurable for the sets $M^{-1}(E)$ to be measurable. Two positive measures $\lambda_S$ and $\mu$ are thus defined over the measurable space (S, S). The assumption on the mapping M (measurable mapping) implies that the measure is absolutely continuous with respect to the measure $\lambda_S$. This assumption on M amounts to ensuring that the mapping M does not map sets of non-zero measure to sets of measure zero. Therefore, according to the Radon-Nykodym theorem, there exists a real measurable function h defined almost everywhere over S such that:

$$\forall E \in S, \; \mu(E) = \int_E h \, d\lambda_S \quad (16)$$

This function h is the density of the measure $\mu$ with respect to the measure $\lambda_S$. The function h is also called the Radon-Nikodym derivative of the measure $\mu_s$ and is denoted by:

$$h = \left[\frac{d\mu}{d\lambda_S}\right] \quad (17)$$

For real valued measurable functions f with domain S, the Lebesue integration change of variable formula becomes:

$$\int_V (f \circ M)(w) d\lambda_V(w) = \int_S f(s) d\mu(\sigma) = \int_S f(s) \left[\frac{d\mu}{d\lambda_S}\right] d\lambda_S(s) \quad (18)$$

This result generalizes the well known change of variable formula well know in calculus.

The Radon-Nikodyn Derivative h (RaND) has several pertinent interpretations. In a first approach, the RaND h is assimilated to a generalized Jacobian. The Jacobian of the mapping $f^{-1}$ which is the inverse function of f: $R^n \rightarrow R_{nu\,n}$ is defined as:

$$J = \begin{vmatrix} \frac{\partial f_1}{\partial y_1} & \cdots & \frac{\partial f_1}{\partial y_n} \\ \frac{\partial f_n}{\partial y_1} & \cdots & \frac{\partial f_n}{\partial y_n} \end{vmatrix} \quad (19)$$

where the inverse mapping $f^{-1}$ is defined by:

$$(y_1,\ldots,Y_n) \rightarrow (x_1 = f_1(y_1,\ldots,Y_n),\ldots,X_n = f_n(y_1,\ldots,y_n)) \quad (20)$$

The RaND is however only a generalized Jacobian as the mapping M is generally not a one-to-one mapping. Furthermore, the dimensions of V and S are not equal in general. Finally, the metric properties of V are irrelevant and need not be defined (i.e. there is no physically meaningful relationship between a metric in V and a metric in S).

A probabilistic interpretation of the mapping M is also possible. M can be considered as an n $R^n$-valued random variable defined over the space V. The new measure $\mu$ induced by the Lebesgue measure on V, $\lambda_V$ and the set mapping $M^{-1}$ and defined by equation (15) implies that $\mu(E)$ is also a probability distribution. More specifically, it is the probability that a randomly chosen element of V is mapped by M into the set E. The probability distribution of a real n-dimensional random vector $M = (M_1,\ldots,M_n)$ is defined to be the measure over the measurable space (S, S), in this case ($R^n$, $R^n$), which is the image of the measure of the space (V, V) through the mapping M. In this interpretation, (V, V, $\lambda_V$) is considered to be a probability space and $M=(M_1,...,M_n)$ an n-dimension real random vector from the space $(V, \mathcal{V})$ into the measurable product space $(R^n, \mathcal{R}^n)$, for $n \geq 2$. These definitions can be found in the aforementioned textbook by Shiryayev.

The measure $\mu(E)$ is thus the probability that a randomly chosen element of V is mapped by M into the set E. As to the RaND h, it is just the probability density of the random vector M at each point of S. The probability density of a random vector M, usually denoted $p_M$ is a real positive function defined over the space $R^n$. It is measurable and integrable with respect to the Lebesgue measure, its integral being equal to one. The probability that the random vector M takes a value belonging to a Borel set $E \in R^n$ is therefore:

$$\text{Prob } \{M \in E\} = \int_E p_M(x_1,...,x_n) \, dx_1...dx_n \quad (21)$$

$$\text{Prob } \{M \in E\} = \int_E h(x_1,...,x_n) \, dx_1...dx_n \quad (22)$$

An image was previously defined as a functional mapping from V to R. Following the functional equation:

$$f: V \xrightarrow{M} R^n = S \xrightarrow{h} R, \quad (23)$$

the image f can be written: $f = h \circ M$.

The image function obtained by the product $h \circ M$ is thus based on the density of voxels having a predetermined value in the space S. If a grey-scale transformation function is further composed with the function h, it is thus possible to assign a grey tone to each voxel of the voxel space V. The correspondence between pixel-voxel finally produces an image wherein a grey tone is assigned to a pixel in accordance with the density h.

The gray-scale assigned by the function $h \circ M$ is thus simply determined by the relative volume the particular subset of interest of the Borel algebra of subsets occupies in V. The more popular a region in S mapped by M from voxels of the space V, the higher the probability density in this region and the higher the gray value assigned to this particular subset of voxels. The image $h \circ M$ assigns bright or dark gray values to a voxel of the space V depending upon the number of other voxels which map to the same subset in S. The contrast between two voxels is thus independent of the "distance" between the signals assigned to these voxels (in other words, the metric used in S) and only dependent on the difference in probability, i.e., the probability density of the random vector M at each point of the signal space S, in other words the relative volume of voxels of that type in the space V. Contrast may thus be very high between two neighboring subregions of interest of similar signal characteristics having a significantly different probability density. In standard imaging techniques, the contrast of two subregions of interest having similar signal characteristics is very poor if these subregions are close in the space V. In the imaging methods of many prior techniques, contrast depends on the metric used in the signal space S and is determined solely by the distance between the points in S that the two subject subregions of interest are mapped to by M.

Situations may exist in which the image in accordance with the present invention, $h \circ M$, provides poorer contrast than in standard images. An extreme example of this case is obtained when the volume of two subregions of interest in the space V happens to be identical. In this case, there is no contrast between the two subregions of interest, as the probability density of the voxel forming the subregion of interest is identical for the two subregions. The present invention, however, provides various ways of decreasing the likelihood of such occurrences. For example, one way of decreasing the likelihood of such occurrence would be to simultaneously compute another function RaND h, image with half the field of view.

Those skilled in the art will also recognize that the present invention processes images in a fashion which is quite different from most standard imaging techniques. Traditional imaging methods perform a "local" analysis of the region to be processed (projection method) or at least a semi-global analysis (segmentation method). In the projection method, in particular, the image, $P_i \circ M$ is a "local" kind of characterization, that is, the gray-scale value assigned to a voxel of the set of the space V is determined by the value mapped by M exclusive of what the mapping M does to the rest of the voxels of the space V. In segmentation methods, the imaging technique can be characterized a semi-global (grouping of voxels according to a change of gradient or clustering of neighboring voxels of a predetermined signal). In the present invention, however, the image $h \circ M$ utilizes information from the entire mapping M before the gray-scale value is assigned. The appearance of the image at each point is therefore determined by global properties of M rather than local properties as in standard imaging techniques.

The present invention can therefore be characterized as a non-metric image, insofar as only the measure theoretic properties of M are used in the image so as to provide contrast in the image of the space V, rather than the metric properties of the signal space. As shown hereabove, standard imaging techniques use the geometry of S, that is its metric, to provide contrast in the image of V.

The foregoing description assumes that the number of voxels is sufficiently high so that the space of voxels can be considered to be a continuous space. The above results derived for the continuous case are, however, also valid in the discrete case, i.e., when the space V is considered as a discrete set of voxels (denumerable set) as is shown in the following analysis.

In this analysis, the mapping $M: V \to S$ is considered to be a S-valued random variable. The distribution $\mu_o(E)$ is defined to be the probability that a randomly chosen voxel in V maps into the set E, wherein E is a subset of S. Then the density function of the distribution $\mu_o(E)$ is given by the following equation:

$$h_o(s) = \sum_w \delta(s - M(w)) \quad (24)$$

where $\delta$ is the Dirac delta function and the sum is over all voxels w in V. However, since each measured $M(w)$ has an uncertainty expressed by the standard deviation of noise $\sigma$, one can make the convention that $M(w)$ is the expectation of w. Typically, the noise is uniform and Gaussian. The probability density of each point in S following the "measurement" (or "experiment") M is thus given by the following equation:

$$h_\nu(s) = h_o(s) * [(\tfrac{1}{2}\pi)^{\frac{1}{2}} (1/\nu) exp(-s^2/2\nu^2)] \quad (25)$$

wherein the expression "*" denotes the convolution product.

The probability density $h_\nu(s)$ measures the popularity that points in S have for voxels in V with a resolution limited by noise standard deviation $\nu$. In other terms, when M maps a voxel w to a point s, the popularity of all points increases, but significantly increases only within roughly a radius of $\nu$ around the signal s. One may also consider a probability density for $\sigma > \nu$. In this case, the probability density is given by the following equation:

$$h_\sigma = h_o * [(\tfrac{1}{2}\pi)^{\frac{1}{2}}(1/\sigma)\exp(-s^2/2\sigma^2)] \qquad (26)$$

This gauges the popularity of points in S but with a coarser resolution $\sigma$.

One may now form the image $h_\nu \circ M : V \rightarrow R$. Under the convention that two subregions in the voxel space V are the same if and only if they map to the "same place in S," the property imaged is the total volume that the subregion occupies in V— i.e., the intensity assigned to a voxel is given by the total volume of that subregion that is found in the entire image. The expression "same place in S" is defined by the standard deviation $\nu$. One may also form the images $h_\sigma \circ M$, in which case the definition of what constitutes the same subregion is considerably broader. For example, if the variance $\sigma$ is large enough, all subsets having the same physical properties but in fact mapping to slightly separated places in S are counted as the same subregion. For a smaller value of $\sigma$, these same subsets may not be counted as the same region. Selection of $\sigma$ therefore determines a desired signal space resolution.

For selection of $\sigma$ near $\nu$, the grey value assignment is independent of the metric in S. For larger values of $\sigma$ the grey value assignment becomes dependent partially on the metric. As $\sigma$ tends to infinity it can be shown that image contrast essentially reduces to the same contrast to noise ratio as standard imaging. A more thorough analysis of contrast-to-noise ratio will be given hereinafter.

It should be understood by those skilled in the art that image contrast in the present invention is derived by using fundamental properties of the mapping M which are not based on the metric in S in contrast to standard imaging techniques. There is no "physical" reason to base an imaging method on this metric, since it is well known that entirely different subregions may be mapped to very nearby regions in the signal space S. According to the present invention, $h_\nu$ is the Radon-Nikodym derivative of a measure $\mu_\nu$ induced by M. This structure is a generalization of the Jacobian of a mapping and is a gauge of how M maps "volumes into volumes." It results in a more general and powerful imaging method than simply using metric properties of S to derive contrast.

The foregoing analysis regarding the theoretical foundations of the method of the present invention and more specifically the extension of the continuous case where V is a non-denumerable space to the case where V is a denumerable space was intuitively derived. The following analysis sets forth the basis of this extension and demonstrates in more rigorous terms how equation (26) is derived.

The space V is now considered to be a discrete set of voxels $\{w_i\}$. The above definitions regarding the image f and the mapping M are still valid. However, to indicate that the mapping M is discrete, it will be noted by the subscript d, as in $M_d$. $M_d$ is thus a discrete mapping between the set of voxels $\{w_i\}$ and the signal space S. The space (S, S) is still a measurable space as S is a non-denumerable set. Each voxel $w_i$ can be mapped into the original space S by means of a n-random vector $M_d(w_i)$, denoted $M_d{}^i$. Furthermore, $M_d$ can be thought of as a stochastic process over the set $\{w_i\}$ with $M_d = s_d + \nu_d$ wherein $s_d$ is the true signal and $\nu_d$ the noise of the signal. Therefore, for each $w_i$, $M_d(w_i)$ is a random variable. In reality, $M_d(w_i)$ is the sum of a large number of signals. For example, in MRI, this corresponds to the number of mobile protons in each voxel. Each of these small signals can be considered a random variable and each is the sum of a "true" signal plus "noise". If $w_i$ is of small enough volume, it can be assumed that the population giving off the signals is approximately homogeneous, both in the value of the true signal given off and in the statistics of the noise. Then the Central Limit Theorem of probability theory implies that $M_d(w_i)$, as a random variable, can be approximated by a Gaussian. The Central Limit Theorem states that the sequence of random variables $(H_i, i=1,...,n)$ defined by:

$$\forall n \in N, \; H_n = \frac{1}{\sigma \sqrt{n}} \sum_{i=1}^{i=n} M_d{}^i \qquad (27)$$

has a probability distribution which tends to a Gaussian distribution with mean zero and variance unity when n tends to infinity.

In other words, the variable $\nu_d(w_i)$ is almost a Gaussian random variable with standard deviation $\sigma[\nu_d(w_i)]$, expressing the uncertainty in the measured value of $M_d(w_i)$.

The measured values $\{M_d(w_i)\}$, which can be now considered to be a particular realization process, are each the expectation of $M_d$ given that w is an element of $w_i$. This is described by the following equation:

$$M_d(w_i) = \int_{w_i} M \, d(\lambda_V \cdot N) = \int_S s \, d\mu_i \qquad (28)$$

where $S = \{s: s \in R^n\}$ and $\mu_i(E)$ is the conditional probability that $M(w) \in E$ given $w \in w_i$. The last equality follows from the change of variable formula. It can thus be derived that $(1/N) \cdot [d\mu_i / d\lambda_S](s)$ is the probability density that both $w \in w_i$ and $M(w) = s$. Since the $\{w_i\}$ are disjoint, it follows that:

$$RaND = (1/N) \cdot \sum_i [d\mu_i / d\lambda_S] \qquad (29)$$

Following the foregoing analysis in the continuous case, M can be defined so that $[d\mu_i / d\lambda_S](s)$ reflects the probability that the random variable $M_d(w_i)$ takes on the value s, so that the function $RaND(s)$ reflects the probability that $M_d$ takes in the value s for a randomly chosen $w_i$. Thus, it is natural to define M such that $[d\mu_i / d\lambda_S]$ is a Gaussian density with standard deviation $\sigma[\nu(w_i)]$. For $w \in w_i$, M is then seen to be smeared out over S, appropriately reflecting the uncertainty in the measurement of $M_d(w_i)$. The mapping M can therefore be associated with a meaningful RaND via equation (29).

It is assumed that the standard deviation is independent on the voxel and that $\sigma[\nu_d]$ can be determined from a separate "quality control" image of a uniform phantom. This phantom can simply be the background of the image. A statistical analysis of the measured voxel values is simply compared to the known uniformity of the phantom.

After computing the mean and standard deviation associated with each $[d\mu_i / d\lambda_S]$, the function RaND can be calculated and the image displayed. It should be noted that several hypotheses have been formulated. In particular, it has been assumed that the region of interest has intravoxel uniformity and that the noise is also uniform throughout the region of interest. These assumptions are however not strictly necessary but represent a convention for defining a computable RaND. Other conventions, possibly based on further detailed statistics of the images and signals, can be envisioned.

The above equation (29) can also be interpreted as a convolution between the density function $H_0(s) = \Sigma \delta(s - M_{dw}(w))$ and a Gaussian distribution $G_\nu$, also referred to as the resolution function. A convolution product is by definition given by the following equation:

$$f * g(S) = \int_S f(s-r) g(r) dr \tag{30}$$

In using the Central Limit Theorem, it has been shown that the resolution function can be approximated by a Gaussian of mean zero and of standard deviation $\sigma$. The function thereby obtained, $H_\nu$ can be interpreted as the density of the measure in the signal space S. This function $H_\nu$ is used to define the gray-scale of an image, whereby a gray-scale value $H_\nu(M_d(w))$ is assigned to a voxel w of the space V.

Instead of using the distribution function which is the convergent sum of the mappings $M_d{}^i$, other convolutions functions can be used. In particular, in a preferred embodiment of the method of the present invention, a convolution function $G_\sigma$ is used in which the standard deviation is greater than the standard deviation of the probability density derived from the noise statistics with respect to each voxel. In the resolution function, the value of $\nu$ is therefore replaced with a different value of the standard deviation, namely the value $\sigma$. In the preferred embodiment of the present invention, various multiples of the standard deviation of the noise statistics are used. The thus obtained function $H_\sigma$ gauges the density of a point in the signal space by how many of the points $M_d(w)$ is sufficiently close to. In this case, when the voxel w maps to $M_d(w)$, the whole region of S, roughly of diameter $\sigma$, increases in popularity. Thus, different voxels which map to regions of signal space within $\sigma$ units of each other will have a lesser tendency to be identified as being distant, but instead will be treated as elements of a larger region of interest. The signal space resolution of the image increases with lower values of the standard deviation $\sigma$. Reciprocally, noise in the output image can be decreased in the output image by increasing the standard deviations of the resolution function.

3. Contrast-to-Noise Ratio

The following heuristic analysis of the contrast-to-noise ratio will corroborate the intuitively derived results of the foregoing description regarding contrast-to-noise ratio.

Noise in an image, also referred to as output noise, is defined by how much the gray-scale value assigned to a voxel changes if the input signal s changes its value by the amount $\nu$. The standard deviation $\nu$ is a measure of the noise amplitude of the signal. This noise, also referred to as input noise or electronic noise, depends on the imaging technology used and on the measuring circuitry. Output noise in measure-theoretic images according to the present invention can be approximated by the following equation:

$$\text{Noise} = |dH_\sigma/ds| \cdot \nu \tag{31}$$

It results from the above equation that the output noise of an image at each voxel depends on the value of $H_\sigma$ at this voxel, more specifically the derivative of $H_\sigma$ at this voxel with respect to s, and thus the value of the signal mapped from the voxel.

Furthermore, the contrast of an image is defined to be the difference in grey-value for two values of the signal. Contrast is thus given by the following equation:

$\forall \sigma_1, \sigma_2 \in S,$ $$\text{Contrast} = |H_\sigma(s_1) - H_\sigma(s_2)| \tag{32}$$

Using the mean-value theorem and assuming that $H_\sigma$ has all the required properties (continuity, etc.), the contrast is given by the following equation:

$\exists \xi \in [s_1, s_2] /$ $$\text{Contrast} = |H_\sigma(s_1) - H_\sigma(s_2)| \approx |dH_\sigma(\xi)/ds| \, \| s_1 - s_2 \| \tag{33}$$

wherein $\| \, \|$ is a metric of S. Clearly, when the signal s is one-dimensional, this norm is simply the difference $|s_1 - s_2|$.

If one assumes that the behavior of $H_\sigma$ is monotonic on the interval $[s_1, s_2]$ (no extrema) and that the second derivative $H_\sigma$ does not change sign on this interval (no inflection points), the derivative of $H_\sigma$ at $\xi$ can be approximated by an intermediate value between $|dH_\sigma(s_1)/ds|$ and $|dH_\sigma(s_2)/ds|$. Under these circumstances, it is reasonable to estimate the noise on the interval $[s_1, s_2]$ as:

$$\text{Noise }[s_1, s_2] \approx |dH_\sigma(\xi)/ds| \cdot \nu \tag{34}$$

The contrast-to-noise ratio $\text{CNR}(s_1, S_2)$ is thus given by the following equations:

$$\text{CNR}(s_1, s_2) \approx |H_\sigma(s_1) H_\sigma(s_2)| / |\nu \cdot dH_\sigma(\xi)/ds| \tag{35}$$

$$\text{CNR}(s_1, s_2) \approx \| s_1 - s_2 \| / \nu \tag{36}$$

The above equation (36) is valid as long as the values of $s_1$ and $s_2$ are arbitrarily chosen on a monotonic portion of the function $H_\sigma$, for example, when $H_\sigma$ is a Gaussian and the values of $s_1$ and $s_2$ are both greater or both less than the mean of the Gaussian. Furthermore, the equation (36) is unlikely to be valid for small values of $\sigma$ as the values of $s_1$ and $s_2$ will encompass a portion of $H_\sigma$ likely to comprise extrema. Those skilled in the art will recognize that the approximation of the contrast-to-noise ratio CNR for large values of $\sigma$ is thus dependent on the distance between the signal values $s_1$ and $s_2$ like in standard imaging techniques. The principal difference between the present invention and the prior imaging methods is that in large $\sigma$ measure-theoretic imaging according to the present invention, the gray scale is "folded over" around the mean of the convolution function, e.g., the mean of the Gaussian. It should also be noted that absolute output signal difference $|H_\sigma(s_1) - H_\sigma(s_2)|$ tends to zero with increasing $\sigma$. When $\sigma$ tends to infinity, the convolution function tends to a constant function so that the signal difference tends to zero (no contrast). However, the output noise also tends to zero as $dH_\sigma/ds$ tends towards zero. The contrast-to-noise ratio is thus the limit 0/0 which is undefined. However, equation (36) shows that this limit is finite and therefore that the image is maintained for large values of $\sigma$.

In summary, the distribution density $H_o$ of the technology supplied imaging mapping M can be progressively "blurred" to give a progressively lower signal space resolution analysis of the image by increasing the standard deviation of the convolution function used in the convolution product. For very large values of this standard deviation, the limit of increasing image "blurriness" is approached. In this case, the contrast-to-noise ratio becomes dependent on the metric used in the signal space S, like in standard imaging technologies. This dependence is simply a special limiting case of the imaging method of the present invention. For a given finite resolution, however, contrast between distinct subregions is independent of the metric in S, unlike standard images. This creates the opportunity for high contrast between subregions constrained to have poor contrast with standard imaging.

The inventive concept of the method of the present invention is thus not limited to the enhancement of contrast between a subregion of a region of interest having a limited spatial extension and the surrounding region. Another aspect of the present invention resides in the obtention of an arbitrary number of images which can be constructed from the output of an imaging technology by varying the width of the convolution function (also referred to as "resolution function"). Two voxels can be recognized as being of distinct type within a desired "resolution" by choosing an image whose gray scale is derived from the appropriate convolution width of the convolution function (usually measured by the standard deviation).

B. First Example Illustrating the Present Invention (With Almost No Noise)

Reference is now made to FIG. 1, which schematically represents an artificially generated region of interest to be imaged, partitioned into a plurality of voxels. In this representation, the region of interest comprises 900 voxels corresponding to a 30×30 matrix. This region of interest has been selected to illustrate the present invention in a simplified manner. In practice, however, a region of interest usually comprises a larger number of voxels such as, for example, a grid made of 256×256 voxels. In FIG. 1, the region to be imaged is represented by a rectangle. It will be understood, however, that the region to be imaged can have any shape. In particular, the region of interest can have a square or a circular shape.

In FIG. 1, only a few representative columns and lines of voxels have been represented for the sake of clarity. More particularly, columns of voxels, referenced by the letters A, B, C, D, E and F, have been represented. Similarly, only three lines of voxels, namely lines G, H and I have been illustrated. For each voxel, there is assigned a particular value of the signal corresponding to a particular characteristic of a parameter being measured by the relevant imaging technology used in conjunction with the present invention. Examples of such technologies include Magnetic Resonance Imaging, Computer Tomography, etc. In order to simplify this example, for purposes of explanation, the signal space is assumed to be a one-dimensional space, with the values of the signal being arbitrarily fixed to three values, namely 100, 101 and 200. It will be understood by those skilled in the art that the method of the present invention also applies to multidimensional signal spaces.

Figure 2:
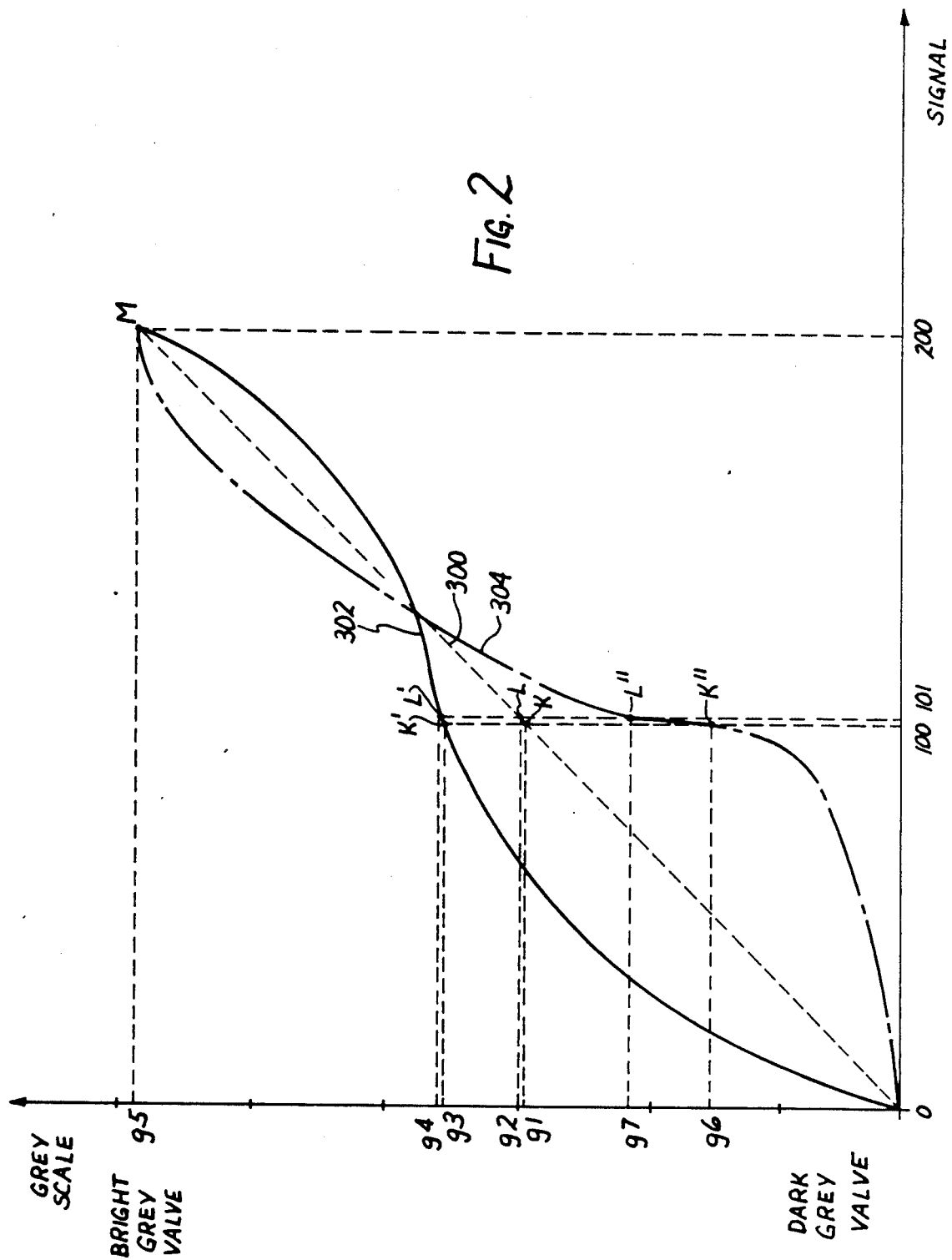
FIG. 2 represents a graph of a grey scale used in standard imaging techniques.

The region of interest, and thus the image of this region, is therefore partitioned into three sets. A first domain, referred to as the background, comprises voxels with the value 100. Each voxel in columns A, B, C and D, for example, in FIG. 1, has been assigned the value 100. These values, as mentioned above, have been arbitrarily chosen so as to dramatize the uniqueness and effectiveness of the method of the present invention. A second domain situated to the right-hand side of the first domain has been assigned the value 200. The second domain with the signal value of 200, referred to as the "200 region", comprises only a portion of the entire region of interest. The first column of the 200 region is referenced by the letter F. Finally, within the uniform background of the first domain is a column of voxels to which the signal value 101 has been assigned. This column is referenced by the letter E in FIG. 1. The region of interest therefore comprises three regions, one region with a signal value equal to 100, a second region having a signal value equal to 200, and a third region, having a signal value to 101. Each of these regions is characterized by the numeral corresponding to the signal value in this region. For instance, the numeral 101 in FIG. 1 points to column E whose voxels all have the value 101. It is clear from the representation of the voxel matrix in FIG. 1 that the column E to which the value 101 has been assigned, has a lesser "popularity" than the two other regions. That is, given a percentage of the total of 900 voxels represented, the number of voxels comprising column E from the smallest percentage of any of the three regions Reference is now made to FIG. 2, which represents a graph of the grey scale used in standard imaging techniques. In standard imaging techniques, a gray value is typically assigned to each voxel in accordance with the magnitude of the signal value in the subject voxel In other words, the gray-level value is a function of the amplitude of the signal given off by the voxel. In order to assign a grey value to each voxel as a function of the signal attached to that voxel, it is necessary to use a function which maps the signal values into a grey value scale. Using the mathematical terminology developed hereabove, assigning a grey value corresponds to performing a mapping from the signal space into the real number line indicative of the grey values. In the present example, the signal vector is assumed to be limited to one physical coordinate, therefore, assigning a gray value corresponds to performing a one-to-one correspondence from the one-dimensional signal space S to the real number line R. This is, however, not the case in general when the signal space S has more than one dimension. When the signal space has a dimension greater than one (multiple parameters), this mapping from the signal space S into the real number line is typically a projection of the signal vector onto one of the coordinate axes. FIG. 2 is a graph of the grey level scale plotted against the value of the signal attached to a given voxel. Arbitrarily, high values of the signal are assigned lighter grey values and low values of the signal are assigned darker grey values. It will be understood by those skilled in the art that such a grey scale assignment is entirely arbitrary and that in particular high values of the signal may be assigned light grey values and low signal values dark grey values, mutatis mutandis.

In a first case represented in FIG. 2 by the straight line 300, the gray value assigned to each of the voxels is linearly proportional to the amplitude of the signal value assigned to each of these voxels. For example, the points K, L and M respectively corresponding to the values 100, 101 and 200 respectfully, are assigned the grey level values $g_1$, $g_2$ and $g_5$ as shown in the graph of FIG. 2. Another grey-level transformation function is represented by the solid line in FIG. 2 and identified by the numeral 302. This grey-level transformation function shows that grey scales are not necessarily linear. The general requirement is that the grey scale be substantially monotonic. Using this grey function, the points K', L', and M respectively correspond to the values 100, 101 and 200 and are assigned the grey level values $g_3$, $g_4$ and $g_5$.

It can be deduced from FIG. 2 that the contrast between the voxels of value 100 and 101 is very low as the difference $g_1$-$g_2$ using the linear grey scale 300 (respectively $g_3$-$g_4$ in the case of the non-linear transformation 302) is close to zero. Because of the closeness of the signal amplitudes of column E (101) and the rest of the background (100), the image obtained by standard methods exhibits very little contrast or even no contrast between column E and the rest of the background. However, the region having the values 200 and assigned the value $g_5$ is clearly distinguished from the rest of the background as the difference $g_5$-$g_1$ (respectively $g_5$-$g_3$) is significant for showing contrast in the output image.

In FIG. 2, there is also represented another grey function identified by the numeral 304. This grey function enhances the contrast between the points labelled as K" and L" respectively corresponding to the values 100 and 101 respectfully. Those skilled in the art will recognize that while the grey function 304 enhances the contrast between voxels of values 100 and 101 it decreases the contrast for voxels having different values. In other words, it is possible to preferentially enhance the contrast in a standard image using an appropriately weishtal grey scale. Such selection is, however, performed to the detriment of other voxels of the region of interest. The judicious selection of the grey level transformation in standard images is often referred to as "grey scale stretching".

Thus, even when the grey-level transformation function is ideally selected so as to enhance contrast in an image, the spatial proximity of the voxels having similar characteristics remains a problem insofar as it is not possible to know beforehand which grey function is ideally suited for exhibiting maximum contrast in an output image.

Enhancement techniques in standard imaging techniques are typically based on the modification of an image by controlling the probability density function of its gray level via the grey-level transformation function. Such enhancement techniques are all based on the assumption that the grey-level value is a function of the signal vector assigned to the voxel. Therefore, in standard imaging techniques, e.g., in the projection method, the contrast between two voxels having similar signal values on the axis which is chosen for the projection in the signal space, is dependent on the distance between these voxels in the signal space. It therefore can be induced that a small region encompassed by a larger region of similar signal characteristics cannot be contrasted in standard images or, at best, can only be poorly contrasted.

Figure 3:
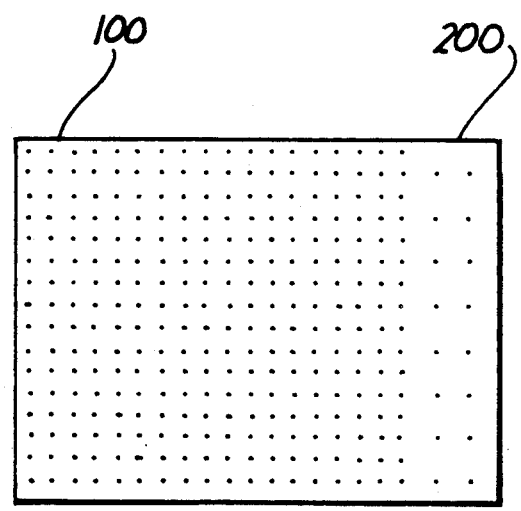
FIG. 3 is a pictorial representation of the region of interest of FIG. 1 using a standard imaging technique.

An actual pictorial representation of the region of interest of FIG. 1 using a standard technique is shown in FIG. 3. FIG. 3 clearly shows the two domains 100 and 200. However, FIG. 3 exhibits no contrast between the column at 101 and the rest of the background. The numeral 101 indicates where the column of voxels at 101 should be. It is clear, therefore, from FIG. 3 that this column is simply not contrasted in a standard image produced by standard imaging processes. In FIG. 3, a matrix of 256×256 voxels has been used.

Reference is now made to FIG. 4 which represents a histogram obtained by classifying the various voxels of the image represented in FIG. 1 according to the frequency of occurrence of the signal values attached to each voxel. In other words, the histogram of FIG. 4 is a graph of the number of voxels having a given signal value plotted against the corresponding signal value. FIG. 4 clearly shows that the distribution of the signal values in the signal space is not uniform. Most specifically, using the 30×30 voxel matrix of FIG. 1 and assuming that the 200 region is ⅓ of the region of interest, it can be inferred that there are 570 voxels having the value 100, 30 voxels having the value 101 and 300 voxels having the value 200.

In a first step of the present invention, a function representing the voxel distribution in the signal space and denoted $H_o(s)$ is computed. In the example shown in FIG. 1, it should be noted that the signal space comprises only three values: 100, 101 and 200. The space of voxels can thus be partitioned into three subsets, subset no. 1, subset no. 2 and subset no. 3, respectively corresponding to the signal values 100, 101 and 200 respectively. The function $H_o(s)$, also referred to as the density function, is therefore the following sum of Kronecker delta functions.

$$H_o(s) = \sum_w \delta(s - M_d(w)) \tag{37}$$

hence:

$$H_o(s) = 570\, \delta(s\text{-}100) + 30\, \delta(s\text{-}101) + 300\, \delta(s\text{-}200). \tag{38}$$

A Kronecker delta function of a variable s, centered around the value $s_o$ takes the value 1 when s is equal to $s_o$ and zero otherwise. Once the function $H_o(s)$ is created, it is convolved with a resolution function $G_\sigma(s)$ representative of a particular image resolution. In the preferred embodiment of the present invention, a Gaussian having mean zero and standard deviation $\sigma$ is used for the resolution function. The standard deviation $\sigma$ is selected to be a predetermined integer multiple of the standard deviation of the noise statistics. In this particular example, there is no noise, therefore, the value of $\sigma$ is arbitrarily chosen.

The function $H_o(s)$ shown in the histogram of FIG. 4 is thus convolved with the Gaussian $G_\sigma(s)$. The Gaussian $G_\sigma(s)$ is given by the following equation:

$$G_\sigma(s) = \frac{1}{\sqrt{2\pi}} \cdot \frac{1}{\sigma} \cdot \exp(-s^2/2\sigma^2) \tag{39}$$

Figure 5B:
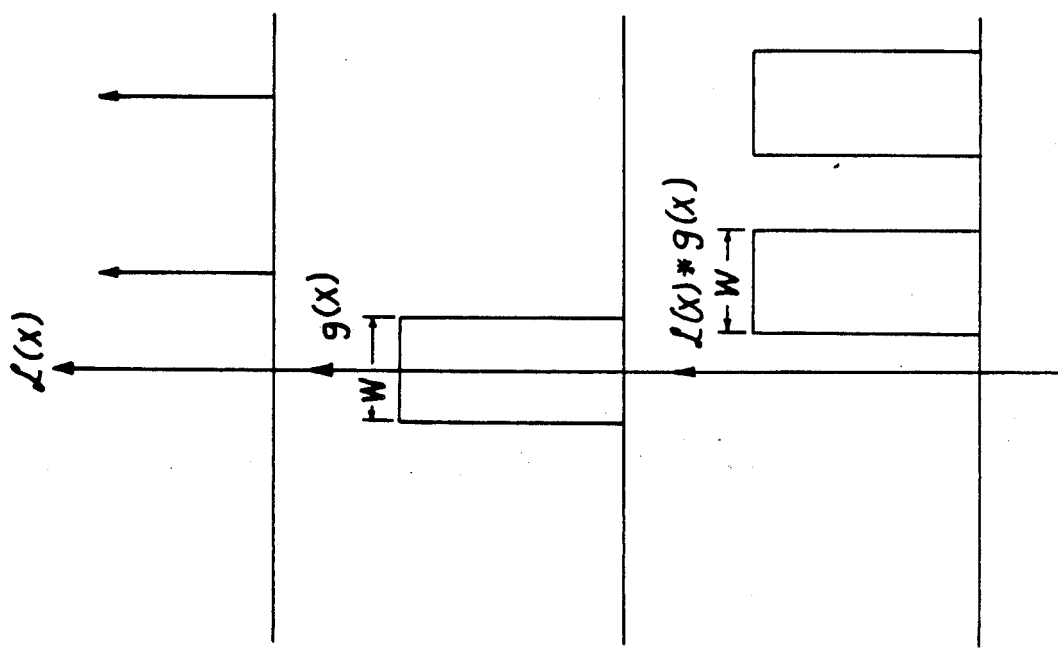
FIG. 5b illustrates another example of a convolution product with a pulse function having a given width w.
Figure 5A:
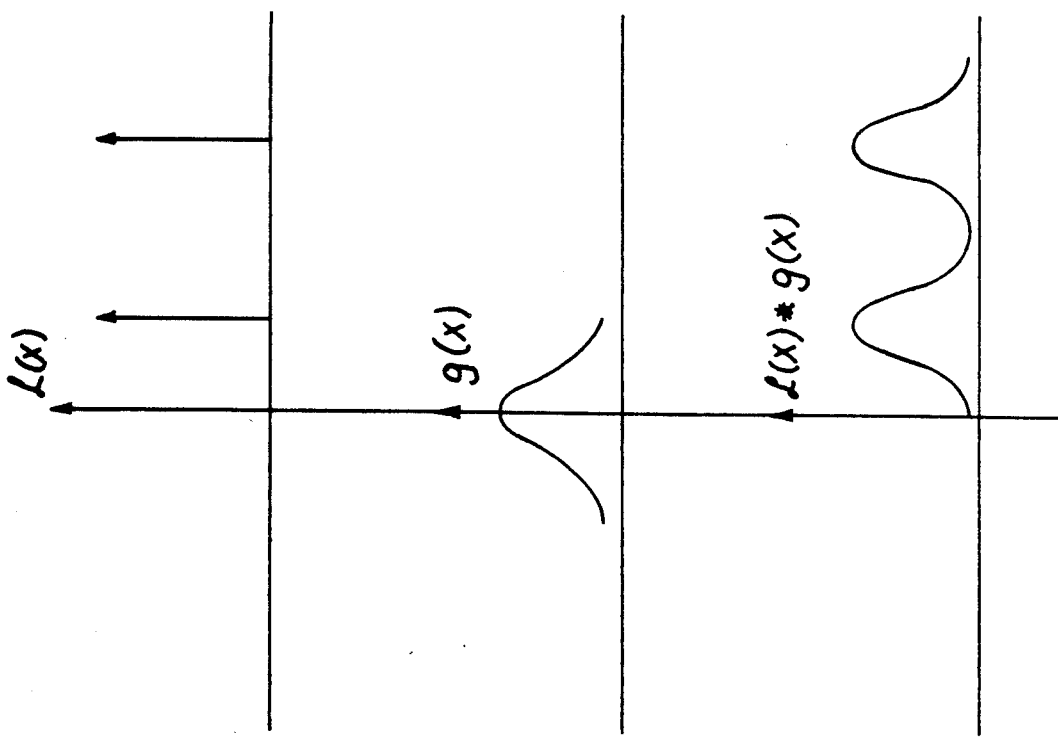
FIG. 5a graphically illustrates the convolution product of a histogram function with a Gaussian function.

Reference is now made to FIG. 5a which graphically illustrates the convolution product of a histogram function with a Gaussian function. In FIG. 5a, the histogram function is represented by the function f whereas the Gaussian function is represented by the function g. The convolution product f*g amounts to "copying" the function g at each of the impulses of the function f as shown in the lowermost graph of FIG. 5a. FIG. 5b illustrates another example of a convolution product wherein the function is a pulse function having a given width w.

Figure 6:
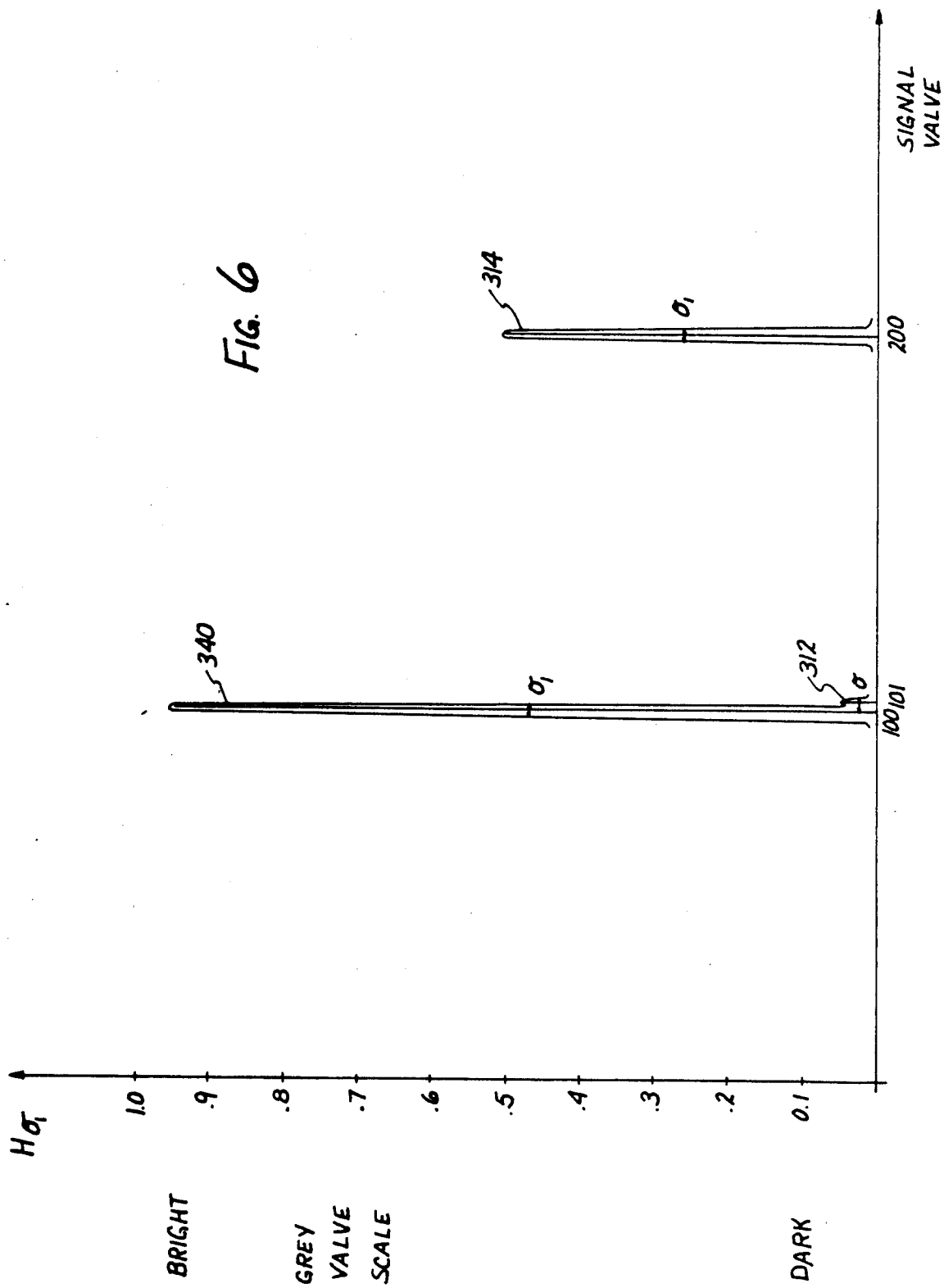
FIG. 6 shows the convolution product $H_\sigma(s)$ of the function $H_0(s)$ of FIG. 4 by a Gaussian function having a small standard deviation $\sigma_1$.

Referring now to FIG. 6, there is shown the convolution product $H_\sigma(s)$ of the function $H_o(s)$ of FIG. 4 by a Gaussian function having a small standard deviation $\sigma_1$. FIG. 7 illustrates another example of convolution product wherein the Gaussian function convolved has a larger standard deviation $\sigma_2$. By folding the density function $H_o(s)$, sliding it past $G_\sigma(s)$, it can be noted that the convolution amounts merely to copying $G_\sigma(s)$ at the location of each impulse. It can be seen from FIGS. 6 and 7 that, depending on the variance of the Gaussian chosen in the convolution product, the three Gaussians "copied" at each of the impulse functions corresponding to the values 100, 101 and 200, may or may not interfere with one another. Mathematically, the gray value scale $H_o(s)$ is given by the following function:

$$H_\sigma(s) = \frac{1}{\sqrt{2\pi}} \cdot \frac{1}{\sigma} [570 \exp[-(s-100)^2/2\sigma^2] + \\ 30 \exp[-(s-101)^2/2\sigma^2] + \\ 300 \exp[-(s-200)^2/2\sigma^2]] \quad (40)$$

It can be deduced from this equation that the gray-scale function $H_\sigma(s)$ is clearly a function of the variance $\sigma$ of the resolution function. It will be apparent to those skilled in the art that the resolution of the image in the signal space can be varied as a function of the variance of the resolution function G in the method of the present invention. The convolution products represented in FIG. 6 and in FIG. 7 will now be described in more detail.

In FIG. 6, the variance of the Gaussian function chosen in the convolution product is small. The product $H_o(s) * G_\sigma(s) = H_\sigma(s)$ is plotted against the signal value axis. In this example, arbitrary units have been used. Thus, a small standard deviation is selected to be less than the unity. The Gaussian function has a peak-like profile so that the grey-scale function $H\sigma(s)$ is clearly distinct for each of the impulses in the histogram (100, 101 and 200). The three Gaussian functions "copied" at the impulses 100, 101 and 200 are respectively identified with the numerals 310, 312 and 314. Using the arbitrary grey-level scale represented on the $H_\sigma$-axis in FIG. 6, the following grey values are assigned to each of the impulses:

voxels 100: 0.95;
voxels 101: 0.05;
voxels 200: 0.49.

In this grey scale, the degree of brightness increases with values of the function $H_\sigma$. As mentioned above, other grey scales can also be envisaged.

It can therefore be seen that a grey value approximately corresponding to the quantity, i.e., the volume of voxels is assigned to each set of voxels. In particular, the voxels having the value 100 will be assigned a grey-scale value about twenty times greater than the grey-scale value assigned to the voxels having the value 101. Such a contrast is sufficient to clearly distinguish the voxels of value 101 from the background comprised of voxels having the value 100.

Reference is now made to FIG. 7 wherein the variance $\sigma_2$ of the convolving Gaussian is chosen to have a higher value, typically on the order of ten units. The first Gaussian identified by the numeral 316 is "copied" to the impulse corresponding to the value 100. It also encompasses the second Gaussian referred to by the numeral 318 associated to the impulse 101. The third Gaussian 320 associated with the impulse at the value 200 does not overlap with the first and the second Gaussians 316, 318. The resulting function is simply a function having two peaks corresponding to the value 100 and to the value 200. In this case, because the variance $\sigma_2$ of the convolving Gaussian function is selected to be sufficiently high so that there is overlapping of the Gaussians 316 and 318 at the impulses 100 and 101, the same grey value is assigned to the voxels of value 100 and of value 101. Therefore, there is no contrast in the final output image. Using the arbitrary grey scale represented in FIG. 7, the grey values assigned to the impulses 100, 101 and 200 are as follows:

voxels 100: 0.95;
voxels 101: 0.95;
voxels 200: 0.49.

It should be noted that the resulting convolution product at the impulse 100 is slightly biased toward the value 101 because of the contribution of the Gaussian 318 to the convolution product. This bias is shown in FIG. 7 by the point P.

Figure 8:
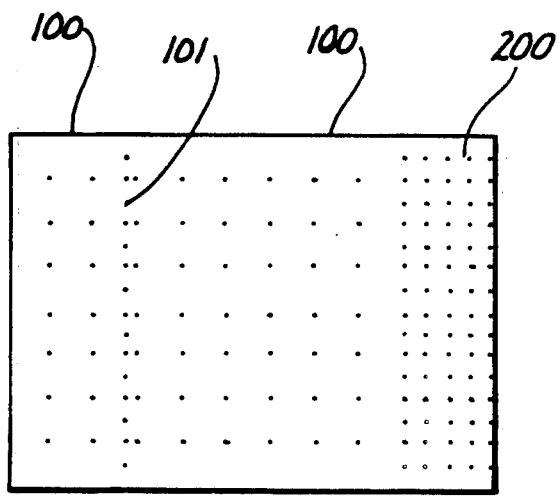
FIGS. 8 and 9 are pictorial representations corresponding to FIGS. 6 and 7.
Figure 9:
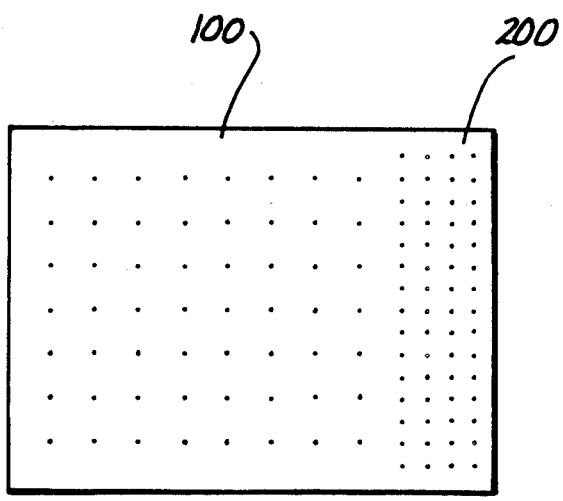

Pictorial representations corresponding to FIGS. 6 and 7 are shown in FIGS. 8 and 9 respectively. In FIG. 8 (low variance), the column of voxels 101 is clearly distinguishable from the background of voxels at 100. For larger values of the variance of the Gaussian function, as shown in FIG. 9, the image shows poor contrast of the column of voxels of value 101. Various transversal grey hues can be seen in FIGS. 8 and 9. This is solely due to a photographic artifact.

C. Second Example Illustrating The Method of The Present Invention (Without Almost No Noise)

Figure 10:
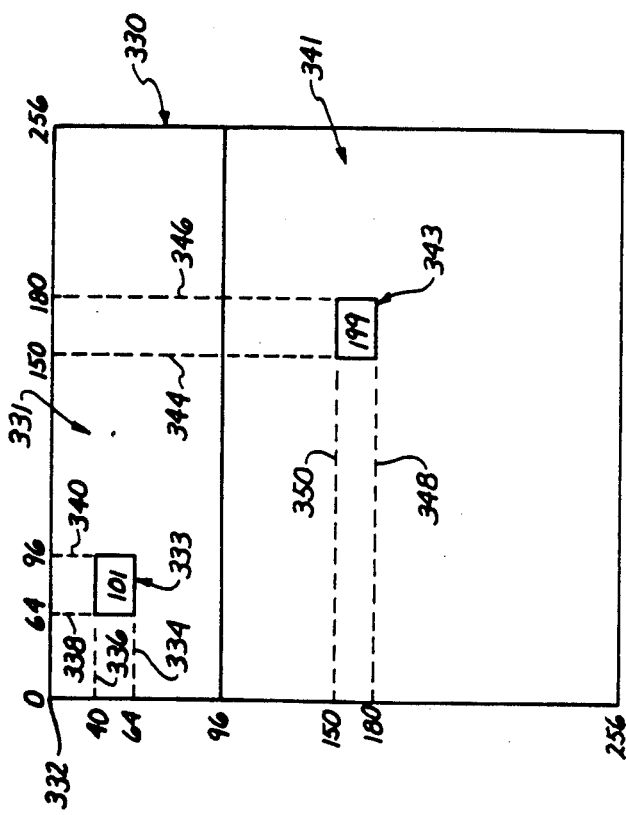
FIG. 10 is a schematic representation of a grid of voxels.

Reference is now made to FIG. 10, which illustrates by means of an example the method of the present invention. Schematically represented in FIG. 10 is a phantom 330 consisting of a grid of 256×256 voxels. This example is typical of the type of voxel partitioning performed for regions of interest. It will be understood that the present method can be applied to any type of voxel partitioning operation. Arbitrary values of a one-dimensional signal are assigned to each voxel of the grid 330. For the sake of clarity and because this example is quite similar to the aforementioned example, the columns and lines of voxels have not been represented in FIG. 10. The grid of voxels 330, i.e., the voxel space is then partitioned into four domains. A first domain 331 comprises the upper part of the region of interest to be imaged and is assigned the value 100. More specifically, if the voxels are characterized by a matrix having 256 lines and 256 columns, the first domain 331 is a submatrix having 96 lines counted from the upper left corner 332 and having 256 columns. A second domain of voxels 333 comprises voxels with the value 101 and is surrounded by the first domain. In FIG. 10, the second domain appears as the submatrix starting from line 40 to line 64 and from column 64 to column 96. Phantom lines 334, 336, 338 and 340 indicate how the second domain 333 is characterized with respect to the line and the column locations respectively. A third domain of voxels 341 is assigned the value 200 (from line 96 to line 256, across the entire region of interest). A fourth domain 343 is defined within the third domain 341 between line 150 and line 180 and between column 150 and column 180. Phantom lines 344, 346, 348 and 350 show how the fourth domain 343 is defined with respect to the number of lines and the number of columns respectively.

Figure 11:
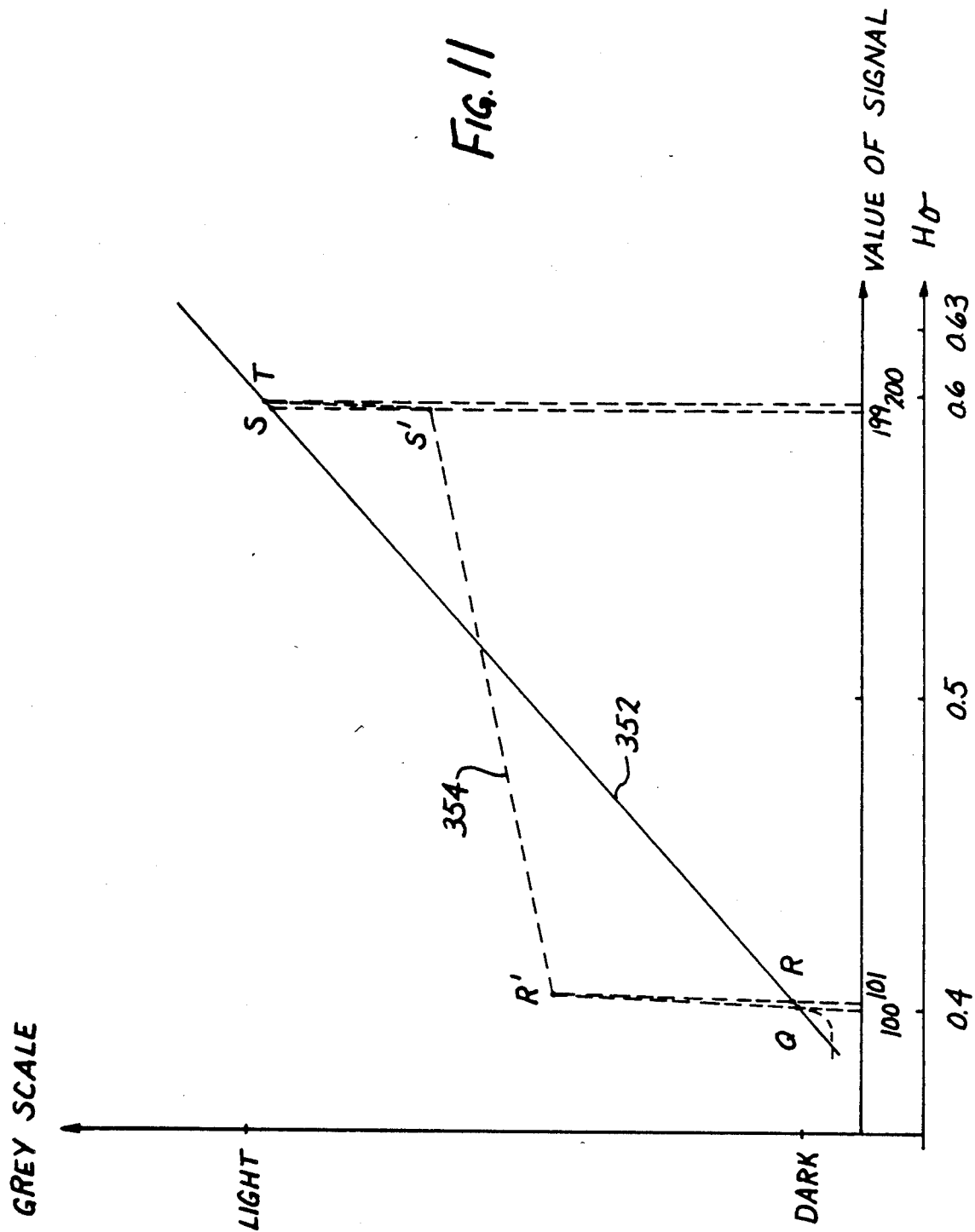
FIG. 11 represents a graph of two typical grey-scale transformation functions.

Reference is now made to FIG. 11 which is a graph of two typical grey-scale transformation functions of the data comprising phantom 330. In this example, the first grey-level transformation function 352 is assumed to be linear. In standard imaging techniques, the grey-value assigned to each voxel is directly dependent on the value of the signal allotted to the voxel. Thus, using the grey-level transformation functions of FIG. 11, a dark value is assigned to voxels having low signal values and a bright value is assigned to voxels having large signal values. It will be apparent to the person skilled in the art that the grey values assigned to the voxels having the signal value 101 and 199 are very close to the grey values assigned to the voxels 100 and 200, respectively. This is shown by the spatial proximity of the points Q and R (respectively S and T) on the straight line 352 of FIG. 11.

As mentioned above in connection with the first example, traditional enhancement techniques may obviate this problem by stretching the grey-level transformation function around those particular values of interest as shown by the grey-level transformation function 354 represented in phantom line in FIG. 11. The grey values assigned to the voxels 100 and 101 (respectively 200 and 201) as shown by the points Q and R, (respectively S, and T) are then significantly different to obtain a sharp contrast in the output image. However, such an enhancement technique assumes a foreknowledge of the signal values of the voxels of interest. Furthermore, grey-function transformation functions need to be tailored to the particular region of interest to be imaged. The present invention circumvents these problems irrespective of the grey transformation function used in the image processing.

Figure 12:
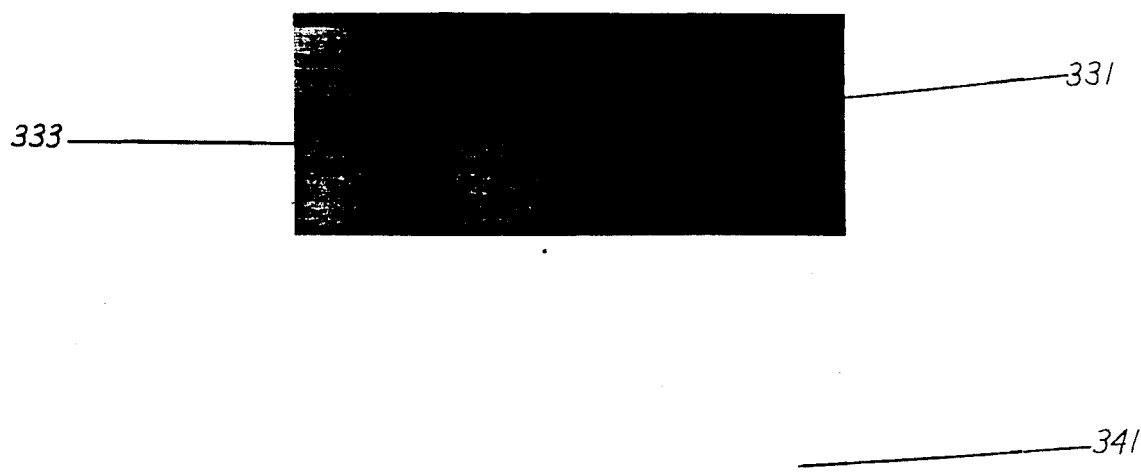
FIG. 12 is a pictorial representation of the image corresponding to the voxel distribution of FIG. 10 according to a standard imaging technique.

A standard image corresponding to the voxel distribution of FIG. 10 is pictorially represented in FIG. 12. the domains of FIG. 10 are referenced with the same numerals as in FIG. 10. The second domain 333 is slightly distinguishable from the background. However, there is no contrast between the third domain 341 and the fourth domain 343.

Figure 13:
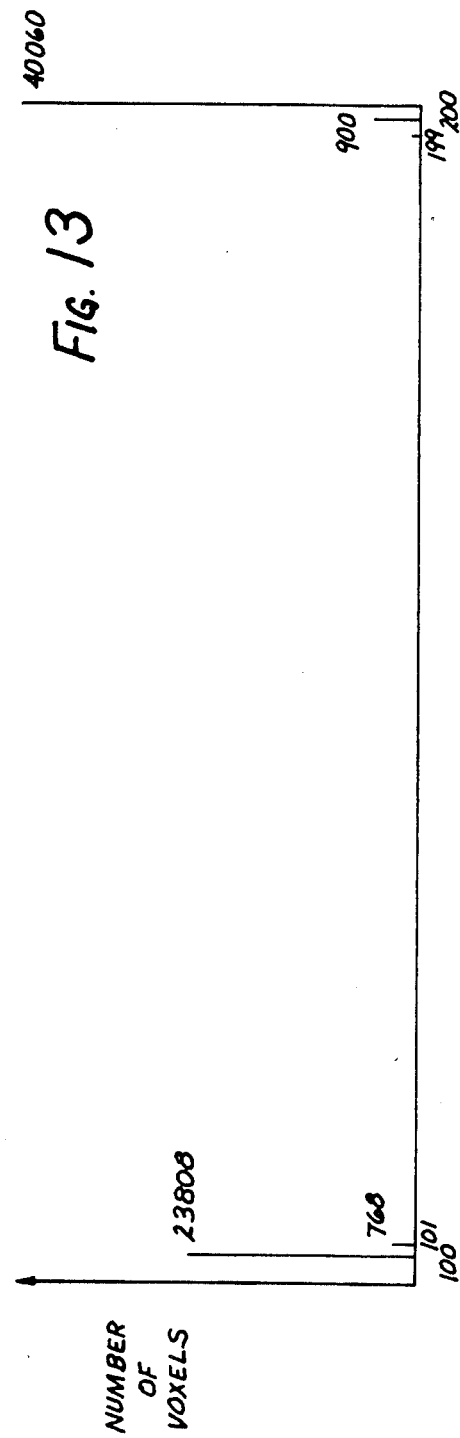
FIG. 13 represents a histogram corresponding to the pattern of voxels represented in FIG. 10.

Referring now to FIG. 13, there is plotted a histogram corresponding to the pattern of voxels represented in FIG. 10. The numbers of voxels for each domain are as follows:

Domain 1: $n_1 = (256 \times 96) - (32 \times 24) = 23{,}808$
Domain 2: $n_2 = 32 \times 24 = 768$
Domain 3: $n_3 = (160 \times 256) - (30 \times 30) = 40{,}060$
Domain 4: $n_4 = (30 \times 30) = 900$.

These numbers are represented in FIG. 13. It should be noted that in order to facilitate the interpretation of the histogram, the graph shown in FIG. 13 is not to scale. The function $H_o$ which describes the density of the set of voxels in the signal space is thus mathematically defined by the following equations:

$$H_o(s) = \sum_w \delta(s - M_d(w)) \quad (41)$$

hence:

$$H_o(s) = 23{,}808\ \delta(s\text{-}100) + 768\ \delta(s\text{-}101) + 900\ \delta(s\text{-}199) + 40{,}06\ \delta(s\text{-}200) \quad (42)$$

where $\delta$ is the aforementioned Kronecker delta function.

Reference is now made to FIG. 14 and FIG. 16 wherein the grey-level scale $H_\sigma(s)$ is plotted after the distribution function $H_o(s)$ of FIG. 13 has been convolved with Gaussian functions of different variances (low and high variance).

In FIG. 14, a Gaussian having a small variance (high resolution in the signal space) is convolved with the aforesaid function $H_o$. As discussed hereabove in connection with the first example of application according to the present invention, the convolution of a Gaussian of mean zero and of variance $\sigma$ with a histogram function amounts to copying the Gaussian at each of the impulses of the histogram function. The grey-value function $H_\sigma(s)$ is thus mathematically defined by the following equation:

$$H_\sigma(s) = \frac{1}{\sqrt{2\pi}} \cdot \frac{1}{\sigma} \ [23{,}808 \exp[-(s - 100)^2/2\sigma^2] + \quad (43)$$
$$768 \exp[-(s - 101)^2/2\sigma^2] +$$
$$900 \exp[-(s - 199)^2/2\sigma^2] +$$
$$40{,}060 \exp[-(s - 199)^2/2\sigma^2]]$$

If the variance $\sigma$ is selected such that the Gaussian function 400 copied at the impulse 100 does not encompass the Gaussian 402 convolved at the impulse 101, the resulting function $H_\sigma(s)$ takes different values for the value 100 and the value 101 as illustrated in FIG. 14. The same holds true for the Gaussians 404 and 406 convolved H 30 around the peaks 199 and 200. The values of $H_\sigma(s)$ for each of the impulses of the histogram of FIG. 13 are represented by the points U, V, X and Y in FIG. 14. On the arbitrary grey scale used in the vertical axis of FIG. 14, the values of $H_\sigma(s)$ are as follows:

signal value 100: $H_\sigma(100) \approx 0.4$ (point U);
signal value 101: $H_\sigma(101) \approx 0.1$ (point V);
signal value 199: $H_\sigma(199) \approx 0.1$ (point Y);
signal value 200: $H_\sigma(200) \approx 0.6$ (point X).

Using the grey level transformation of FIG. 11 ($H_\sigma$-axis), the first domain 331 is assigned a relatively bright value whereas the second domain 333 of voxels 101 is assigned a dark value. This also applies to the third and fourth domains 341, 343.

Figure 15:
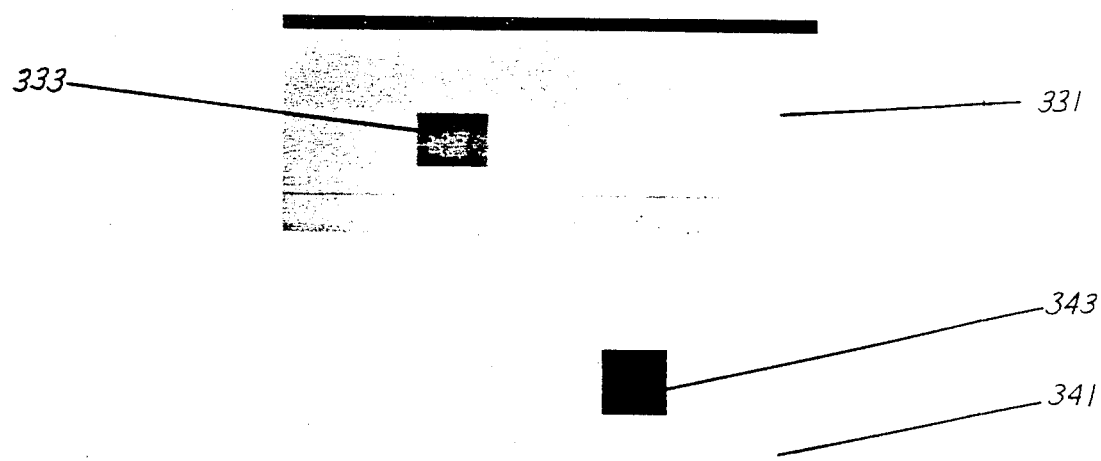
FIG. 15 is a pictorial representation of an image obtained using the grey-level scale of FIG. 14.

A pictorial representation is shown in FIG. 15 wherein the second and fourth domains are sharply contrasted with respect to the first and third domains. Referring to FIG. 14, it would appear that the second and fourth domains 333, 343 should be assigned similar grey values. However, the convolution product of the Gaussian 400 and 402 is such that a greater portion of the tail of the Gaussian 400 is added to the Gaussian 402, thereby raising the value of $H_\sigma$ for the second impulse 101 (point V in FIG. 14). In contrast, a lesser portion of the tail of the Gaussian 404 is added to the Gaussian 406, so that the value of $H_\sigma$ at 199 (point Y) is less than the value at 101 (point V).

Reference is now made to FIG. 16 wherein the histogram function plotted in FIG. 13 is convolved with a Gaussian having a mean zero and a high variance $\sigma$. The Gaussian functions 408, 410, 412 and 414 respectively corresponding to the impulses 100, 101, 200 and 199 are represented in phantom line. According to equation (43), the grey scale function $H_\sigma(s)$ is the sum of all these Gaussians. This function is represented in solid line in FIG. 16. Two observations can be derived from the analysis of FIG. 16. Firstly, the contribution of the Gaussians corresponding to the small domains of values 101 and 199 is negligible. Secondly, the Gaussians at the peaks 100 and 200 overlap to produce a grey-level scale fundamentally different from the grey-level scale of FIG. 14. The values of $H_\sigma(s)$ at the points 100, 101, 199 and 200 are thus:

signal value 100: $H_\sigma(100) \approx 0.45$ (point U');
signal value 101: $H_\sigma(101) \approx 0.46$ (point V');
signal value 199: $H_\sigma(199) \approx 0.63$ (point Y');
signal value 200: $H_\sigma(200) \approx 0.62$ (point X').

Figure 17:
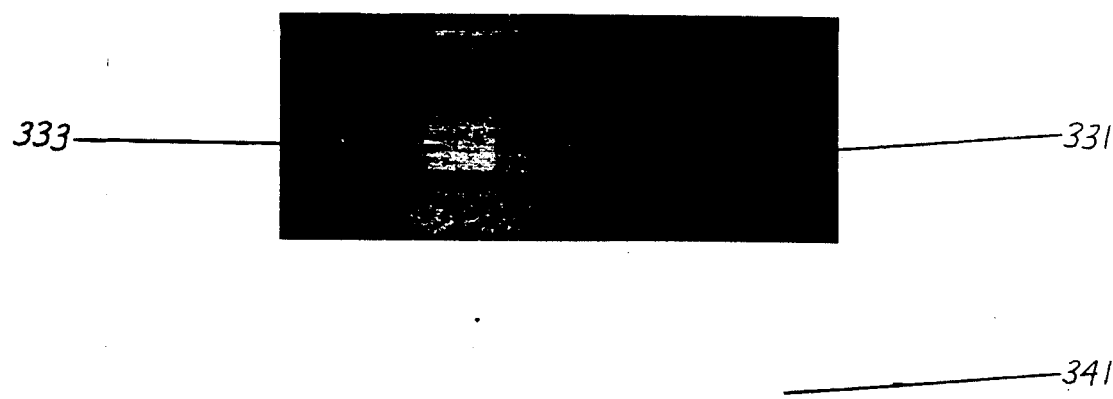
FIG. 17 is a pictorial representation of an image obtained using the grey-level scale of FIG. 16.

Using the grey transformation function of FIG. 11, only the first and third domains (values 100 and 200) appear contrasted in the output image. A pictorial representation of this output image is depicted in FIG. 17. As theoretically derived, the second and fourth domains (domains 333 and 343 corresponding to voxels of value 101 and 199) are poorly contrasted in FIG. 17. Furthermore, the grey value of the second domain appears to be brighter than the background of voxels at 100. This can be explained by reference to FIG. 16. Because of the contribution of the Gaussian 412, the Gaussian 408 is skewed towards the center so that the value of $H_\sigma$ assigned to the voxels 101 (point V') is greater than the value of $H_\sigma$ assigned to the voxels 10 (point U').

For large values of the variance of the resolution function, the contrast of the image obtained in the present invention is thus very comparable to the contrast obtained with standard images. The foregoing mathematical analysis predicts this observation and also shows that the contrast then becomes dependent on the metric in the signal space S. Furthermore, for large values of the variance, the grey value assigned to a voxel is a function of the distance to the mean of the histogram. Those skilled in the art will therefore recognize that for very large values of the variance of the resolution function, the standard images produced by prior continuous grey level methods are comparable to images obtained by the method of the present invention.

D. Third Example Illustrating The Method of The Present Invention (With Noise)

Figure 18A:
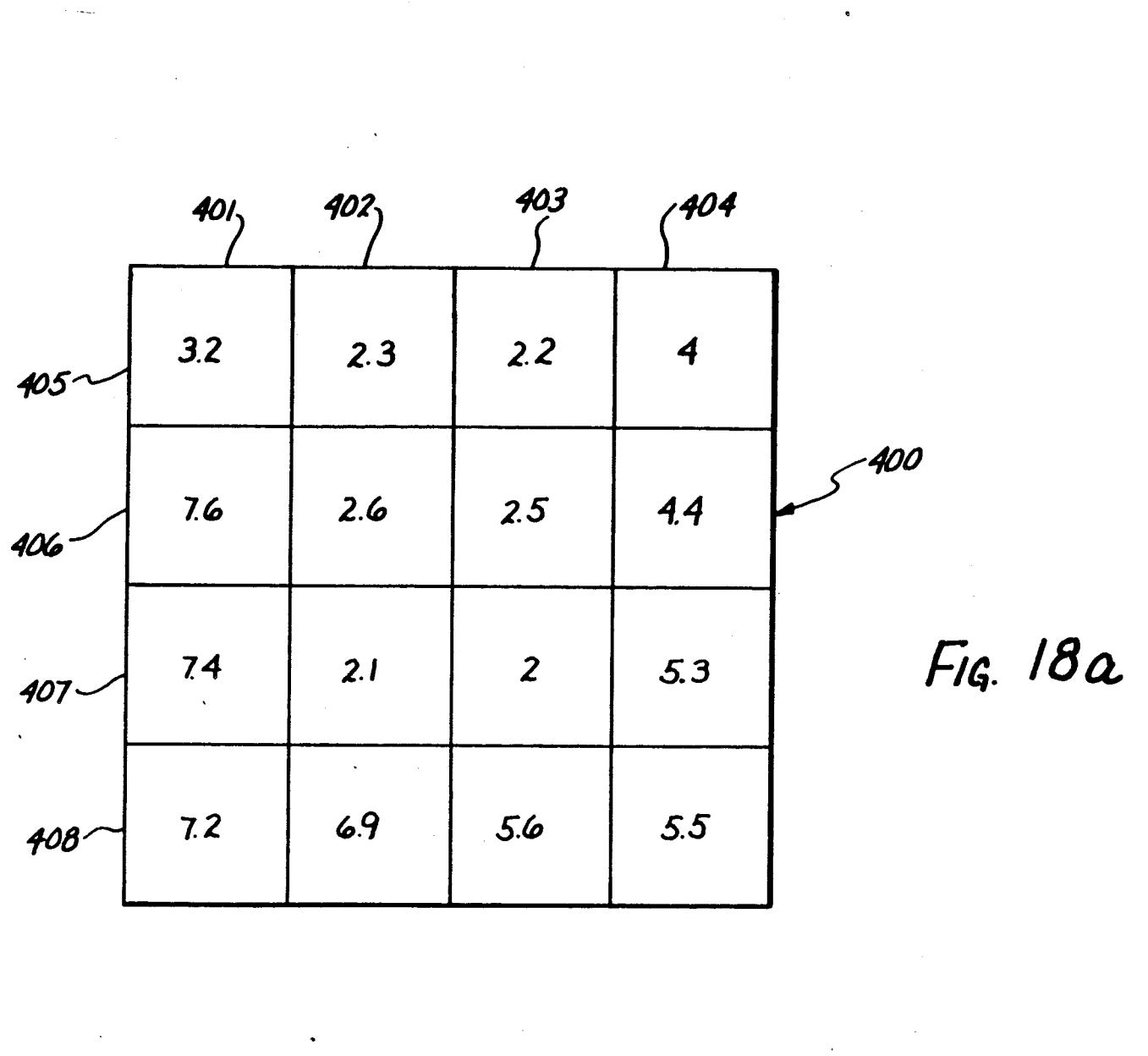

Referring now to FIG. 18a, there is represented a schematic grid of voxels 400 wherein each voxel has been assigned a particular signal value. In this simplified example, the signal s is unidimensional and takes arbitrary values selected between 2 and 7.6. The grid of voxels 400 is comprised of 16 voxels, more specifically four columns of four voxels referenced by the numerals 401, 402, 403 and 404 and four lines of four voxels referenced by the numerals 405, 406, 407 and 408. In practice, a grid of 256×256 voxels is commonly used. It will, however, be apparent to those skilled in the art that the grid of voxels can comprise a much higher number of voxels and that these voxels can be arranged in any suitable order or shape (rectangular, square, circular, etc.).

Figure 18B:
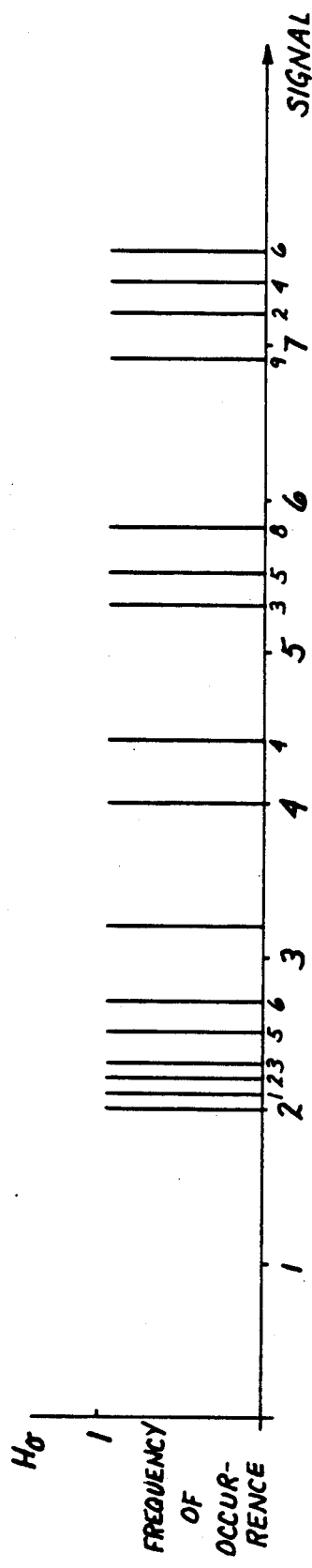

Referring now to FIG. 18b, there is represented a histogram of the signal space mapped from the space of voxels of FIG. 18a. In other words, the number of occurrences of each value is plotted in this histogram against the corresponding value of the signal. As the signal values have been randomly chosen between 2 and 8, any signal value occurs once only. The histogram has thus a comb-like shape wherein the value 1 is assigned to each of the signal values. The mathematical equation of the histogram curve of the FIG. 18b is given by:

$$H_0(s) = \sum_w \delta(s - M_d(w)) \quad (44)$$

or $$H_0(s) = \delta(s-3.2) + \delta(s-2.3) + \ldots + \delta(s-5.5) \quad (45)$$

In order to illustrate how the method of the present invention can be applied to this simplified example, the density function $H_0(s)$ is convolved with pulses of a given width $\sigma$ rather than with Gaussians. It should however be noted that the pulse function is used for illustrative purposes and only can be replaced by any other appropriate convolution function. Referring to FIG. 5b, it can be seen that the convolution of an impulse function (also referred to as histogram function) with a pulse function of width w amounts to copying the pulse function at each of the impulses. If two of these pulses overlap in the convolution function, the sum of the two pulses is computed to obtain the final convolution product.

Figure 19:
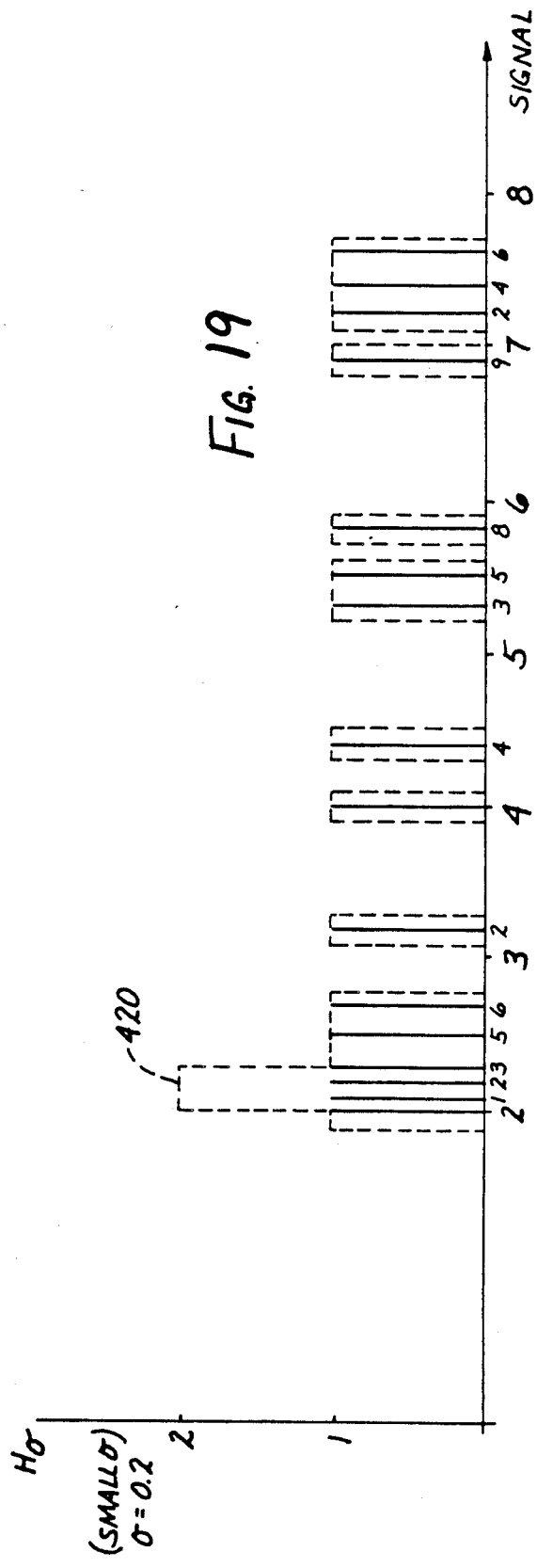
FIGS. 19, 20 and 21 are graphical illustrations of the grey-level scale $H_\sigma(s)$ for various values of $\sigma$, in accordance with the present invention.
Figure 20:
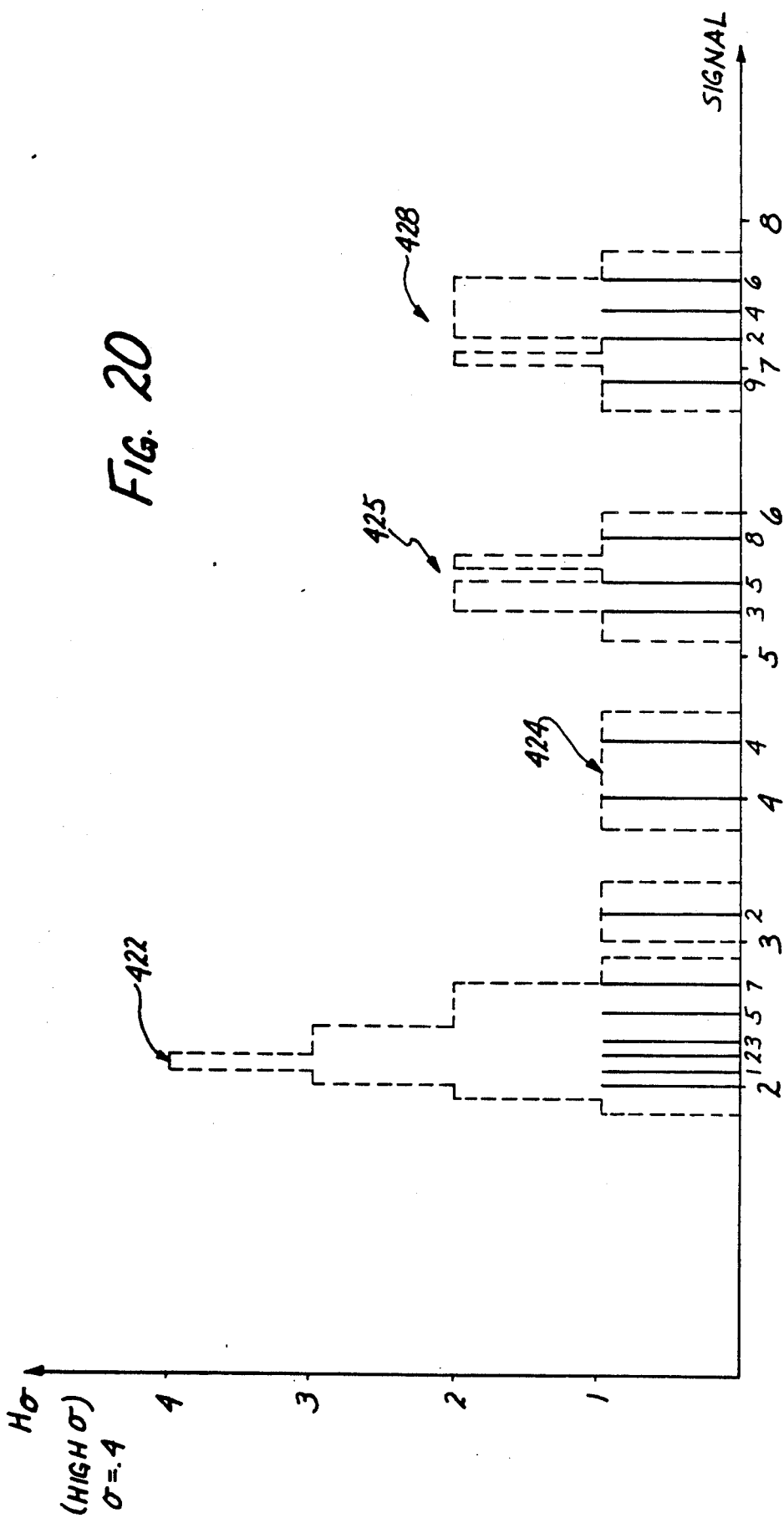
Figure 21:
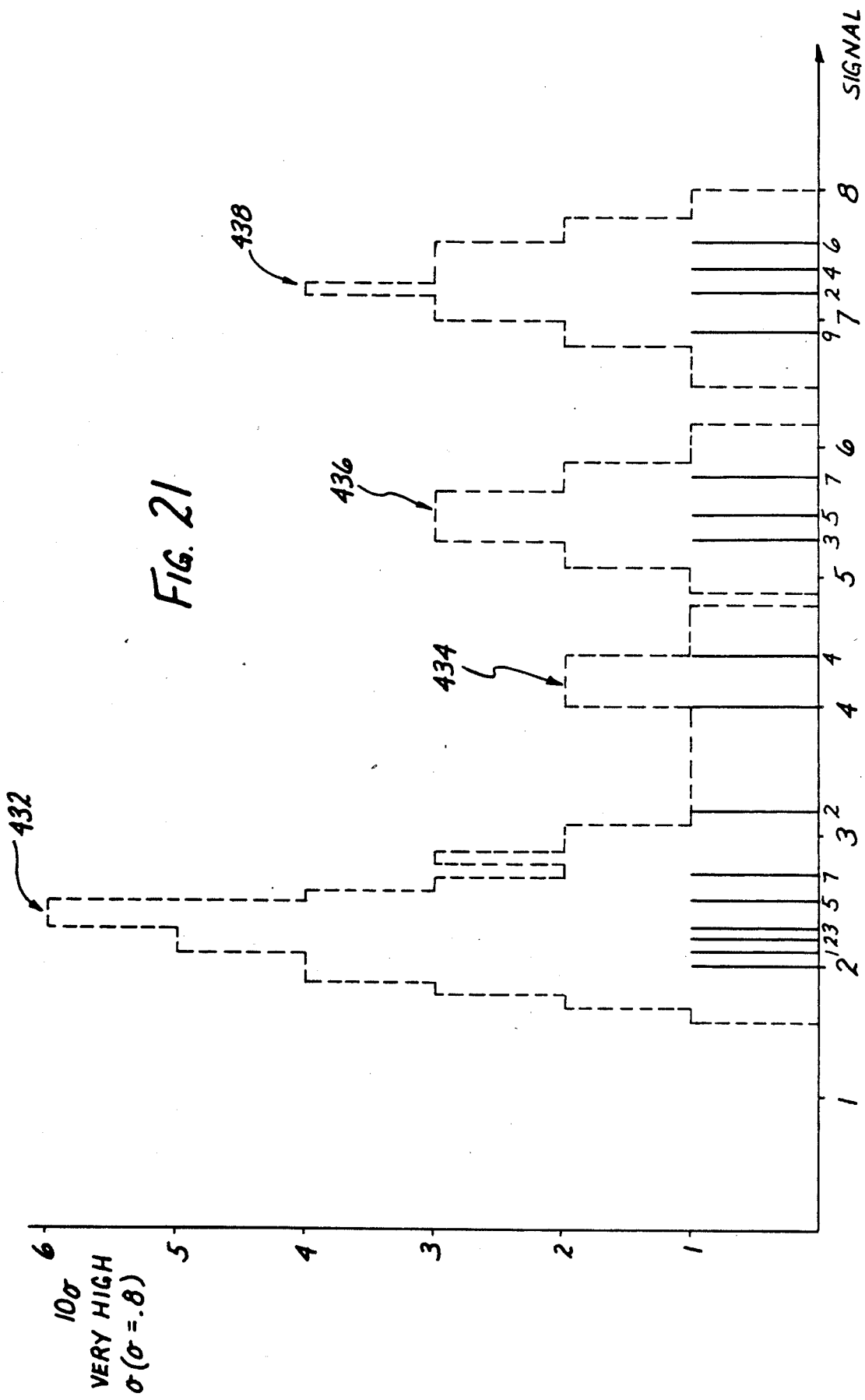

FIGS. 19, 20 and 21 are graphical illustrations of the grey-level scale $H_\sigma(s)$ for various values of $\sigma$. In FIG. 19, the width $\sigma$ is chosen to be 0.2. The grey level scale $H_\sigma(s)$ takes the value 1 for all the impulses of the histogram with the exception of the four first impulses at 2, 2.1, 2.2 and 2.3 where the grey scale value is equal to 2 (as indicated by the numeral 420). The output image obtained by means of this convolution function would exhibit a low contrast. As the distribution of values chosen for the grid of voxels is quite noisy, the width 0.2 chosen in this first case for the resolution function is thus too low to show a significant contrast.

In FIG. 20, the width of the convolution function is chosen to be 0.4. The resulting grey scale clearly shows four subregions: a first set of voxels 422, centered around the value 2.1, 2.2; a second set of voxels 424, centered around the value 4; a third set of voxels 426, centered around the value 5.5 and a fourth set of voxels 428, centered around the value 7.2. The first subregion 422 is assigned the greatest value of $H_\sigma(s)$ with the value 4. The output image would be more clearly contrasted but would exhibit some noise.

Reference is now made to FIG. 21 wherein the width of the pulse resolution function is chosen to be 0.8. In this Figure, the four subregions characterized in FIG. 20 exhibit a better contrast. These subregions are characterized by the numerals 432, 434, 436 and 438 respectively. It is noteworthy that the impulse of the voxel having the value 2.6 is assigned a grey scale value of 2 whereas the value of the surrounding voxels is 3 and more, with the maximum in the first subregion 430 reaching the value 6. If the grey transformation function assigns lighter tones to high values of the grey function $H_\sigma(s)$ and darker tones to low values of the grey function $H_\sigma(s)$, the pulse at 2.6 would appear as a darker region in the output image. In medical imaging such a region could be diagnosed as a possibly malignant tissue having similar properties as the surrounding tissue. Standard imaging techniques would not be able to produce output images with the such a contrast.

E. Two-Dimensional Example

Figure 22:
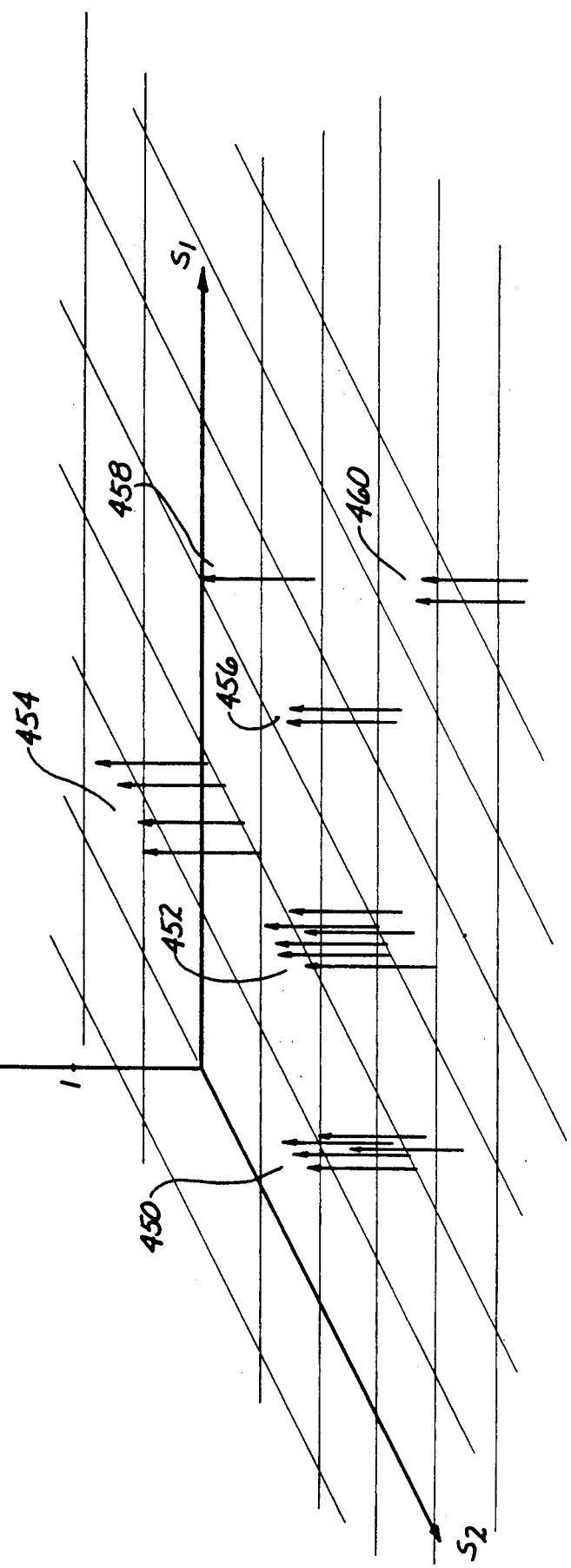
FIG. 22 illustrates how a distribution function $H_0(s)$ can be plotted as a histogram when the signal has two components $s_1$ and $s_2$.

The above examples used signal data in a unidimensional space. The present invention is, however, not limited to signals in signal spaces of dimension 1, but can be applied to any type of data. Reference is now made to FIG. 22 which illustrates how a distribution function $H_o(s)$ can be plotted as a histogram when the signal has two components $s_1$ and $s_2$. The histogram of FIG. 22 is simply illustrative of the general configuration of a two-dimensional histogram. It is clear that the values used therein are entirely arbitrary and are simply used for the purpose of explanation. The histogram of FIG. 22 is plotted in a three dimensional space wherein $s_l$, $s_2$ and the number of occurrences of the value $(s_1, s_2)$ are the three coordinates used. The resulting density function is a two-dimensional Delta function and can be defined by the following equation:

$$H_o(s) = \sum_w \delta[(x,y) - (s_1, s_2)] \quad (46)$$

where $\delta[(x,y)-(s_1,s_2)] = 1$ if $x = s_1$ and $y = s_2$ and 0 otherwise. In FIG. 22, there are represented six regions of values $s_1$, $s_2$, indicated by the numerals 450, 452, 454, 456, 458 and 460. Each pair of values $(s_1,s_2)$ occurs once only. Because $s_1$ and $s_2$ are assumed to be positive, the regions 450–460 are located in the positive quadrant of the plane $(s_1, s_2)$.

The convolving functions used in the convolution function are also two-dimensional functions. A pulse function of width w is thus a parallelepiped function, whereas two-dimensional Gaussian functions have a dome-like shape.

It will be understood by those skilled in the art that the various steps of the method of the present invention can be extended to spaces of higher dimensions. It will also be apparent to those skilled in the art that the higher the dimension of the signal space, the more complex the computation of the convolution function and the longer the processing time of the output image. In the method of the present invention, it is also possible to process each image in one dimension for each of the components of the signal. In such a case, the number of output images is the number of components of the input signal. The advantage, however, of the multidimensional processing is to incorporate in the histogram all the information delivered by the input device.

F. Operational Algorithm

Figure 23:
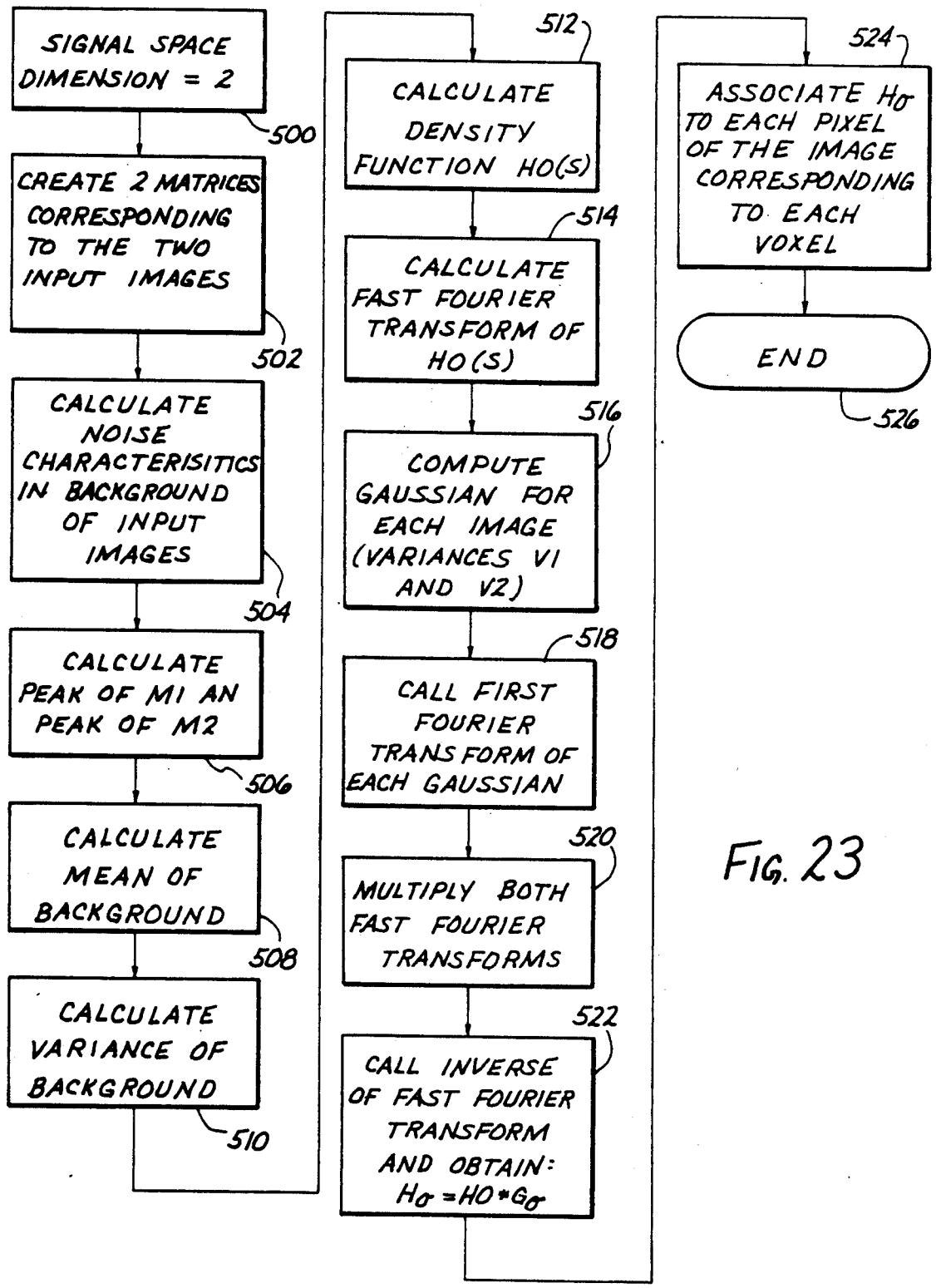
FIG. 23 is a flow chart of a computer program implementing a preferred method of the present invention.

Reference is now made to FIG. 23 which is a flow chart of a computer program implementing a preferred method of the present invention. It will be understood by those skilled in the art that this algorithm serves the purpose of illustrating how the method of the present invention can be implemented. It is, however, apparent that the method of the present invention is not limited to the dimension of the signal space used in this particular implementation nor to the particular imaging technology selected nor to the process of computing the convolution product.

In a first step of the present invention, indicated by the numeral 500, the dimension of the signal space is selected. In this particular implementation, the signal space dimension is 2. The input images of the corresponding signal values for the set of voxels of the region of interest are stored in a file. As in this particular algorithm the dimension of the signal space is supposed to be two, two input images, $M_1(w)$ and $M_2(w)$ are inputted by the imaging technology for storage in an image memory, as indicated by the box 502. After the values of the input images have been stored, the signal characteristics are calculated for the background for each of the input images, as shown in the subsequent step indicated in box 504 of the flow-chart. The peaks of the input images are first computed (step 506). Thereafter, the means of the background defined by the leftmost region comprising the eight first columns is computed for each input image (step 508). The variance of the statistics of the background is further calculated for the same region (step 510). In the following step characterized by the numeral 512, the density function $H_o(s) = \Sigma \delta(s - Md(w))$ is calculated. As mentioned above, this density function is simply the histogram of the signal values for each of the signal space axes. When the signal values are real numbers, the histogram takes the form of a comb-like pattern, whereby there is assigned a value 1 for all of the signal coordinates having a particular value corresponding to the assigned voxel.

Rather than calculating a convolution product, which is a complex and time-consuming operation, it has been found that the Fourier transform algorithm greatly reduces the number of operations involved in this convolution product. It is commonly known from the convolution theorem that a convolution product of two function f and g, denoted f*g, can be replaced by the calculation of the product of the corresponding Fourier transforms F and G so that it can be formally stated that convolution in the x domain of two functions f(x) and g(x) can also be obtained by taking the inverse Fourier transform of the product F(u)G(u) in the u domain. This can be summarized by the following equivalence:

$$f(x) * g(x) \longleftrightarrow F(u)G(u). \quad (47)$$

More particularly, the Fast Fourier transform algorithm has been developed to reduce the number of multiplications and additions required to implement the calculation of a Fourier transform. As the fast Fourier transform algorithm is well known in the art, reference will only be made to textbooks describing such algorithm. In particular, reference is made to the following textbook: Gonzalez and Wintz, *Digital Image Processing*, Addison Wesley Publishing Company, p. 80–82.

It will be clear to those skilled in the art that the calculation of the convolution product can be performed by other means than the fast Fourier transform algorithm. In the preferred method of the present invention, the fast Fourier transform has turned out to be the fastest algorithm to calculate the convolution product.

Referring to FIG. 23 again, the fast Fourier transform of the density function Ho is calculated in the step indicated by the numeral 514.

In the next step 516, the Gaussian convolution function for each image is calculated. The variances of each of these Gaussians are arbitrarily set to a value corresponding to the multiple of the variances of the noise statistics. The Gaussian function thus obtained is a two-dimensional function determined by the mean 0 and the variances $V_1$ and $V_2$. The fast Fourier transform of each of the Gaussians is then computed (step 518), in accordance with the aforesaid fast Fourier transform algorithm. The following step (step 520) comprises the multiplication of the two fast Fourier transforms derived from the density function and from the resolution function, in this case, the two Gaussians. In the penultimate step (step 522), the inverse fast Fourier transform is computed to obtain the final gray-scale value $H_\sigma$ which is assigned to each voxel so as to display an image on the video monitor. The assignment of the grey value given by $H_\sigma$ is actually performed in the final step of this algorithm (step 524). The algorithm is then terminated (step 526).

In this particular implementation of the present method, a Gaussian has been used in the convolution product with the density function. Other resolution functions can be readily used in this algorithm. It will be apparent to those skilled in the art that convolution functions generally used in filter applications are fully appropriate as resolution functions for the method of the present invention. FIGS. 24a–24g illustrate various resolution functions which can be used in the present invention.

Figure 24:
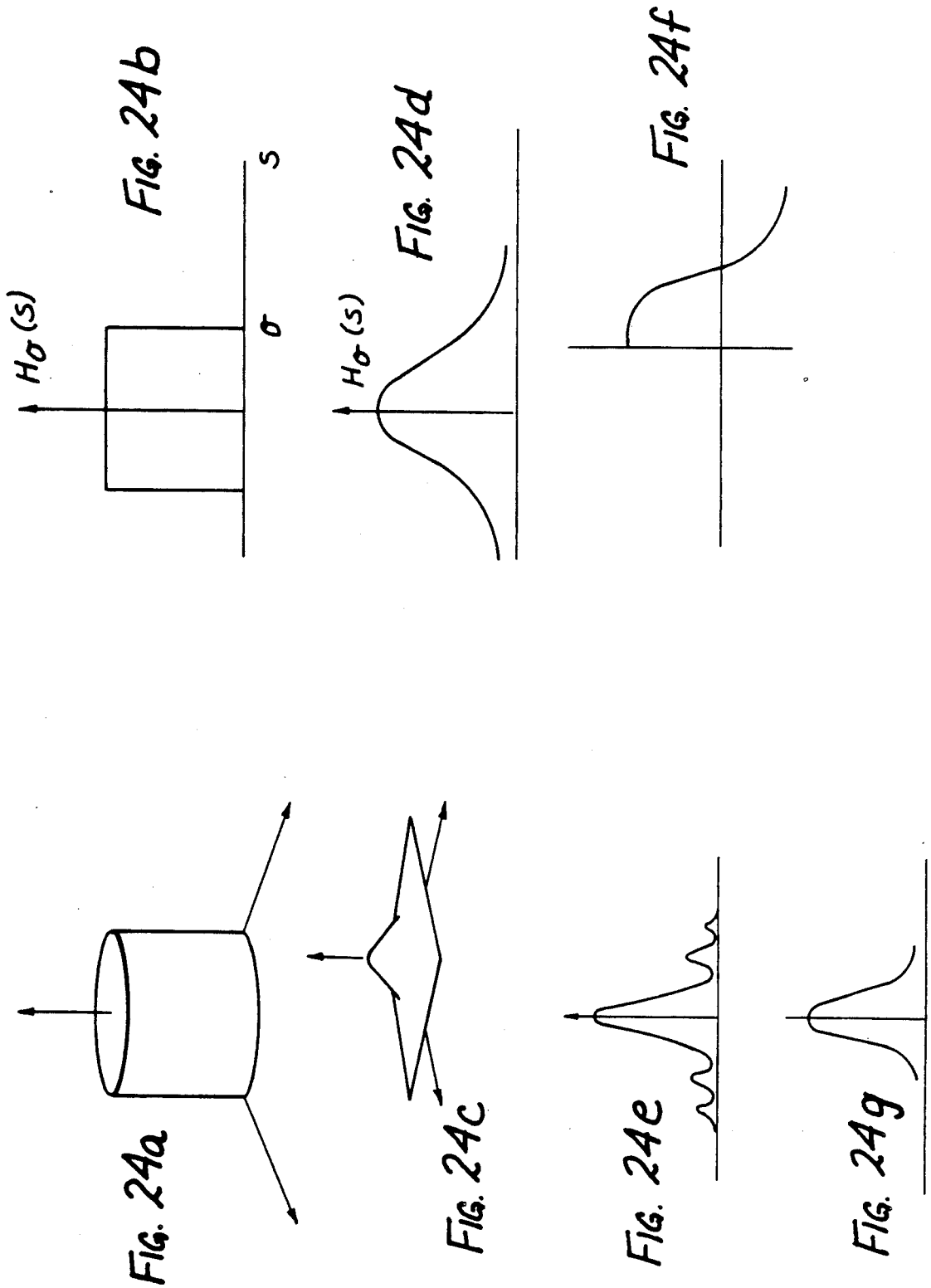
FIGS. 24a-24g illustrate various resolution functions which can be used in the present invention.

FIGS. 24a and 24b schematically represent a pulse function of width $\sigma$ in a two-dimensional space and in a three-dimensional space respectively.

A Butterworth function is represented in FIG. 24d (two-dimensional space) and in FIG. 24c (three-dimensional space).

A cosine function and a sinc (sinx/x) are also plotted in FIGS. 24e and 24f respectively.

In FIG. 24g, there is represented the graph of an exponential function.

Special custom-made functions based on the known topology of the region of interest may allow a more precise enhancement of the contrast of the output image.

G. Operational Realization

Listed below is the computer program written in Fortran implementing the algorithm described hereabove. It will be apparent that the listed routines were tailored in accordance with the requirements of a particular operational situation. In particular, the size of the matrixes used in that particular video raster where 256×256. Such matrixes can be readily changed to fit other video rasters. Furthermore, it is apparent that the following technique can be extended to any dimension of the signal space. It is indeed known that the convolution product involves concepts which are directly applicable to

COMPUTER PROGRAM

Copyright © 1988
The Regents of the University of California
All Rights Reserved.

```
c        This program accepts the output files of a
c        digital imaging technology and produces measure-
c        theoretic images.

c            We assume that signal space is two dimensional,
c        and therefore two input image files have been
c        produced by the imaging technology for each slice of
c        the body desired imaged.  The input files for this
c        program are referred to as echo1 and echo2, and are
c        placed in the arrays pden(i,j) and t2(i,j).

c        NOTE:  this must be linked with nfft1ld and nfft2d
c        which are complex*8 c            The output files of this program are normalized
c        to have gray-scale values varying from zero to 4095,
c        so that they are portable to the signa.

character*13 off(100
         character*13 f1(15),f2(15),f3(15),g(30),
     &        label1,label2,label3
         integer*2 igray(256),w1,w2,pden(256,256),
     &        t2(256,256),bbb(256),icnv(256),q(100)
         complex*8 conv(256,256),a(256,256),e(256,256)
         real*4 ee(256,256),m1,m2,scale(100)
         real*4 gray,e1(256),e2(256),bb(256,256)

c        The input image files are now identified by the user
c        and accessed.  The following allows the user to
c        specify the number of body slices to be evaluated, and
c        which standard deviations should be used in the
c        convolving gaussian density (as a multiple of the
c        noise standard deviation in each input image).
```

```
                type*,'enter number of slices'
                accept*,mm
                type*,'enter first echo filenes w/appstr and
                    w/o suffix'
                type*,'separate each by hitting the return key'
                do 901 n=1,mm
                accept*,label1
                f1(n)=label1//'.dat'
901             continue
                type*,'enter 2nd echo filenames w/appostr,
                    w/o suffix'
                do 902 n=1,mm
                accept*,label2
                f2(n)=label2//'.dat'
902             continue
                type*,'enter body of output filenames w/appostr,
                    w/o suffix'
                do 903 n=1,mm
                accept*,label3
                f3(n)=label3//'.dat'
903             continue
                type*,'enter # of diff std devs per slice'
                accept*,mmm
                type*,'enter scale factors for std devs.'
                do 888 n=1,mmm
                accept*,scale(n)
888             continue
                type(,'enter prefixes for diff std dev pictures
                    w/appostr'
                do 906 n=1,mmm
                accent*,g(n)
906             continue
                type*,'enter number of offsets'
                accept*,qq
                type*,'enter convolution offsets, 0 to 255'
                do 934 n=1,qq
                accept*,q(n)
934             continue
                type*,'enter names for offsets (w/appostr)'
                do 935 n=1,qq
                accept*,off(n)
935             continue
                type*,'enter 0 for Technicare data,
                    1 for GE data'
                accept*,nnn
                do 904 kkk=1,mm
                open(kkk,file='$disk2:'//f1(kkk),status'old',
                    recordsize=128
        &           blocksize=
        &           512,form='unformatted',organization=
                    'sequential',
        &           recordtype='fixed')
                open(15+kkk,file='$disk2:'//f2(kkk),status='old',
        &           recordsize=128,blocksize=
        &           512,form='unformatted',organization=
                    'sequential',
```

```
     &         recordtype='fixed')

pi=4*atan(1.0)

if(nnn.eq.0)then
                    do 2 i=1,4
                    read(kkk)
                    read(15+kkk)
2                   continue
               endiff
               do 10 i=1,256
               read(kkk)(pden(i,j),j=1,256)
               read(15+kkk)(t2(i,j),j=1,256)
10             continue
               type*,'stuff read in' cm1=0
               cm2=0
               c1=0
               c2=0
               do 110 i=1,256
               do 100 j=1,256
               a(i,j)=(0,0)
100            continue
110            continue do 140 i=1,256
               do 135 j=1,256
               if(b.lt.pden(i,j))then
                    b=pden(i,j)
               endif
               if(c.lt.t2(i,j))then
                    c=t2(i,j)
               endif
135            continue
140            continue
               type*,'maxs done',b,c c        we not estimate the noise characteristics in the
c     background of the input images do 12 i=1,8
               do 11 j=1,256
               cm1=cm1+(pden(i,j))
               cm2=cm2+(t2(i,j))
11             continue
12             continue
               cm1=cm1/2048
               cm2=cm2/2048
               do 14 j=1,256
               do 13 i=1,8
               c1=(pden(i,j)-cm1)**2+c1
               c2=(t2(i,j)-cm2)**2+c2
13             continue
14             continue
               c1=sqrt(c1/2048)
```

```
        c2=sqrt(c2/2048)

type*,'means of background are',cm1,cm2
        type*,'std devs are',c1,c2
        type*,'peak file1 is',b,'peak file2 is',c
        type*,'images read in' c   we now produce the function Ho(s), which we call
c   a(i,j) here do 19 i=1,256
        do 18 j=1,256
        pden(i,j)=abs(int(pden(i,j)*(255/b)))
        t2(i,j)=abs(int(t2(i,j)*(255/c)))
18      continue
19      continue
        type*,'scaled images done'
        do 30 i=1,256
        do 20 j=1,256
        a(pden(i,j)+1,t2(i,j)+1)=
            a(pden(i,j+1,t2(i,j)+1)+(1,0)
20      continue
30      continue
        type*,'first histo computed' c   Take FFT of Ho call fft2d(a,256,1)

c   We now make the gaussian and compute its FFT
        do 2001 qp=1,qq
        do 905 k4=1,mmm
        open(30+k4+5*qp,file='$disk2:'//off(qp)//
     &      g(k4)/f3(kkk),status='new',recordsize=128,
     &      blocksize=512='unformatted',organization=
     &      'sequential',recordtype='fixed')
        v1=(scale(k4)*c1*255)/b
        v2=(scale(k4)*c2*255)/c
        r=1/sqrt(2*pi)
        vv1=v1**2
        vv2=v2**2
        do 41 m=0,127
        e1(m+1)=(r/v1)*exp(-(m)**2/(2*vv1))
        e2(m+1)=(r/v2)*exp(-(m)**2/(2*vv2))
41      continue
        do 42 m=128,255
        e1(m+1)=(r/v1)*exp(-(m-256)**2/(2*vv1))
        e2(m+1)=(r/v2)*exp(-exp(-(m-256)**2/(2*vv2))
42      continue
        do 45 i=1,256
        do 44 j=1,256
        e(i,j)=cmplx((e1(i)*e2(j))
44      continue
45      continue
        type*,'gaussian done'
        type*,'begin forward fft'
```

```
              call fft2d(e,256,1)
              type*,'forward transform done'
              do 50 w1=1,256
              do 40 w2=1,256
              if(w1-q(qp).ge.1)then
                   nw1=w1-q(qp)
              else
                   nw1=256+w1-q(qp)
              endif
              if(w2-q(qp).ge.1)then
                   nw2=w2-q(qp)
              else
                   nw2=256+w2-q(qp)
              endif
              conv(w1,w2)=e(nw1,nw2)*(a(w1,w2))
40            continue
50            continue c     Now we compute the convolution Ho*Gsigma by taking the
c     inverse FFT call fft2d(conv,256,-1)
              type*,'inv transform done' c     We're now about done except for some scaling top1=0
              do 53 i=1,256
              do 52 j=1,256
              if(top1.le.abs(real(conv(i,j))))then
                   top1=abs(real(conv(i,j)))
              endif
52            continue
53            continue fudge=2047/top1
              type*,top1
55            do 70 i=1,256
              do 60 j=1,256
              icnv(j)=int(fudge*conv(pden(i,j)+1,
                   t2(i,j)+1))+2047
60            continue c     Write Hsigma(pden(i,j),t2(i,j) (our new gray-scale
c     image) to a file write(30+k4+5*qp)(icnv(j),j=1,256)
70            continue
              type*,'written file',off(qp)//g(k4)//
                   f3(kkk)//'.dat'
              close(30+k4+5*qp)
905           continue
2001          continue
              close(kkk)
              close(15+kkk)
904           continue
              end
```

H. Description of The Image Processor

Figure 25:
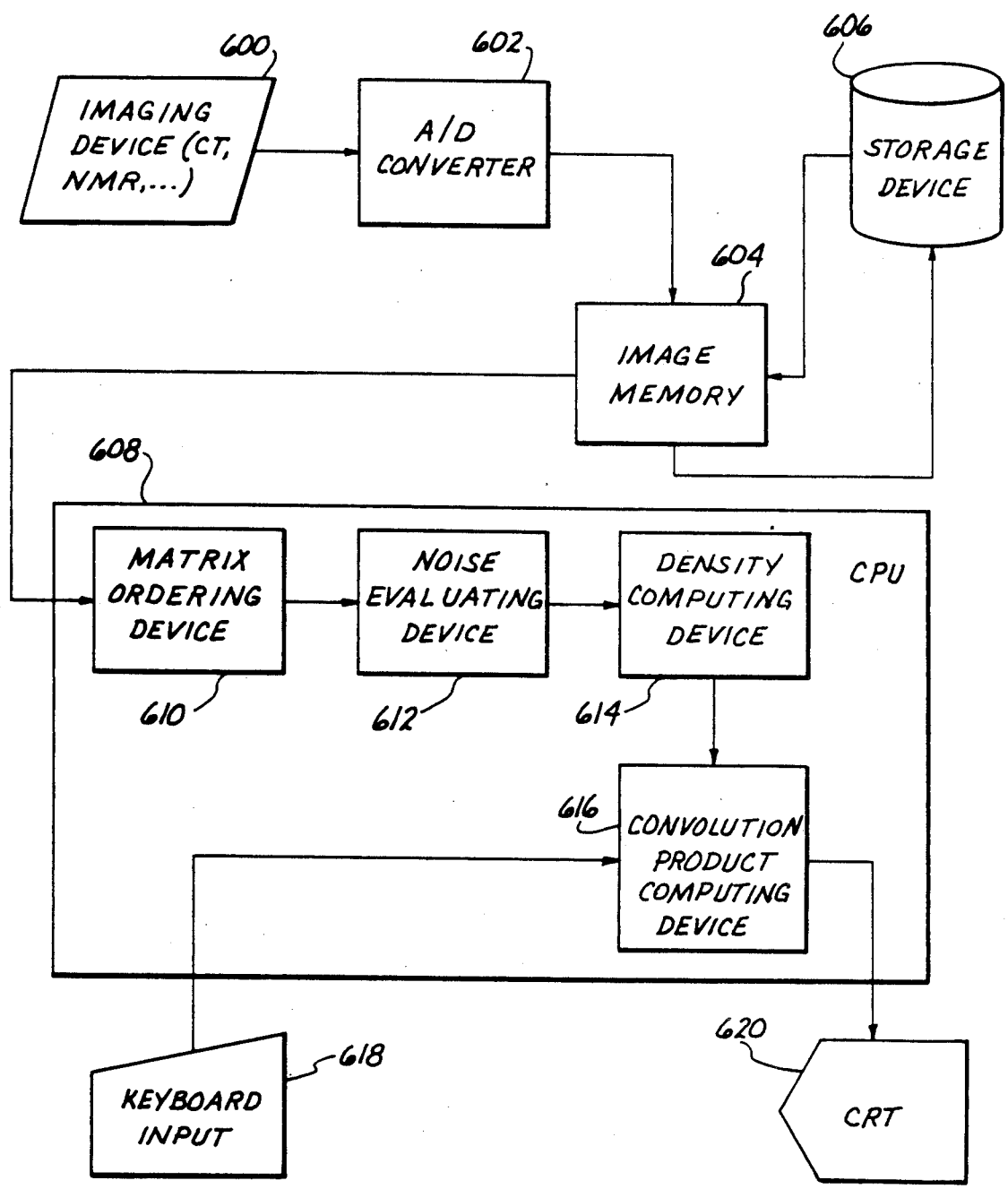
FIG. 25 is a block diagram of a preferred embodiment of the present invention.

Referring now to FIG. 25, there is represented a block diagram of a preferred embodiment of the present invention.

The image processor of the present invention receives a signal from an imaging device 600, preferably digitized by an analog-to-digital converter 602. The imaging device could be any common image input device. In X-ray tomography, the input device preferably comprises a television camera (not shown) adapted to take X-ray projections of a region of interest to be imaged. If NMR technology is used, the imaging device comprises a typical NMR magnet installation. In a preferred embodiment of the present invention, a 0.6 Tesla magnet was used.

The imaging signal is generally quantized by an A/D converter incorporated in the input imaging device 600. An image memory 604 stores the imaging signals delivered by the A/D converter 602. A storage device 606 further stores these signals after they have been stored in the image memory 604.

A CPU 608 receives the signal data from the image memory 604 and processes the data in accordance with the flow-chart described hereabove. The CPU 608 first comprises a section 610 for ordering the signal data into matrices corresponding to the input images If the signal data are multidimensional (with a dimension n), n matrices are necessary to store these data. Typically, these matrices are 256×256 as the region to be imaged is typically partitioned into 256×256 voxels. The CPU 608 further comprises a section 612 for evaluating the noise statistics of the signal data, a section 614 to calculate the density function of these data and a section 616 for calculating the convolution product of this density function with a preselected resolution function A keyboard 618 is preferably connected to the CPU 608 to allow the user to select the number of regions of interest to be imaged, the nature of the resolution function, the resolution level and other parameters. A display device 620 such as cathode-ray-tube (CRT) allows the user to interact with the CPU 608 and also displays the output images for each region of interest to be imaged.

I. Operational Examples

Reference is now made to FIGS. 26–28 and 30–36 which are pictorial representations of images of the brain processed in accordance with standard imaging techniques as well as in accordance with the present invention. More specifically, magnetic resonance technology was used to obtain the brain scans represented in FIGS. 26–28 and 30–36. Nuclear Magnetic Resonance Imaging technology is well known in the art. In this particular example of brain imaging, early and late echoes from a long TR spin echo sequence were acquired and served to create magnetic resonance maps M in which the signal space was either one or two dimensional.

Figure 26:
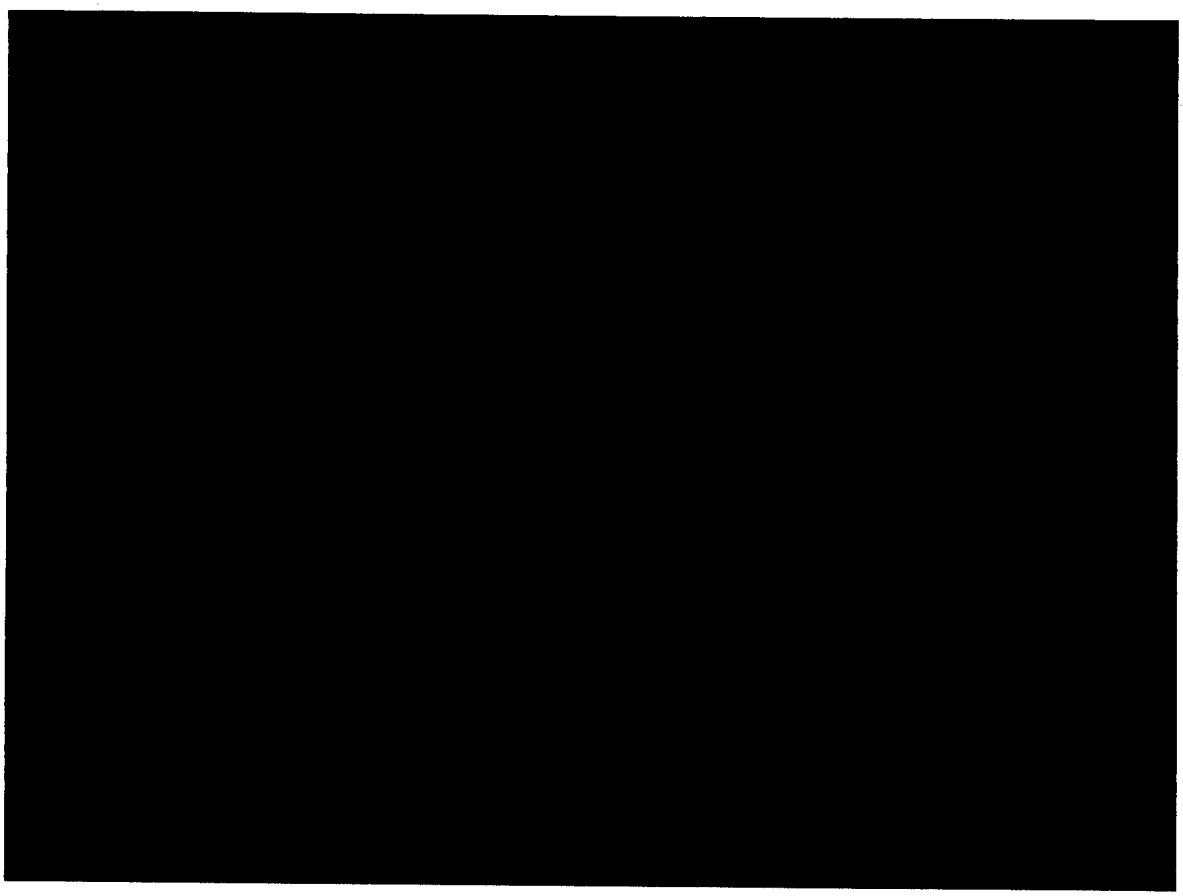
FIG. 26 is a standard "spin" image of a brain obtained by a standard projection method.
Figure 27:
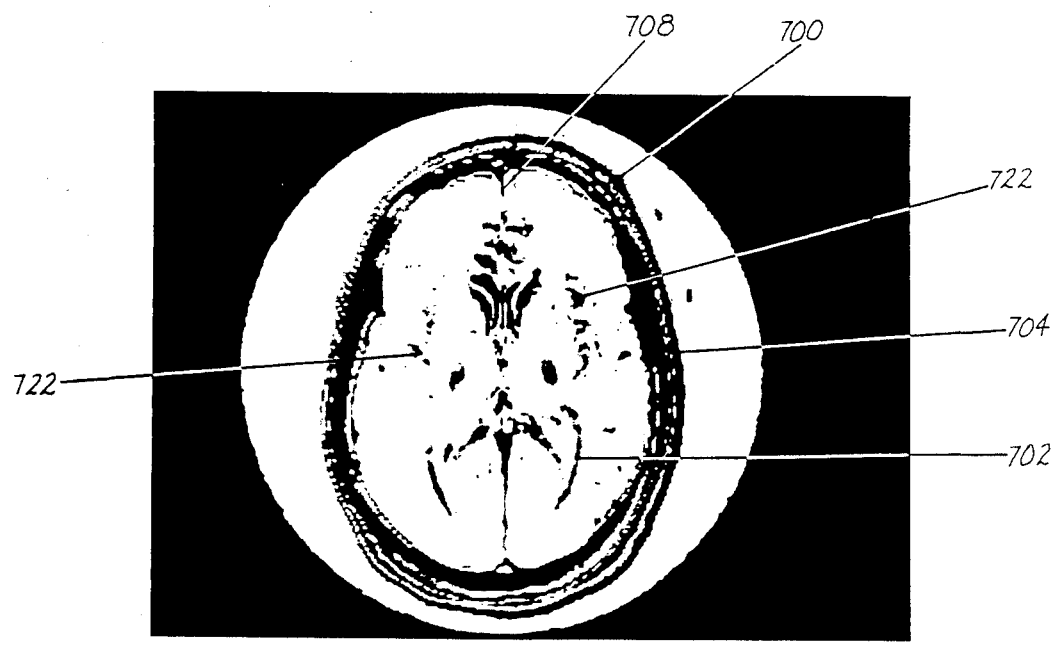
FIG. 27 is a pictorial representation of an image processed in accordance with the present invention, wherein $\sigma$ equals $\nu$, $\nu$ being the variance of the noise statistics.
Figure 28:
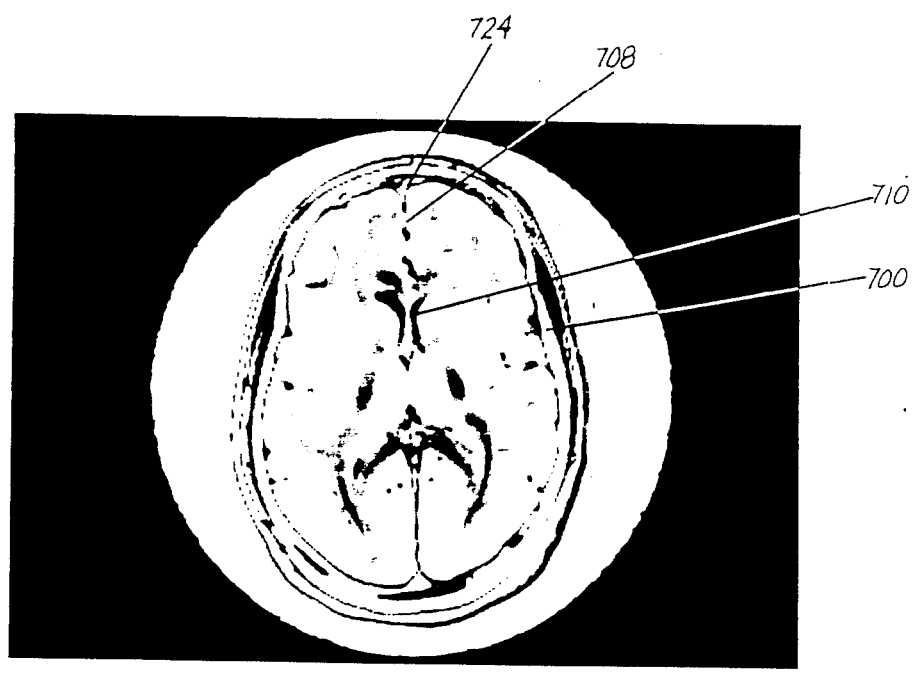
FIG. 28 is the representation of the same image of the brain as in FIGS. 26 and 27, wherein the $\sigma = 90\nu$.

Reference is first made to FIGS. 26 to 28 which show brain scans produced by magnetic resonance imaging with a long TR spin echo sequence of 3000 and a short TE sequence of 30.

In FIG. 26, there is represented a standard image of a brain obtained by a traditional projection method. More particularly, the signal space S comprising the time $T_2$ dimension and the spin dimension has been projected onto the spin axis. In other words, the image represented in FIG. 26 is a typical "spin image" of the brain.

Four regions appear clearly in this standard image Th skull 700 is represented as a dark zone at the circumfe ence of the brain image The white matter appears as dark region identified by the numeral 702. The cortic: grey matter is distinguishable around the white matte as shown by the numeral 704. The cerebrospinal flui identified by the numeral 708 (referred to as CSF) has darker grey value. Other elements of the brain ai clearly seen: the lateral ventricle 710, the vein of Gale 712, the confluence of sinuses 714. The brain is typicall subdivided in three regions: the frontal lobes 716, th temporal lobes 718 and the parietal lobes 720.

Reference is now made to FIG. 27 which is a pict( rial representation of an image processed in accordanc with the present invention. In FIG. 27, the resolutio function is a Gaussian function having for variance th variance of the noise statistics of the background of th image. The image thus obtained is fairly noisy. Th numerals used in FIG. 26 to refer to the skull, the whii matter, the grey matter, the CSF and the other elemen are also used in FIG. 27 and the other pictorial repr( sentations of FIGS. 28 and 30-36 to refer to the sarr anatomical elements. It can be seen from FIG. 27 th: such an image emphasizes various tracts of white ma ter. One of those tracts is referenced by the numer: 722.

In FIG. 28, there is represented the same image of th brain as in FIG. 26 and in FIG. 27. However, in th case, a Gaussian of standard deviation $\sigma = 90\nu$ where is the standard deviation of the noise statistics, is used i the convolution product. The contrast to noise rati between gray matter, white matter and CSF remaii quite similar to the standard image of FIG. 26 Som differences can be observed which are independent ( the method of the present invention but are rather du to the computation algorithm used in the convolutioi It can be seen in FIG. 28 that the bone of the skull 70 and the flowing blood identified by the numeral 72 (e.g. in the superior sagittal sinus) are white rather tha black as in the standard image of FIG. 26. Such a effect is simply due to an artifact of the discrete Fouri( Transform used in the computation of the convolutio product. It will be understood by those skilled in the a· that this artifact is independent of the inventive concep of the present invention.

Figure 29:
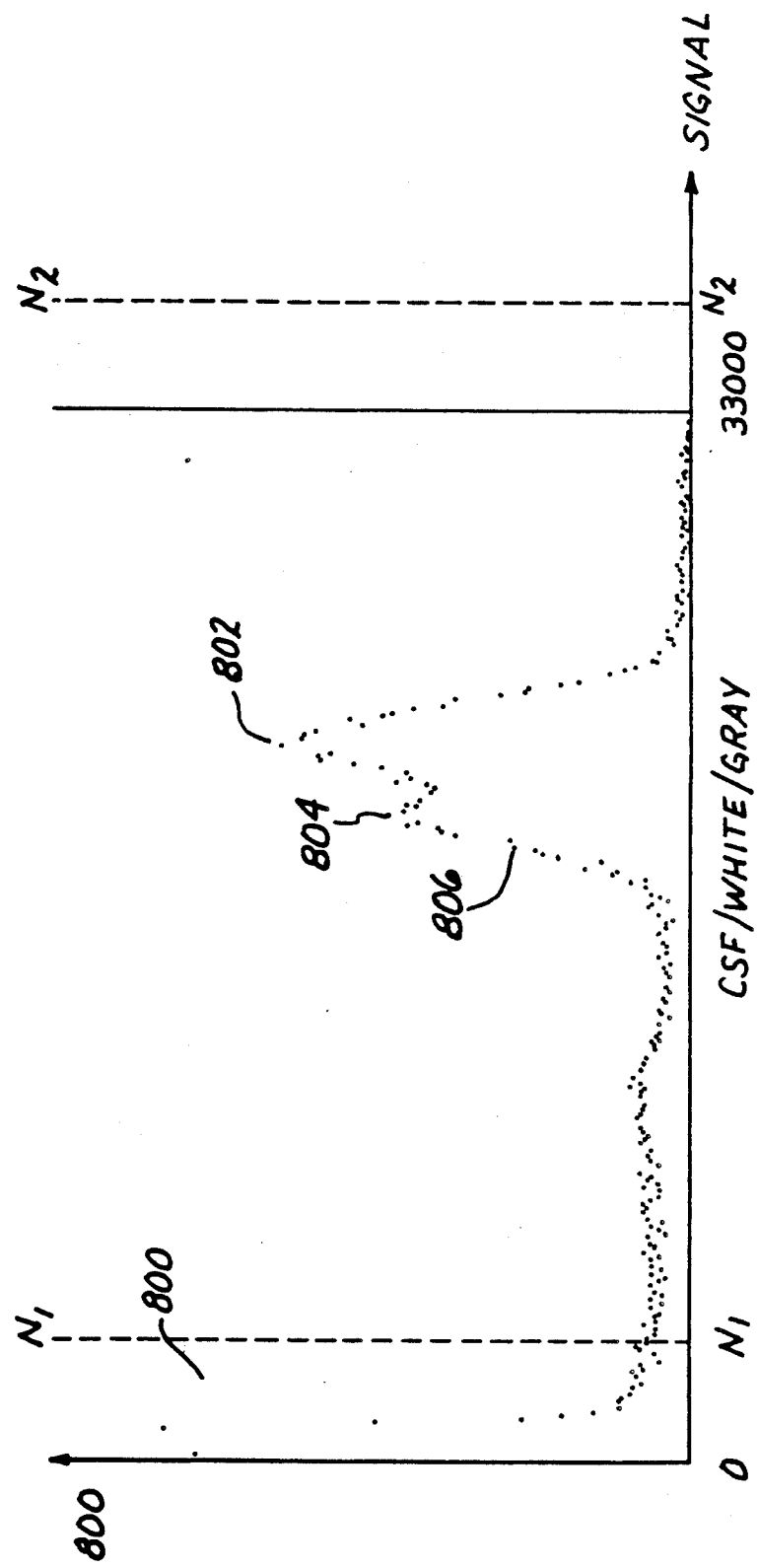
FIG. 29 is a graph of the grey value function $H_\nu$ in accordance with the present invention.

FIG. 29 illustrates why some regions of the brai appear bright while they should appear dark and recip rocally. FIG. 29 is a graph of the grey value functio. $H_\nu$ having a standard deviation equal to the standar deviation of the noise statistics It is recalled that th convolution product of the density function with th resolution function is performed by taking fast Fouri( transforms of these functions and then by taking th inverse fast Fourier transform of the product of thes fast Fourier transforms. The period of the density func tion $H_0$ is typically set by the manufacturer of the imag ing technology used in connection with the apparatus ( the present invention. For example, in a typical Mag netic Resonance Imaging (MRI) device, the signal va ues are between 0 and 32,767. The Gaussian functio used in the present invention is also made periodic wit the same period as used in the signal mapping, namel 32,767 in the example of FIGS. 26–28. When the star dard deviation $\sigma$ of the convolution function become large, the intensity of the function $H_\sigma$ is proportional t the intensity of the signal such that the grey value determined by the distance between the signal valu and the mean value of the function $H_\sigma$ over all the voxels. Because there is a lot of background in the image, as indicated by the numeral 800 in FIG. 29, the mean of the function is approximately given by $\mu_1$. Thus, for large values of the standard deviation $\sigma$, voxels which map to points in the signal space S closer to the origin are brighter. This explains why the background of the image of FIG. 28 is bright. Furthermore, because the convolution is performed with a discrete Fourier transform, grey matter indicated by the numeral 802 in FIG. 29, while having greater signal value on the standard image (and thus further from the origin than white matter) is actually closer to the mean $\mu_2$ than white matter. The mean $\mu_2$ is at a distance from the mean $\mu_1$ which is equal to the period of the Fourier transform White matter is referenced by the numeral 804 in FIG. 29. This effect is due to the wrap-around effect of the Fast Fourier transform algorithm. The same result holds for white matter versus CSF. CSF is represented by the numeral 806 in FIG. 29.

In summary, as shown in the foregoing mathematical analysis, for large values of the standard deviation $\sigma$ of the convolution function, the method of the present invention reduces to metric distance from the mean signal value in the image.

FIGS. 30–33 are pictorial representations of a brain using MRI with a long TR spin echo sequence (TR 3000) and using the $T_2$ parameter.

Figure 30:
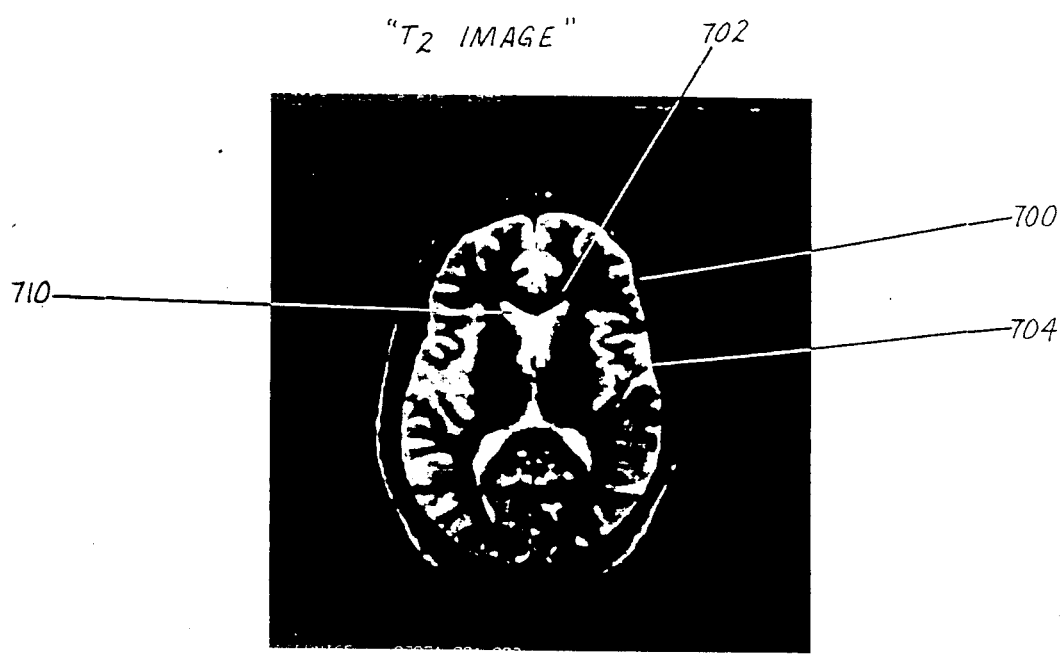
FIG. 30 is a standard "$T_2$ image" obtained by a standard imaging technique.
Figure 31:
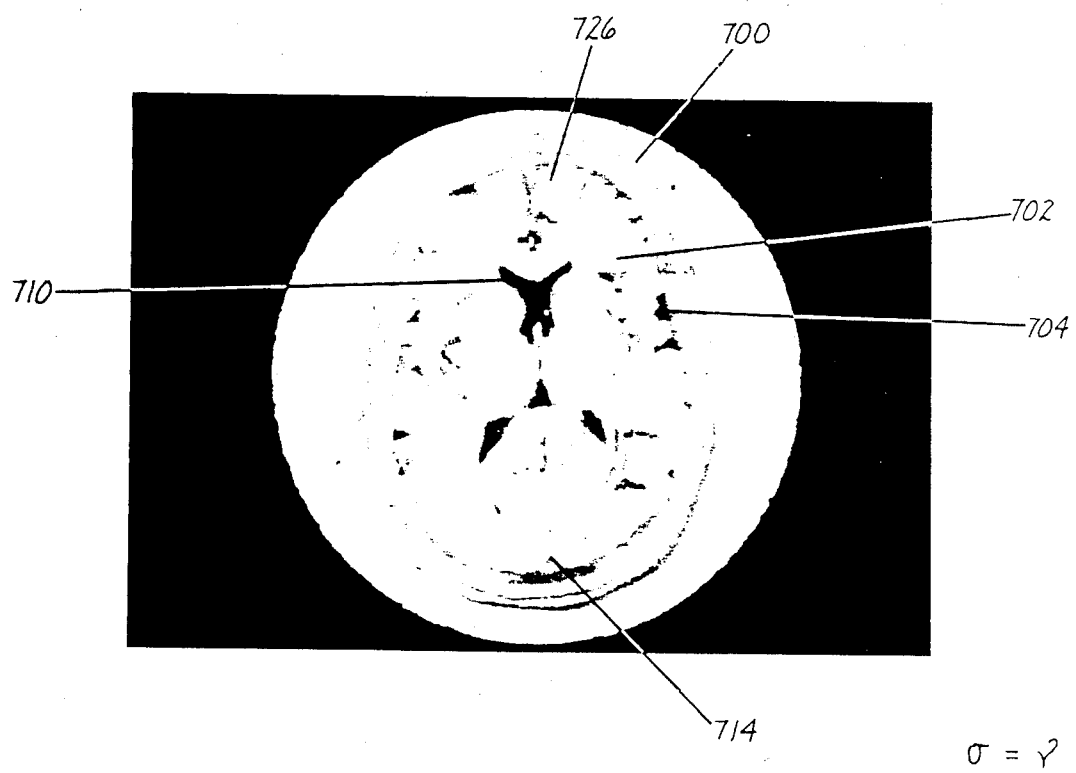
FIGS. 31-33 are images of the brain represented in FIG. 30, obtained in accordance with the present invention for various values of the standard deviation of the resolution Gaussian function.

More specifically, FIG. 30 is a standard image obtained by standard imaging techniques (a "$T_2$ image"). FIG. 31 shows an image produced by the method of the present invention with $\sigma$ equal to the standard deviation of the noise statistics FIG. 31 exhibits slight differences with the standard image of FIG. 30 that may have biological significance. There appears to be a tissue between the white matter 702 and the grey mater 704 in the frontal lobes 716 that was undistinguishable in the standard image of FIG. 31. This tissue is referenced by the numeral 726. This slight difference appears more clearly in the actual photographs from which the pictorial representation of FIG. 31 is derived. Conceivably, this tissue difference may be due to subtle differences in the $T_2$ weighted signal values of basal layers of cortical gray matter.

Figure 32:
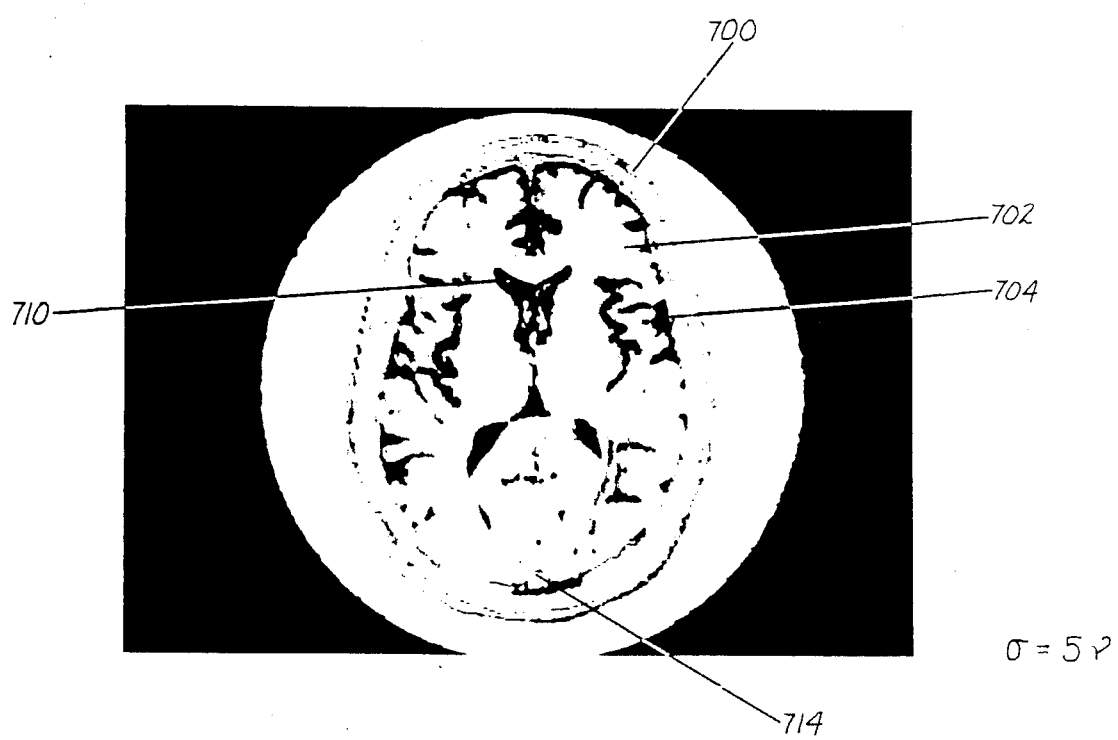

FIG. 32 represents an image in accordance with the present invention wherein the standard deviation of the convolution Gaussian $\sigma$ is five times the standard deviation $\nu$ the noise statistics ($\sigma = 5\nu$).

Figure 33:
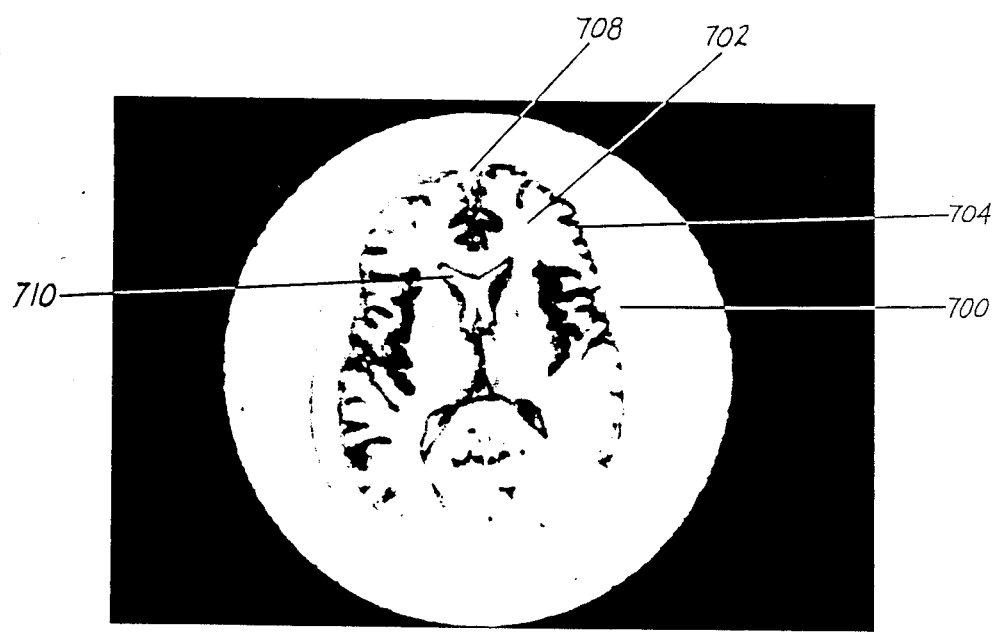

FIG. 33 is an image in accordance with the present invention wherein the standard deviation of the convolution Gaussian $\sigma$ is 90 times the standard deviation $\nu$ of the noise statistics ($\sigma = 90\nu$). It should be noted that while contrast to noise between gray and white matter appears similar to the standard image of FIG. 30, relative signal values are reversed, owing to the fact that white matter is closer to the mean than grey matter. CSF 708, though farthest from the origin as shown in FIG. 29, is brightest because of the "wrapped around scale".

Figure 34:
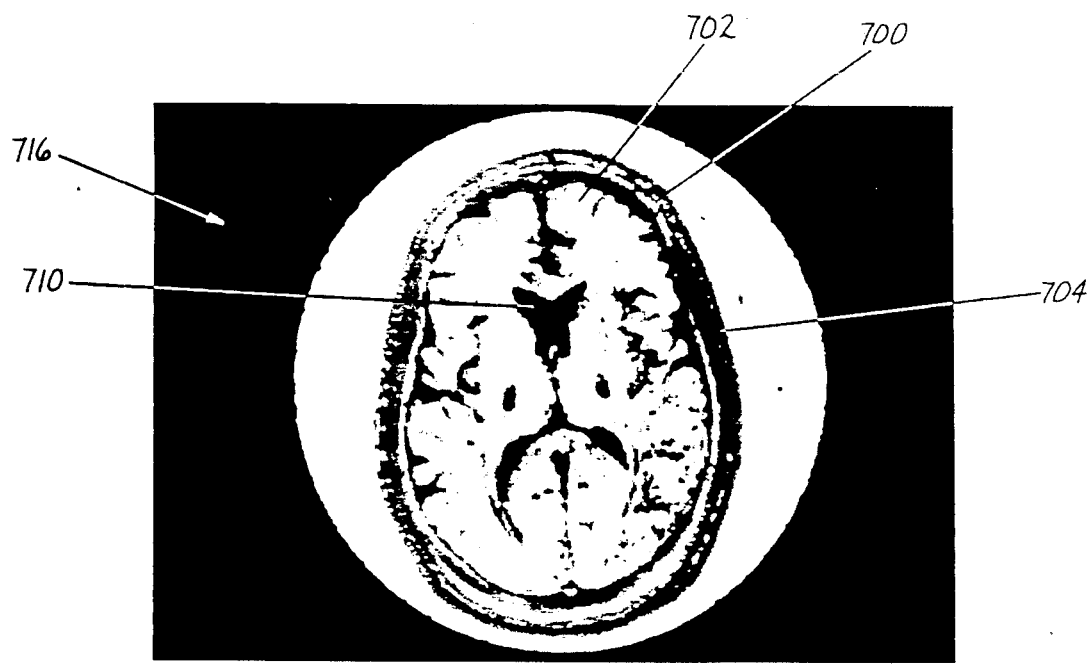
FIG. 34 represents an image in accordance with the present invention wherein the resolution function is a two-dimensional Gaussian.
Figure 35:
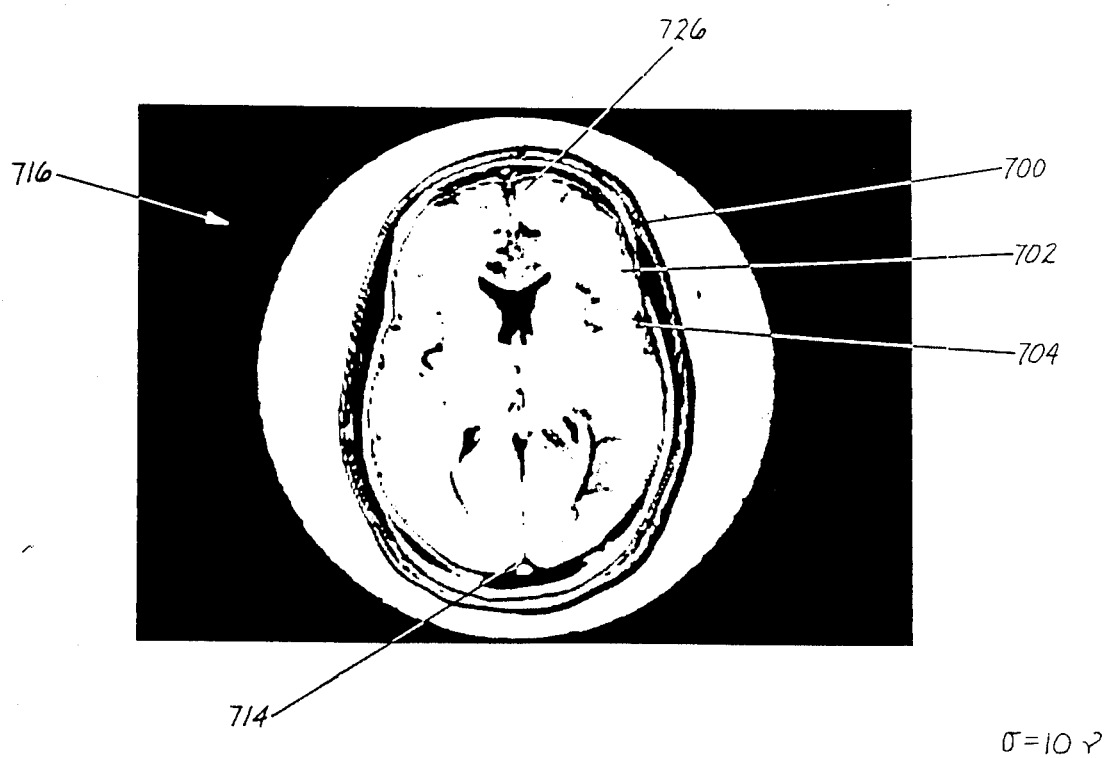
FIGS. 35 and 36 are images of the brain represented in FIG. 34, wherein the variance of the convolution Gaussian is 10 times and 90 times respectively the variance $\nu$ of the noise statistics.
Figure 36:
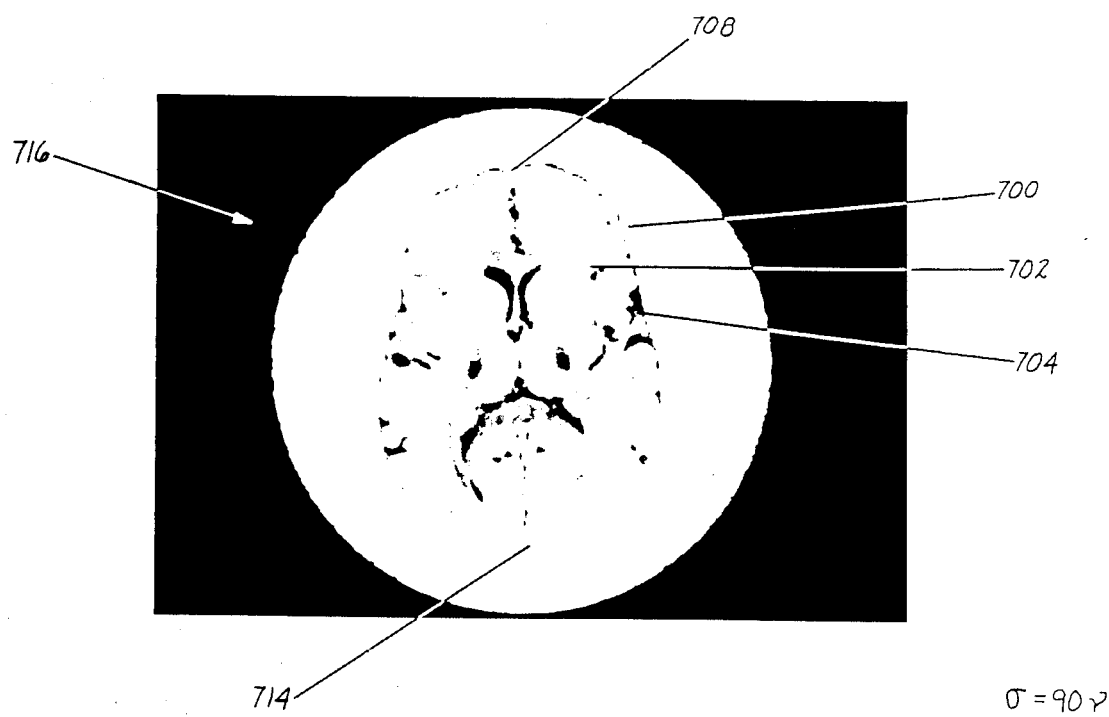

Reference is now made to FIGS. 34 to 36 which represent alternative images of the brain using the method of the present invention. In FIGS. 34–36, the standard first and second echo MR images of FIGS. 26 and 30 are used to form a two-dimensional signal space from which measure theoretic images are made. In other words both the spin density and the time of relaxation $T_2$ are used to produce a two-dimensional histogram. In calculating the final grey scale, a two-dimensional Gaussian is used in the convolution product More specifically, FIG. 34 represents an image in accordance with the present invention wherein the two standard deviations of the two-dimensional convolution Gaussian $\sigma$ are equal to the standard deviation of the noise statistics, i.e., $\nu$ ($\sigma = \nu$).

In FIG. 35, the two standard deviations of the two-dimensional convolution Gaussian $\sigma$ are ten times the standard deviation of the noise statistics $\nu$ ($\sigma = 10\nu$). Here again, apparently distinct tissue 726, possibly representing deep cortical gray matter, can be observed in the frontal lobes 716.

FIG. 36 represents the limiting case of an image produced in accordance with the present invention with $\sigma = 90\nu$. This image essentially represents a metric image obtained from two standard metric images The distinction observed in FIG. 31 between grey matter and white matter is no longer present.

Although the present method is preferably used in connection with grey level imaging, it will be apparent to those skilled in the art that the grey level scale can be substituted with any other imaging scale such as a color scale. For example, it can be envisioned to assign a hue. or a color or a particular luminance value to each value of $H_{94}$. As the set of colors may be restricted to a small number, the mapping from the space of pixels to the function $H_\sigma$ can also be done using any standard segmentation method. The function $H_\sigma$ is thus quantized and mapped into a set of tones (colors, hues, etc.). Any of the segmentation methods described in the background of the invention in particular would be applicable. The underlying principles of the method of the present invention can also be applied to any pattern reproduction device such as in photocopying machines, photographic apparatuses, film developing devices,- ..etc.

Any and all modifications, variations or equivalent arrangements which may occur to those skilled in the art should be considered to be within the scope of the invention as defined in the appended claims.

I claim:

1. A method for processing an image, said image comprising a plurality of pixels representing a region of interest partitioned into a plurality of voxels, said method comprising the steps of:

providing a plurality of multidimensional signals, each of said signals being associated with each of said voxels, said plurality of voxels being mapped into said plurality of signals in a signal space by a mapping M;

computing a density function representative of the frequency of occurrence of each of said multidimensional signals in said signal space; and assigning a tone value to each of said plurality of voxels in accordance with said density function.

2. A method for processing an image, said image comprising a plurality of pixels representing a region of interest partitioned into a plurality of voxels, comprising the steps of:

providing a plurality of multidimensional signals, each of said multidimensional signals comprising a plurality of parameters containing information about said region of interest, each of said signals being further associated with each of said voxels, said plurality of voxels being mapped into said plurality of signals in a signal space by a mapping M, said mapping M being a multidimensional random variable having a density function;

computing said density function representative of the frequency of occurrence of each of said multidimensional signals in said signal space;

convolving said density function with a resolution function so as to provide a real valued probability density function defined for each of said plurality of voxels;

assigning a tone value to each of said plurality of voxels corresponding to the value of said probability density function for each of said voxels; and displaying a tone level image wherein each voxel is represented by a pixel with said assigned tone value.

3. A method for processing an image as defined in claim 2, wherein said convolving step comprises the step of convolving a Gaussian function of mean zero and variance $\sigma$ with said density function 4. A method for processing an image as defined in claim 3, wherein said Gaussian has a variance $\sigma$ equal to or greater than the variance $\nu$ of said density function of said signal mapping M.

5. A method for processing an image as defined in claim 4, wherein said variance $\sigma$ of said Gaussian is a multiple of said variance $\nu$ of said density function of said signal mapping M.

6. A method for processing an image as defined in claim 3, wherein said variance $\sigma$ defines the resolution of said image in said signal space, whereby high values of the variance $\sigma$ with respect to the variance $\nu$ produce a low resolution image in said signal space and whereby low values of the variance $\sigma$ with respect to the variance $\sigma$ produce a high resolution image in said signal space.

7. A method for processing an image as defined in claim 3, wherein said image has a contrast defined by said tone value and said signal space is defined with a metric, said contrast between two voxels of said plurality of voxels being independent on the metric in said signal space.

8. A method for processing an image as defined in claim 2, wherein said convolving step includes the step of convolving a cosine function with said density function of said mapping M.

9. A method for processing an image as defined in claim 2, wherein said convolving step includes the step of convolving a pulse function having a width $\sigma$ with said density function of said mapping M.

10. A method for processing an image as defined in claim 2, wherein said convolving step includes the step of convolving a sinc function with said density function of said mapping M.

11. A method for processing an image as defined in claim 2, wherein said convolving step includes the step of convolving an exponential function with said density function of said mapping M.

12. A method for processing an image as defined in claim 2, wherein said convolving step includes the step of convolving a filter function with said density function of said mapping M.

13. A method for processing an image as defined in claim 2, wherein said density function is given by the following formula:

$$H_o(s) = \sum_w \delta(s - M(w)),$$

wherein $\delta$ is the delta function, where w is the voxel in the set of voxels comprising said region of interest, and s is any possible signal value that a voxel could have as its measured value.

14. A method for processing an image as defined in claim 2, wherein said convolution product is performed using Fourier transforms.

15. A method for processing an image as defined in claim 2, wherein said convolution product is performed using Fast Fourier transforms.

16. A method for processing an image as defined in claim 2, wherein said probability density function is given by the following equation:

$$H\sigma(s) = G\sigma(s) * H_o(s),$$

wherein * denoted the convolution product, $G\sigma(s)$ represents said distribution function and $H_o(s)$ represents the density function of same mapping M, and where $\sigma$ is any real number, $\sigma$ being the standard deviation of said distribution function $G\sigma(s)$.

17. A method for processing an image as defined in claim 2, wherein said image is a medical image 18. A method for processing an image as defined in claim 2, wherein said signals are NMR signals.

19. A method for processing an image as defined in claim 2, wherein said signals are obtained by computer tomography.

20. A method for processing an image as defined in claim 2, wherein said signals are obtained from X-ray projections of said region of interest.

21. A method for processing an image as defined in claim 2, wherein said tone value is a grey value.

22. A method for processing an image as defined in claim 2, wherein said tone value is a color.

23. A method for processing an image as defined in claim 2, wherein said step of assigning a tone value is performed by segmentation.

24. A method for processing an image as defined in claim 2, wherein said convolving step is performed by using a multidimensional resolution function so as to obtain a single image incorporating said information from all of said plurality of parameters.

25. A method for processing an image as defined in claim 2, wherein said convolving step is performed by using a plurality of unidimensional resolution functions so as to obtain a plurality of images corresponding to each of said parameters of said multidimensional signals in said signal space.

26. A method for processing an image, said method comprising a plurality of pixels representing a region of interest partitioned into a plurality of voxels, comprising the steps of:

providing a plurality of multidimensional signals, each of said signals being associated with each of said voxels, said plurality of voxels being mapped into said plurality of signals in a signal space by a mapping M, said mapping M being a multidimensional random variable and defining a probability measure in said signal space;

computing the Radon-Nikodym derivative of said probability measure of said mapping M, said Radon-Nikodym derivative defining a probability density function;

assigning a tone value to each of said plurality of voxels corresponding to the value of said probability density function for each of said voxels; and displaying a tone level image wherein each voxel is represented by a pixel with said assigned tone value.

27. An apparatus for processing an image comprising a plurality of pixels representing a region of interest partitioned into a plurality of voxels, said apparatus comprising:
- an input imaging device for providing a plurality of multidimensional signals, each of said signals being associated with each of said voxels, said plurality of voxels being mapped into said plurality of signals in a signal space by a mapping M, said mapping M being a multidimensional random variable and defining a probability measure in said signal space;
- means for computing a density function representative of the frequency of occurrence of each of said multidimensional signals in said signal space;
- means for convolving said density function with a resolution function so as to provide a real valued probability density function defined for each of said plurality of voxels;
- means for assigning a tone value to each of said plurality of voxels corresponding to the value of said probability density function for each of said voxels; and
- means for displaying a tone level image wherein each voxel is represented by a pixel with said assigned tone value.

28. An apparatus for processing an image comprising a plurality of pixels representing a region of interest partitioned into a plurality of voxels, said apparatus comprising:
- an input imaging device for providing a plurality of multidimensional signals, each of said signals being associated with each of said voxels, said plurality of voxels being mapped into said plurality of signals in a signal space by a mapping M, said mapping M being a multidimensional random variable and defining a probability measure in said signal space;
- means for computing the Radon-Nikodym derivative of said probability measure of said mapping M, said Radon-Nikodym derivative defining a probability density function;
- means for assigning a tone value to each of said plurality of voxels corresponding to the value of said probability density function for each of said voxels; and
- means for displaying a tone level image wherein each voxel is represented by a pixel with said assigned tone value.

29. An apparatus for processing an image comprising a plurality of pixels representing a region of interest partitioned into a plurality of voxels, said apparatus comprising:
- an input imaging device for providing a plurality of multidimensional signals, each of said signals being associated with each of said voxels, said plurality of voxels being mapped into said plurality of signals in a signal space by a mapping M, said mapping M being a multidimensional random variable and defining a probability measure in said signal space;
- means for computing a density function representative of the frequency of occurrence of each of said multidimensional signals in said signal space;
- means for assigning a tone value to each of said plurality of voxels corresponding to the value of said probability density function for each of said voxels; and
- means for displaying a tone level image wherein each voxel is represented by a pixel with said assigned tone value.

30. An apparatus for processing an image according to claim 29, wherein said input imaging device is a NMR device.

31. An apparatus for processing an image according to claim 29, wherein said input imaging device is an X-ray camera.

32. An apparatus for processing an image according to claim 29, wherein said input imaging device is a CT device.

* * * * *